US012646277B2

(12) United States Patent
Choi et al.

(10) Patent No.: US 12,646,277 B2
(45) Date of Patent: Jun. 2, 2026

(54) METHOD FOR PROVIDING USER INTERFACE AND WEARABLE ELECTRONIC DEVICE FOR SUPPORTING THE SAME

(71) Applicant: SAMSUNG ELECTRONICS CO., LTD., Suwon-si (KR)

(72) Inventors: Jinha Choi, Suwon-si (KR); Sungman Kim, Suwon-si (KR); Boosun Shin, Suwon-si (KR); Chaekyung Lee, Suwon-si (KR); Minkyung Cho, Suwon-si (KR); Sanggeon Kim, Suwon-si (KR); Minseoung Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/583,166

(22) Filed: Feb. 21, 2024

(65) Prior Publication Data

US 2024/0303949 A1 Sep. 12, 2024

Related U.S. Application Data

(63) Continuation of application No. PCT/KR2024/002003, filed on Feb. 13, 2024.

(30) Foreign Application Priority Data

Mar. 10, 2023 (KR) ........................ 10-2023-0032103
Jun. 27, 2023 (KR) ........................ 10-2023-0082699

(51) Int. Cl.
*G06T 19/20* (2011.01)
*G02B 27/00* (2006.01)
(Continued)

(52) U.S. Cl.
CPC .......... *G06T 19/20* (2013.01); *G02B 27/0093* (2013.01); *G02B 27/017* (2013.01);
(Continued)

(58) Field of Classification Search
CPC ......... G06T 19/20; G06T 7/50; G06T 19/006; G06F 9/451; G06F 3/012; G06F 3/017;
(Continued)

(56) References Cited

U.S. PATENT DOCUMENTS

2014/0068500 A1 3/2014 Wu et al.
2014/0306993 A1 10/2014 Poulos et al.
(Continued)

FOREIGN PATENT DOCUMENTS

JP 2018049629 A 3/2018
JP 2019-101413 6/2019
(Continued)

OTHER PUBLICATIONS

Search Report and Written Opinion dated May 20, 2024 issued in International Patent Application No. PCT/KR2024/002003.
(Continued)

*Primary Examiner* — Hai Tao Sun
(74) *Attorney, Agent, or Firm* — NIXON & VANDERHYE P.C.

(57) ABSTRACT

According to an embodiment, a wearable electronic device may include a display, memory, and a processor. The memory may store instructions that, when executed by the processor, cause the wearable electronic device to display a first execution screen of a first application in a 3D virtual space. A first guide representing a first virtual plane for guiding a location at which an object can be placed and a second guide representing a second virtual plane for guiding a location at which an object can be placed may be provided in the 3D virtual space, wherein the second virtual plane is (Continued)

facing in a direction different from the first virtual plane. The memory may store instructions that, when executed by the processor, cause the wearable electronic device to, based on a user input for moving a first object included in the first execution screen, display at least one guide of the first guide or the second guide to enable relocation of the first object to the first virtual plane or the second virtual plane.

20 Claims, 29 Drawing Sheets

(51) Int. Cl.

| | | |
|---|---|---|
| *G02B 27/01* | (2006.01) | |
| *G06F 3/01* | (2006.01) | |
| *G06F 9/451* | (2018.01) | |
| *G06T 7/50* | (2017.01) | |
| *G06T 19/00* | (2011.01) | |
| *G06V 40/20* | (2022.01) | |

(52) U.S. Cl.
CPC .............. *G06F 3/012* (2013.01); *G06F 3/017* (2013.01); *G06F 9/451* (2018.02); *G06T 7/50* (2017.01); *G06T 19/006* (2013.01); *G06V 40/28* (2022.01); *G02B 2027/0138* (2013.01); *G06V 2201/07* (2022.01)

(58) Field of Classification Search
CPC .............. G06V 40/28; G06V 2201/07; G02B 27/0093; G02B 27/017; G02B 2027/0138
USPC ........................................................ 345/419
See application file for complete search history.

(56) References Cited

U.S. PATENT DOCUMENTS

| | | | | |
|---|---|---|---|---|
| 2015/0277699 | A1* | 10/2015 | Algreatly | .............. G06F 3/0304 |
| | | | | 715/850 |
| 2016/0180589 | A1 | 6/2016 | Bean et al. | |
| 2018/0095633 | A1 | 4/2018 | Alexander | |
| 2018/0150204 | A1* | 5/2018 | Macgillivray | ...... G06F 3/04815 |
| 2018/0300952 | A1 | 10/2018 | Evans | |
| 2020/0184667 | A1 | 6/2020 | Miller et al. | |
| 2020/0258481 | A1 | 8/2020 | Woo et al. | |
| 2021/0016177 | A1 | 1/2021 | Rong | |
| 2021/0295603 | A1 | 9/2021 | Lui et al. | |
| 2021/0335052 | A1 | 10/2021 | Jeong | |
| 2021/0365108 | A1 | 11/2021 | Burns | |
| 2022/0129139 | A1 | 4/2022 | Choi et al. | |
| 2022/0137705 | A1 | 5/2022 | Hashimoto | |
| 2022/0335701 | A1* | 10/2022 | Oh | ......................... H04N 5/272 |
| 2023/0214004 | A1 | 7/2023 | Ishikawa | |

FOREIGN PATENT DOCUMENTS

| | | |
|---|---|---|
| KR | 10-2020-0061281 | 6/2020 |
| KR | 10-2022-0053394 | 4/2022 |
| WO | 2021235316 A1 | 11/2021 |

OTHER PUBLICATIONS

European search report dated Feb. 4, 2026 for corresponding European application 24771064.3.

* cited by examiner

1800

START

SELECT OBJECT INCLUDED IN WINDOW ~1801

MOVE SELECTED OBJECT TO VIRTUAL SURFACE ~1803

END

2100

1

METHOD FOR PROVIDING USER INTERFACE AND WEARABLE ELECTRONIC DEVICE FOR SUPPORTING THE SAME

CROSS-REFERENCE TO RELATED APPLICATIONS

This application is a continuation of International Application No. PCT/KR2024/002003 designating the United States, filed on Feb. 13, 2024, in the Korean Intellectual Property Receiving Office and claiming priority to Korean Patent Application Nos. 10-2023-0032103, filed on Mar. 10, 2023, and 10-2023-0082699, filed on Jun. 27, 2023, in the Korean Intellectual Property Office, the disclosures of each of which are incorporated by reference herein in their entireties.

BACKGROUND

Field

The disclosure relates to a method for providing a user interface and a wearable electronic device for supporting the same.

Description of Related Art

Various services and additional functions provided through wearable electronic devices such as augmented reality glasses (AR glasses), virtual reality glasses (VR glasses), and head mounted display (HMD) devices are gradually increasing.

In order to increase the utility value of electronic devices and satisfy the needs of various users, communication service providers or electronic device manufacturers are competitively developing electronic devices to provide various functions and to differentiate themselves from other companies. Accordingly, various functions provided through a wearable electronic device are gradually becoming more advanced.

A wearable electronic device may provide a user interface including an object (e.g., an icon) corresponding to an application in a virtual space. For example, a wearable electronic device may provide a home screen including a window and/or a task bar (e.g., a tool bar) in which an object mapped to an application can be placed in a virtual space.

SUMMARY

Various embodiments of the disclosure provide a method for providing a user interface including an object using a structure including a plurality of surfaces (e.g., desk grid and/or space grid to be described in greater detail below) which are formed on a window based on a distance (e.g., distance from a user or distance from an avatar or character representing a user) corresponding to a user on a window and on which the object can be placed, in a virtual space, and a wearable electronic device for supporting the same.

According to an embodiment, a wearable electronic device may include a display, memory, and a processor. The memory may store instructions that, when executed by the processor, cause the wearable electronic device to display a first execution screen of a first application in a 3D virtual space. A first guide representing a first virtual plane for guiding to a location on the first virtual plane at which an object can be placed and a second guide representing a second virtual plane for guiding to a location on the second virtual plane at which an object can be placed may be provided in the 3D virtual space, wherein the second virtual plane is facing in a direction different from the first virtual plane. The memory may store instructions that, when executed by the processor, cause the wearable electronic device to, based on a user input for moving a first object included in the first execution screen, display at least one guide of the first guide or the second guide to enable relocation of the first object to the first virtual plane or the second virtual plane.

According to an embodiment, a method may include displaying a first execution screen of a first application in a 3D virtual space. A first guide representing a first virtual plane for guiding to a location on the first virtual plane at which an object can be placed and a second guide representing a second virtual plane for guiding to a location on the second virtual plane at which an object can be placed may be provided in the 3D virtual space, wherein the second virtual plane is facing in a direction different from the first virtual plane. The method may include, based on a user input for moving a first object included in the first execution screen, displaying at least one guide of the first guide or the second guide to enable relocation of the first object to the first virtual plane or the second virtual plane.

According to an embodiment, in a non-transitory computer-readable medium having recorded thereon computer executable instructions, the computer executable instructions may, when executed by a processor of a wearable electronic device, cause the wearable electronic device to display a first execution screen of a first application in a 3D virtual space. A first guide representing a first virtual plane for guiding to a location on the first virtual plane at which an object can be placed and a second guide representing a second virtual plane for guiding to a location on the second virtual plane at which an object can be placed may be provided in the 3D virtual space, wherein the second virtual plane is facing in a direction different from the first virtual plane. The computer executable instructions may, when executed by the processor of the wearable electronic device, cause the wearable electronic device to, based on a user input for moving a first object included in the first execution screen, display at least one guide of the first guide or the second guide to enable relocation of the first object to the first virtual plane or the second virtual plane.

A method for providing a user interface and a wearable electronic device for supporting the same, in a virtual space, according to various example embodiments may provide a user interface including an object using a structure including a plurality of surfaces which are formed based on a distance corresponding to a user on a window and on which the object can be placed, in a virtual space, thereby improving productivity of the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
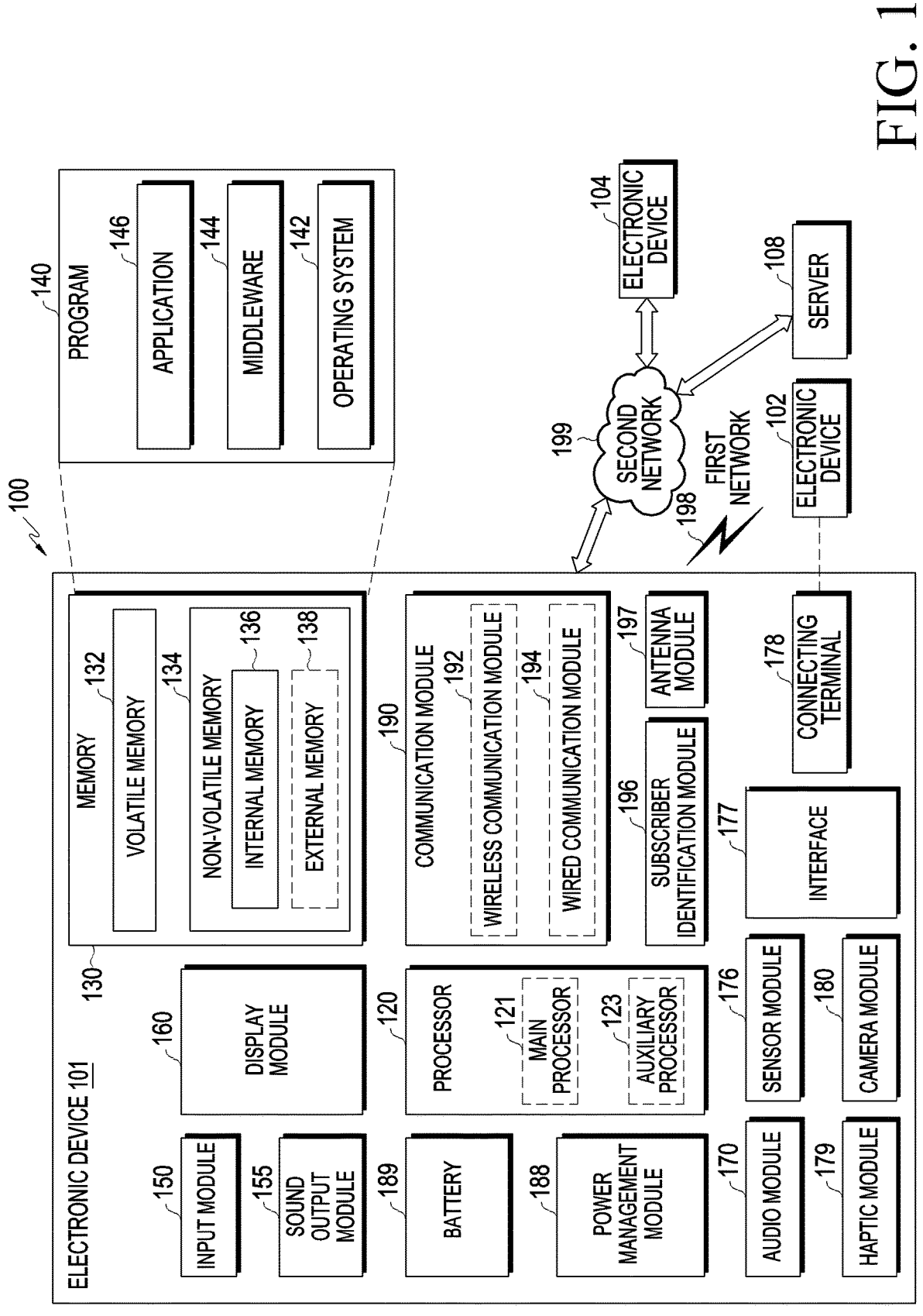
FIG. 1 is a block diagram illustrating an example electronic device in a network environment according to an embodiment.

FIG. 1 is a block diagram illustrating an example electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
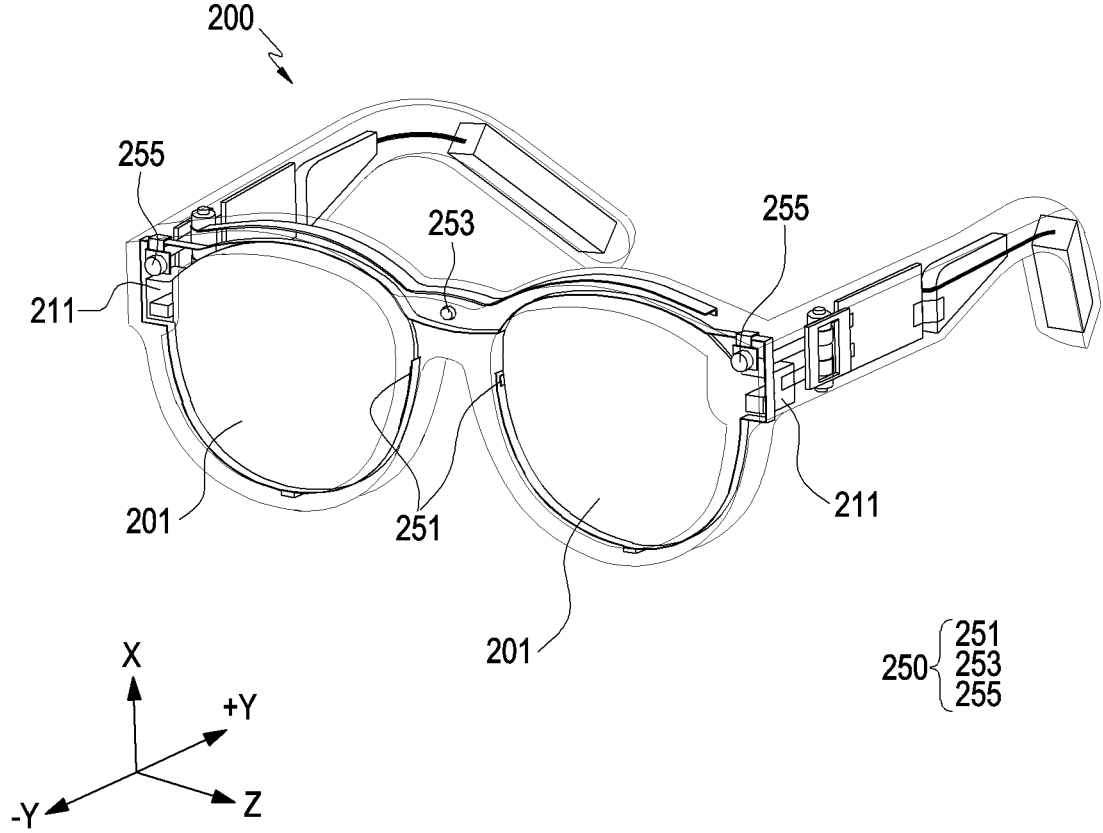
FIG. 2 is a perspective view illustrating an example configuration of a wearable electronic device according to an embodiment of the disclosure.

FIG. 2 is a perspective view illustrating an example configuration of a wearable electronic device 200 according to an embodiment of the disclosure.

Referring to FIG. 2, the wearable electronic device 200 according to an embodiment of the disclosure may include at least one of a light output module (e.g., including light output circuitry) 211, a display member (e.g., including an optical waveguide) 201, and a camera module (e.g., including a camera) 250.

According to an embodiment of the disclosure, the light output module 211 may include a light source capable of outputting an image and a lens for guiding the image to the display member 201. According to an embodiment of the disclosure, the light output module 211 may include at least one of a liquid crystal display (LCD), a digital mirror device (DMD), a liquid crystal on silicon (LCoS), a light emitting diode (LED) on silicon; LEDoS), an organic light emitting diode (OLED), or a micro light emitting diode (micro LED).

According to an embodiment of the disclosure, the display member 201 may include an optical waveguide (e.g., a wave guide). According to an embodiment of the disclosure, an output image of the light output module 211 which is incident to one end of the optical waveguide may be propagated inside the optical waveguide and provided to a user. According to an embodiment of the disclosure, the optical waveguide may include at least one of at least one diffractive element (e.g., a diffractive optical element {DOE} or a holographic optical element {HOE}) or a reflective element (e.g., a reflective mirror). For example, the optical waveguide may guide the image output from the light output module 211 to user's eyes using the at least one diffractive element or the reflective element.

According to an embodiment of the disclosure, the camera module 250 may include at least one camera and capture still images and/or moving images. According to an embodiment, the camera module 250 may be placed within the lens frame and placed around the display member 201.

According to an embodiment of the disclosure, the first camera module 251 may capture and/or recognize the trajectory of the user's eyes (e.g., a pupil or an iris) or point of view. According to an embodiment of the disclosure, the first camera module 251 may periodically or non-periodically transmit information (e.g., trajectory information) related to the trajectory of the user's eyes or point of view to a processor (e.g., the processor 120 of FIG. 1).

According to an embodiment of the disclosure, the second camera module 253 may capture an external image.

According to an embodiment of the disclosure, the third camera module 255 may be used for hand detection and tracking, and user's gesture (e.g., hand motion) recognition. The third camera module 255 according to an embodiment of the disclosure may be used for 3 degrees of freedom (3DoF) or 6DoF head tracking, location (space, environment) recognition, and/or movement recognition. The second camera module 253 may be used for hand detection and tracking and user's gesture recognition according to an embodiment of the disclosure. According to an embodiment of the disclosure, at least one of the first camera module 251 to the third camera module 255 may be replaced with a sensor module (e.g., a LiDAR sensor). For example, the sensor module may include at least one of a vertical cavity surface emitting laser (VCSEL), an infrared sensor, and/or a photodiode.

Figure 3A:
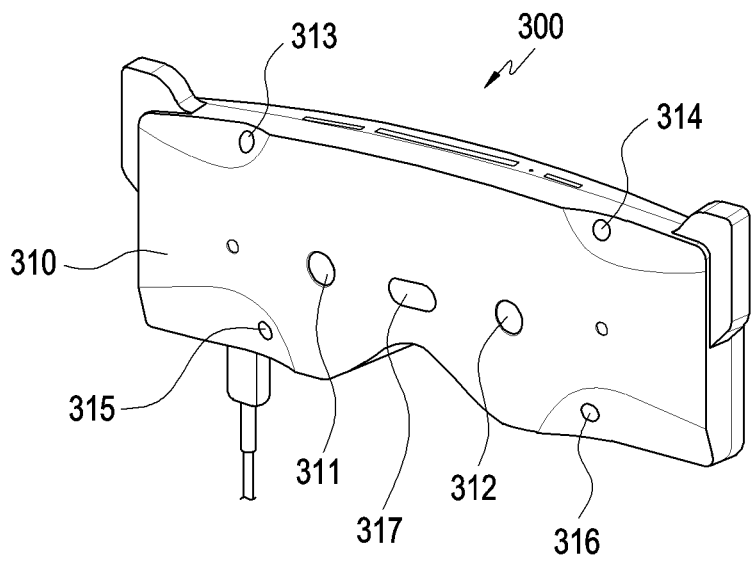
FIG. 3A is a perspective view illustrating a front surface of a wearable electronic device according to an embodiment.

FIG. 3A is a perspective view illustrating a front surface of a wearable electronic device 300 according to an embodiment.

Figure 3B:
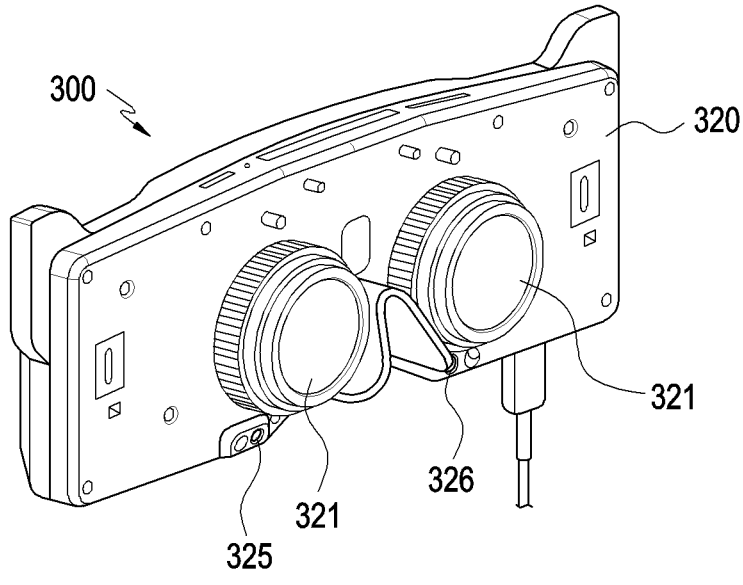
FIG. 3B is a perspective view illustrating a rear surface of a wearable electronic device according to an embodiment.

FIG. 3B is a perspective view illustrating a rear surface of the wearable electronic device 300 according to an embodiment.

Referring to FIGS. 3A and 3B, according to an example embodiment, on a first surface 310 of a housing, camera modules 311, 312, 313, 314, 315, and 316 and/or a depth sensor 317 for acquiring information related to a surrounding environment of the wearable electronic device 300.

In an embodiment, the camera modules 311 and 312 may acquire images related to the surrounding environment of the wearable electronic device.

In an embodiment, the camera modules 313, 314, 315, and 316 may acquire images while the wearable electronic device is being worn by the user. The camera modules 313, 314, 315, and 316 may be used for hand detection, tracking, and recognition of a user's gesture (e.g., hand motion). The camera modules 313, 314, 315, and 316 may be used for 3DoF or 6DoF head tracking, location (space, environment) recognition, and/or movement recognition. In an embodiment, the camera modules 311 and 312 may be used for hand detection and tracking, and user's gesture.

In an embodiment, the depth sensor 317 may be configured to transmit a signal and receive a signal reflected from an object, and may be used for determining a distance to the object, such as time of flight (TOF). For example, in addition to or instead of the depth sensor 317, the camera modules 313, 314, 315, and 316 may identify the distance to the object.

According to an embodiment, the camera modules 325 and 326 for face recognition and/or a display 321 (and/or lens) may be placed on a second surface 320 of the housing.

In an embodiment, the camera modules 325 and 326 for face recognition adjacent to the display may be used for recognizing a user's face, or may recognize and/or track both eyes of the user.

In an embodiment, the display 321 (and/or lens) may be placed on the second surface 320 of the wearable electronic device 300. In an embodiment, the wearable electronic device 300 may not include the camera modules 315 and 316 among the plurality of camera modules 313, 314, 315, and 316. Although not illustrated in FIGS. 3A and 3B, the wearable electronic device 300 may further include at least one of the components illustrated in FIG. 2.

As described above, according to an embodiment, the wearable electronic device 300 may have a form factor to be worn on the user's head. The wearable electronic device 300 may further include a strap and/or a wearing member to be fixed on a user's body part. The wearable electronic device 300 may provide a user experience based on augmented reality, virtual reality, and/or mixed reality while being worn on the user's head.

Figure 4:
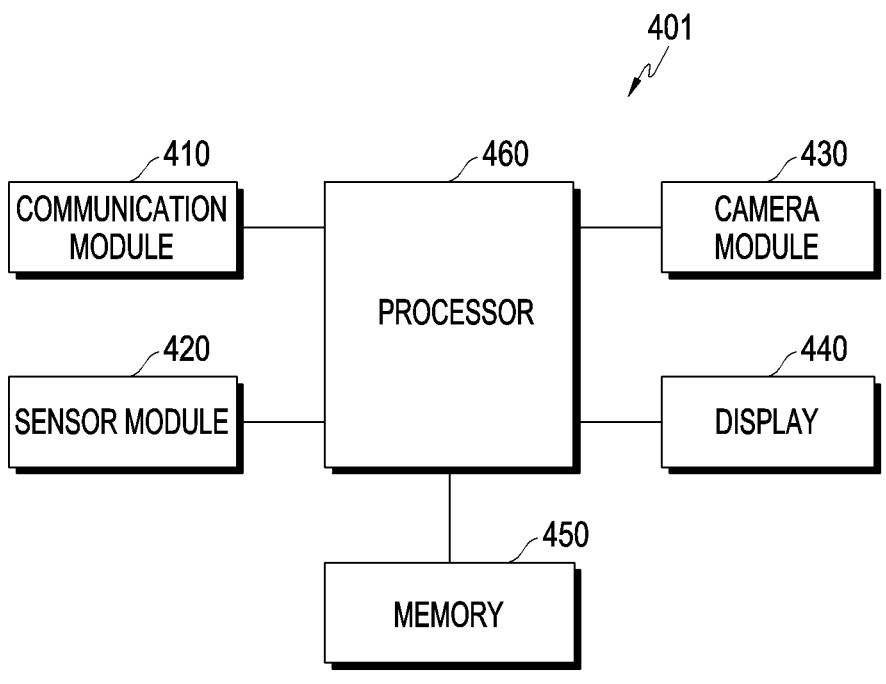
FIG. 4 is a block diagram illustrating an example configuration of a wearable electronic device according to an embodiment.

FIG. 4 is a block diagram illustrating an example configuration of a wearable electronic device 401 according to an embodiment.

Referring to FIG. 4, according to an embodiment, the wearable electronic device 401 may include a communication module (e.g., including communication circuitry) 410, a sensor module (e.g., including at least one sensor) 420, a camera module (e.g., including a camera) 430, a display 440, a memory 450, and/or a processor (e.g., including processing circuitry) 460.

In an embodiment, the communication module 410 may be the communication module 190 of FIG. 1.

In an embodiment, the communication module 410 may include various communication circuitry and may be used to acquire an input using a user's movement. For example, a controller wirelessly (or wiredly) connected to the wearable electronic device 401 may include a motion sensor (e.g., an inertia measurement unit (IMU) sensor). When the controller is moved by the user's movement while being gripped by the user (e.g., the user's hand), information on the movement of the controller may be acquired through the motion sensor. The communication module 410 may acquire the input using the user's movement by receiving the information on the movement of the controller acquired by the controller, from the controller. For example, the communication module 410 may receive information on the input acquired by the controller from the controller (e.g., a joystick, keyboard, or mouse).

In an embodiment, the sensor module 420 may be the sensor module 176 of FIG. 1.

In an embodiment, the sensor module 420 may include at least one sensor and acquire the movement of the wearable electronic device 401. For example, the sensor module 420 may include a motion sensor (e.g., a sensor supporting 6 degrees of freedom (6DoF)). The sensor module 420 may acquire the movement of the wearable electronic device 401 moved by the movement of a user wearing the wearable electronic device 401 (e.g., the user's head) through the motion sensor.

In an embodiment, the camera module 430 may be the camera module 180 of FIG. 1.

In an embodiment, the camera module 430 may include at least one camera and be used to acquire an input to the wearable electronic device 401. For example, the camera module 430 may acquire an image of the user's body, such as the user's eyes and hands. An input by the user's body may be acquired using the image acquired through camera module 430.

In an embodiment, the camera module 430 may acquire an image of a surrounding environment of the wearable electronic device 401 (e.g., the wearable electronic device 401 worn by the user).

In an embodiment, the display 440 may be included in the display module 160 of FIG. 1 and/or the display 221 of FIG. 3.

In an embodiment, the memory 450 may be included in the memory 130 of FIG. 1.

In an embodiment, the memory 450 may store information for performing an operation of providing a user interface. The information stored in the memory 450 will be described in greater detail below.

In an embodiment, the processor 460 may be the processor 120 of FIG. 1.

In an embodiment, the processor 460 may include various processing circuitry and control the overall operation of providing the user interface. The processor 460 may include one or more processors for controlling the operation of providing the user interface. The operation of providing the user interface by the processor 460 will be described in greater detail below.

Although the wearable electronic device 401 in FIG. 4 is illustrated as including the communication module 410, the sensor module 420, the camera module 430, the display 440, the memory 450, and the processor 460, the disclosure is not limited thereto. For example, the wearable electronic device 401 may not include some of the components illustrated in FIG. 4. For example, the wearable electronic device 401 may further include some of the components of the electronic device 101 illustrated in FIG. 1.

Figure 5:
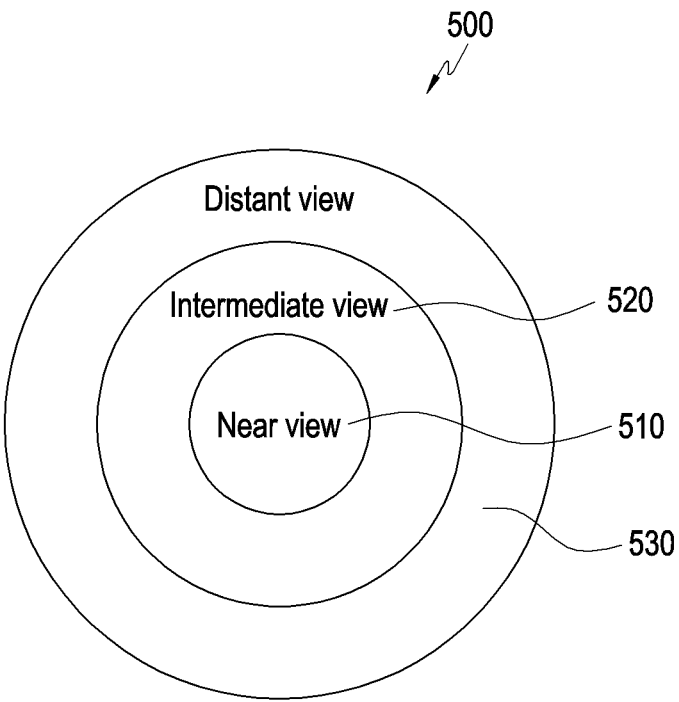
FIG. 5 is a diagram illustrating a structure of a virtual space according to an embodiment.

FIG. 5 is a diagram 500 illustrating a structure of a virtual space according to an embodiment.

Referring to FIG. 5, in an embodiment, a virtual space provided by the wearable electronic device 401 may include a near view 510, an intermediate view 520, and a distant view 530 according to a distance corresponding to a user. For example, the processor 460 may set (or generate) a position of a common center of the near view 510, the intermediate view 520, and the distant view 530 as the position (e.g., a virtual position) of the user (or an avatar or character corresponding to the user). The processor 460, in a direction in which a user's point of view is directed (or in a direction in which a center line of a field of view (FOV) of the wearable electronic device 401 is directed), may set the near view 510, the intermediate view 520, and the distant view 530 as a plurality of virtual spaces (or a plurality of virtual regions) included in the virtual space, according to a distance (e.g., a virtual distance) from the position corresponding to the user.

In an embodiment, the near view 510 may be a space in which a window (e.g., a window in which an icon corresponding to an application can be placed) (and a task bar) and a desk grid, which will be described below, can be placed.

In an embodiment, the near view 510 may be a space in which the wearable electronic device 401 provides connectivity (e.g., a function in which the wearable electronic device 401 is executable in conjunction with an external electronic device) with an external electronic device (e.g., tablet and personal computer {PC}), a user's own work environment (e.g., a work environment personalized to the user), and task units (e.g., task related to widget execution).

In an embodiment, the intermediate view 520 may be an area where a space grid, which will be described in greater detail below, can be placed. In an embodiment, the intermediate view 520 may be a space that provides the task units and a designated function (e.g., a relaxing function).

In an embodiment, the distant view 530 may be a space that provides a wallpaper and a designated function (e.g., a relaxing function that may be provided when a user needs to take a break or switch attention while wearing the wearable electronic device 401).

In an embodiment, the distant view 530 may be a space capable of providing an image and/or animation related to the application as a background screen when the application is executed. For example, when a weather widget is executed, the processor 460 may provide a rain effect through the distant view 530.

Figure 6:
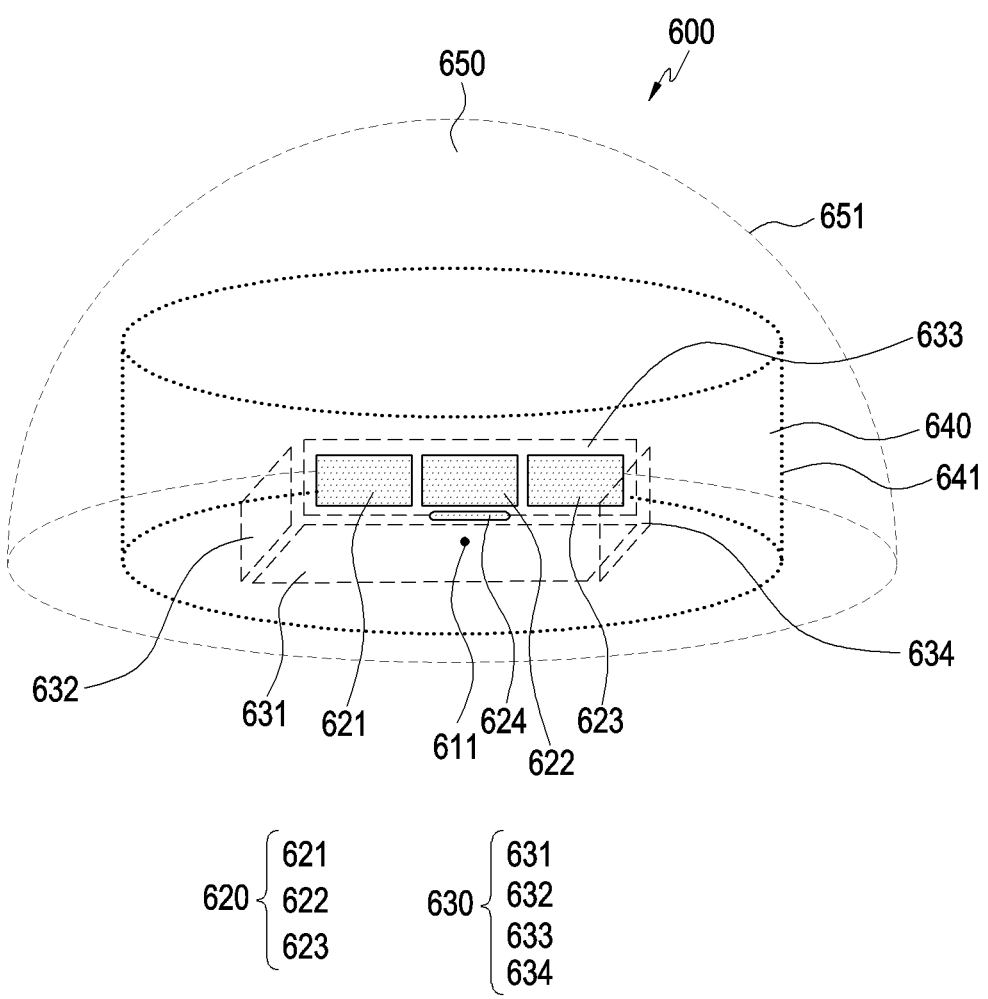
FIG. 6 is a diagram illustrating a structure of a virtual space according to an embodiment.

FIG. 6 is a diagram 600 illustrating a structure of a virtual space according to an embodiment.

Referring to FIG. 6, in an embodiment, a virtual space (referred as "3 D (dimensional) virtual space") may include at least one window 620, a plurality of virtual planes 630, at least one virtual surface 640, and/or scenery 650.

In an embodiment, the at least one window 620 (hereinafter, referred to as "dash") may be a virtual plane on which a screen is displayed. For example, the at least one window 620 may be a virtual plane on which an execution screen of an application is displayed. For example, the at least one window 620 may be a virtual plane on which a screen including an object is displayed. In an embodiment, the at least one window 620 may include a first window 621, a second window 622, and a third window 623. FIG. 6 illustrates three windows (e.g., the first window 621, the second window 622, and the third window 623), but the disclosure is not limited thereto. The at least one window 620 may include one window, two windows, or four or more windows.

In an embodiment, the position and/or size of the at least one window 620 may be changed based on an input (e.g., a user input).

In an embodiment, the object may include an icon corresponding to an application, an icon corresponding to a widget, text, and/or an image, but is not limited thereto. For example, the object may include an icon corresponding to an application, an icon corresponding to a widget, a window including text, and/or an image. For example, the object may include all virtual objects capable of interacting with the user.

In an embodiment, the at least one window 620 may be displayed together with a task bar 624. In an embodiment, the task bar 624 may include a universal menu. For example, the task bar 624 may include an icon corresponding to a pinned application (e.g., an application icon included in the task bar based on a user input), and/or an icon corresponding to a recently executed application.

In an embodiment, the plurality of virtual planes 630 (hereinafter referred to as "the plurality of virtual planes" or "desk grid") may include virtual planes 631, 632, 633, and 634 which are located in the near view 510 and on which an object can be placed.

In an embodiment, the plurality of virtual planes 630 may correspond to some faces of a hexahedron, as illustrated in FIG. 6. For example, the plurality of virtual planes 630 may include a virtual plane 631 (hereinafter, referred to as "a first virtual plane") corresponding to a base, a virtual plane 632 (hereinafter, referred to as "a second virtual plane") corresponding to a left surface, a virtual plane 633 (hereinafter, referred to as "a third virtual plane") corresponding to a front surface, and a virtual plane 634 (hereinafter, referred to as "a fourth virtual plane face") corresponding to a right surface, but are not limited thereto. For example, the plurality of virtual planes 630 may not include some of the first virtual plane 631, the second virtual plane 632, the third virtual plane 633, and the fourth virtual plane 634. For example, the at least one first surface 630 may not include the third virtual plane 633 which may be at least partially covered by the at least one window 620 in a field of view (FOV) (or a point of view) of a user (e.g., an avatar corresponding to the user). For example, only one virtual plane among the plurality of virtual planes may be provided.

In an embodiment, the plurality of virtual planes 630 may be disposed orthogonally with respect to each other within the 3D virtual space. For example, at least one virtual plane among the first virtual plane 631, the second virtual plane 632, the third virtual plane 633, and the fourth virtual plane 634, may be disposed orthogonally with respect to another at least one virtual plane among the first virtual plane 631, the second virtual plane 632, the third virtual plane 633, and the fourth virtual plane 634 within the 3D virtual space.

In an embodiment, the plurality of virtual planes 630 may be disposed within the 3D virtual space such that angles among the plurality of virtual planes 630 belong to approximately 45° to approximately 90° and/or approximately 90° to approximately 180°. For example, an angle between the third virtual plane 633 and the second virtual plane 632 (or the fourth virtual plane 634) may be an angle among approximately 90° to approximately 180° (e.g., approximately 135°). For example, an angle between the second virtual plane 632 and the fourth virtual plane 634 may be an angle among approximately 90° to approximately 180° (e.g., approximately 135°).

In an embodiment, the plurality of virtual planes 630 may be set (e.g., generated) based on a virtual desk. For example, the virtual desk (e.g., a virtual desk 2311-1 of FIG. 23B) may be a surface having a size (and position) corresponding to (e.g., identical to) the size (and position) of one virtual plane (e.g., the first virtual plane 631 corresponding to the base of the hexahedron) among the plurality of virtual planes 630. Based on the virtual desk, an operation of setting the plurality of virtual planes 630 will be described in greater detail below with reference to FIGS. 23A and 23B.

In an embodiment, the at least one virtual surface 640 (hereinafter, referred to as "at least one virtual surface" or "space grid") may include at least one surface which is located in the intermediate view 520 and on which an object can be placed. For example, as illustrated in FIG. 6, the at least one virtual surface 640 may include a side surface (or a top surface and/or a bottom surface) of a cylinder 641.

In an embodiment, the at least one virtual surface 640 may be located at a second position farther than the position of the plurality of virtual planes 630 with respect to a position 611 corresponding to the user. For example, as illustrated in FIG. 6, a distance between the at least one virtual surface (e.g., a virtual surface corresponding to the side surface of the cylinder 641) and the position 611 corresponding to the user may be farther than a distance between the plurality of virtual planes 630 (e.g., the second virtual plane 632, the third virtual plane 633, and the third virtual plane 634) and the position 611 corresponding to the user. In an embodiment, as illustrated in FIG. 6, a portion of the at least one virtual surface 640 (e.g., the bottom surface of the cylinder 641) may overlap with the at least one first surface 630 (e.g., the first virtual plane 631). In an embodiment, the processor 460, in a direction in which a user's point of view is directed (or in a direction in which a center line of a field of view (FOV) of the wearable electronic device 401 is directed), may set positions of the at least one window 620, the plurality of virtual planes 630, the at least one virtual surface 640, and scenery 650 in the virtual space such that the at least one window 620, the plurality of virtual planes 630, the at least one virtual surface 640, and scenery 650 are placed from the position corresponding to the user by an order of the at least one window 620, the plurality of virtual planes 630, the at least one virtual surface 640, and scenery 650. In an embodiment, as drawn by FIG. 6, a portion of the at least one virtual surface 640 (e.g., a virtual surface corresponding to the bottom surface of the cylinder 641) may be superimposed on the plurality of virtual planes 630 (e.g., the first virtual plane 631).

In an embodiment, the at least one window 620 may be placed at a position nearer than a position of the at least one virtual surface 640 (or positions of the plurality of virtual planes 630) in a direction in which the FOV of the user faces.

In an embodiment, the positions of the plurality of virtual planes 630 and/or the position of the at least one virtual surface 640 may be fixed within a virtual space. For example, coordinates of the plurality of virtual planes 630 and/or coordinates of the at least one virtual surface 640 may be determined with respect to the position corresponding to the user when the application of the wearable electronic device 401 is executed. The determined coordinates of the plurality of virtual planes 630 and/or the at least one virtual surface 640 may not be changed by the FOV of the user (or the point of view of the user) within a coordinate system of the virtual space. However, the disclosure is not limited thereto, the determined positions of the plurality of virtual planes 630 and the at least one virtual surface 640 may be changed within the virtual space based on an input (e.g., a user input).

In an embodiment, a distance between at least one of the plurality of virtual planes 630, the at least one window 620, and the at least one virtual surface 640 and the position of the user may be changed by a user's physical movement. For example, when a user wearing the wearable electronic device 401 moves closer to the plurality of virtual planes 630, the distance between the plurality of virtual planes 630 and the user may be reduced. For example, when the user wearing the wearable electronic device 401 moves closer to the at least one virtual surface 640, the distance between the at least one virtual surface 640 and the user may be reduced.

In an embodiment, in a state where the distance between plurality of virtual planes 630 and the user (e.g., an avatar corresponding to the user) is set to a default distance, the distance between the plurality of virtual planes 630 and the user may be changed based on the physical movement of the user wearing the wearable electronic device 401. After the distance between the plurality of virtual planes 630 and the user is changed, the distance between the plurality of virtual planes 630 and the user may be changed (e.g., restored) to the default distance, but is not limited thereto. For example, when the distance between the plurality of virtual planes 630 and the user is larger than or equal to a designated first distance or less than or equal to a designated second distance, the distance between the plurality of virtual planes 630 and the user may be changed to the default distance. For example, when the movement of the wearable electronic device 401 exceeds a designated movement, the distance between plurality of virtual planes 630 and the user may be changed to the default distance. For example, whenever the application is executed, the distance between the plurality of virtual planes 630 and the user may be changed to the default distance.

In an embodiment, the scenery 650 (hereinafter referred to as "scenery") may be placed in the distant view, and may correspond to a portion of a surface forming a hemisphere 651 as illustrated in FIG. 6.

In an embodiment, an object may not be placed on the scenery 650. However, the disclosure is not limited thereto, and an object may be placed on the scenery 650.

In an embodiment, as described above, a background screen (and/or a relaxing function) may be provided on the scenery 650. For example, an image and/or animation related to an application may be provided on the scenery 650 as the background screen when the application is executed.

In FIG. 6, it is illustrated that the plurality of virtual planes 630 corresponds to some faces of the hexahedron, the at least one virtual surface 640 corresponds to a partial surface of the cylinder 641, and the scenery 650 corresponds to a partial surface of the hemisphere 651, but the disclosure is not limited thereto. For example, the plurality of virtual planes 630, the at least one virtual surface 640, and/or the scenery 650 may have various geometric shapes, and may be in a uniform shape or a non-uniform shape.

In FIG. 6, the virtual space is illustrated as including the at least one window 620, the plurality of virtual planes 630, the at least one virtual surface 640, and the scenery 650, but is not limited thereto. For example, the virtual space may include at least one of the plurality of virtual planes 630, the at least one virtual surface 640, or the scenery 650 along with the at least one window 620, depending on the application.

Figure 7:
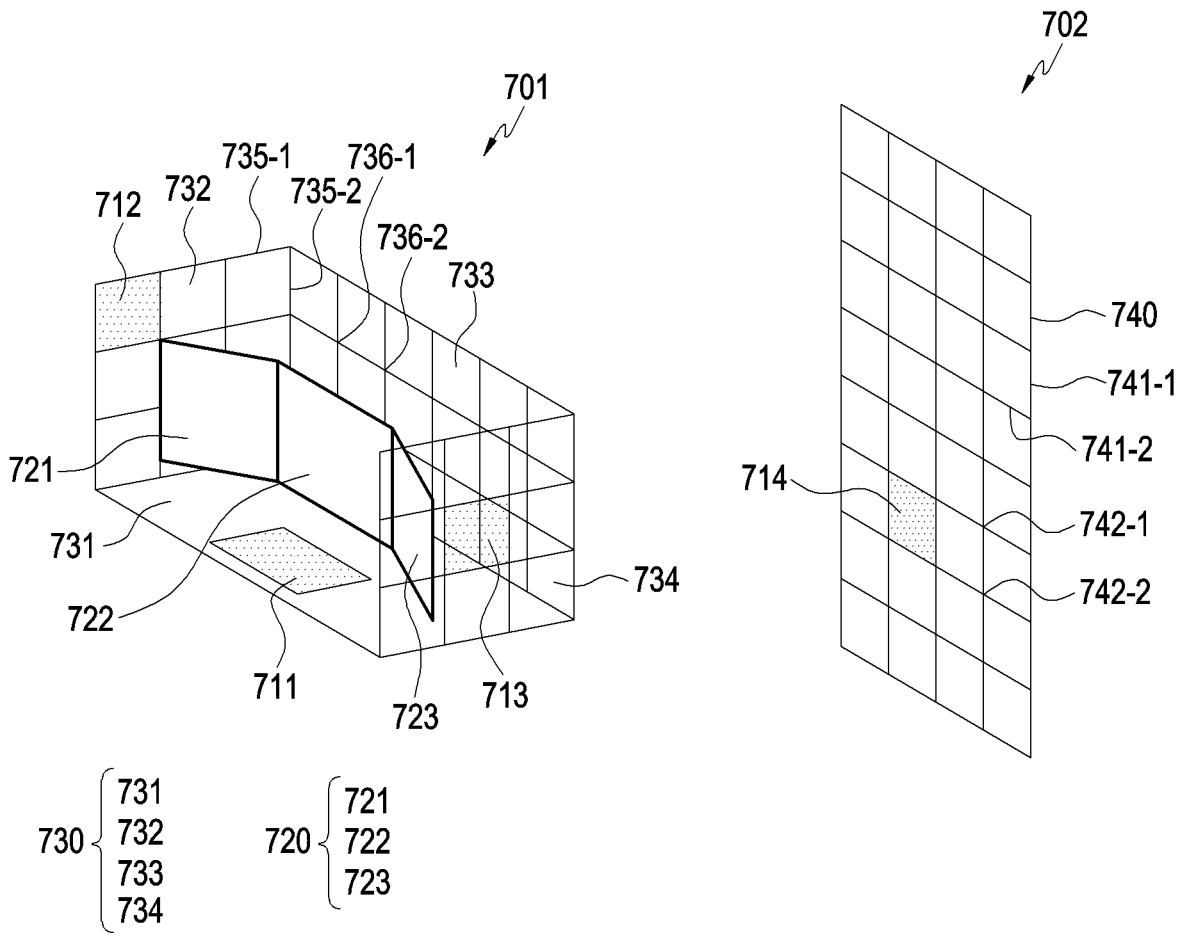
FIG. 7 is a diagram illustrating a plurality of virtual planes and at least one virtual surface according to an embodiment.

FIG. 7 is a diagram illustrating a plurality of virtual planes and a virtual surface according to an embodiment.

Referring to FIG. 7, in an embodiment, as shown at reference numeral 701, a plurality of virtual planes 730 (desk grid) may be represented by guides. For example, the plurality of virtual planes 731, 732, 733, and 734 may be represented in a form of a grid formed by intersecting lines (e.g., lines 735-1 and 735-2).

In an embodiment, the processor 460 may place an object within the plurality of virtual planes 730. For example, the processor 460 may place an object in at least some of regions (e.g., regions 711, 712, and 713) formed by the intersecting lines (e.g., lines 735-1 and 735-2). For example, the processor 460 may move an object included in at least one window 720 (e.g., windows 721, 722, and 723) to the at least some of the regions (e.g., regions 711, 712, and 713) formed by the lines (e.g., lines 735-1 and 735-2) included in the plurality of virtual planes 730. However, the disclosure is not limited thereto, the processor 460 may place the object in at least some of points (e.g., points 736-1 and 736-2) where the lines (e.g., lines 735-1 and 735-2) intersect.

In an embodiment, when displaying the plurality of virtual planes 730, the processor 460 may display the guides in a form of displaying points (e.g., points 736-1 and 736-2) through the display 440. However, the disclosure is not limited thereto. For example, the processor 460 may opaquely display the plurality of virtual planes 730 through the display 440 when displaying the plurality of virtual planes 730, and may display indications indicating the points on the opaquely displayed plurality of virtual planes 730. For example, when displaying the plurality of virtual planes 730, the processor 460 may display the guides (e.g., lines 735-1 and 735-2) in a form of a grid through the display 440.

In an embodiment, as shown in reference numeral 702, at least one virtual surface 740 (space grid) may be represented by a guide. For example, the at least one virtual surface 740 may be represented in a form of a grid formed by the intersecting lines (e.g., 741-1 and 741-2).

In an embodiment, the processor 460 may place an object within the at least one virtual surface 740. For example, the processor 460 may place an object in at least some of regions (e.g., region 714) formed by the intersecting lines (e.g., lines 741-1 and 742-2), but the disclosure is not limited thereto. The processor 460 may place an object in at least some of the points (e.g., points 742-1 and 742-2) where the lines (e.g., lines 741-1 and 741-2) intersect.

In an embodiment, when displaying the at least one virtual surface 740, the processor 460 may display the guide in a form of displaying the points (e.g., points 742-1 and 742-2) through the display 440, but is not limited thereto. For example, when displaying the at least one virtual surface 740, the processor 460 may opaquely display the at least one virtual surface 740 through the display 440, and may display the points on the opaquely displayed at least one virtual surface 740. For example, when displaying the at least one virtual surface 740, the processor 460 may opaquely display a panel (e.g., a region where an object can be placed on the at least one virtual surface) designated so that the object can be placed on the at least one virtual surface 740 through the display 440, and may display the points on the opaquely displayed panel. For example, when displaying the at least one virtual surface 740, the processor 460 may display the guide in a form of displaying the lines (e.g., lines 741-1 and 741-2) through the display 440.

Figure 8:
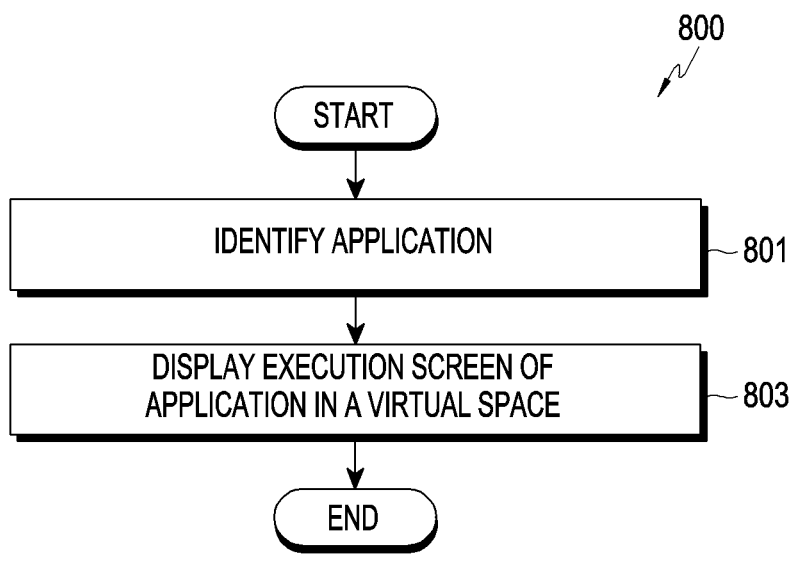
FIG. 8 is a flowchart illustrating an example method for providing a user interface according to an embodiment.

FIG. 8 is a flowchart 800 illustrating an example method for providing a user interface according to an embodiment.

Referring to FIG. 8, in operation 801, in an embodiment, the processor 460 may identify an application based on a first input for executing the application. For example, the processor 460 may receive the first input for executing the application. The processor 460 may identify an identifier (ID) (or type of the application or name of the application) of the application to be executed according to the first input.

In operation 803, in an embodiment, the processor 460 may display, based on the identified application, an execution screen of the application through the display 440 while the plurality of virtual planes or the least one surface is provided in the virtual space.

In an embodiment, the processor 460 may display, based on the application identified in operation 801 being a first application (hereinafter, referred to as "first application"), a first execution screen of the first application through the display 440. For example, the processor 460 may display the first execution screen of the first application the display 440 on the at least one window 620.

In an embodiment, the processor 460 may provide guides (or the plurality of virtual planes) for guiding to a location on a virtual plane at which an object can be placed and representing the plurality of virtual planes (e.g., the plurality of virtual planes 630) while the first execution screen.

In an embodiment, the plurality of virtual planes (e.g., the plurality of virtual planes 630) may be disposed orthogonally with respect to each other within the virtual space (e.g., the 3D virtual space). For example, at least one virtual plane among the first virtual plane 631, the second virtual plane 632, the third virtual plane 633, and the fourth virtual plane 634, may be disposed orthogonally with respect to another at least one virtual plane among the first virtual plane 631, the second virtual plane 632, the third virtual plane 633, and the fourth virtual plane 634 within the 3D virtual space.

In an embodiment, the plurality of virtual planes (e.g., the plurality of virtual planes 630) may be disposed within the 3D virtual space such that angles among the plurality of virtual planes 630 belong to approximately 45° to approximately 90° and/or approximately 90° to approximately 180°. For example, an angle between the third virtual plane 633 and the second virtual plane 632 (or the fourth virtual plane 634) may be an angle among approximately 90° to approximately 180° (e.g., approximately 135°). For example, an angle between the second virtual plane 632 and the fourth virtual plane 634 may be an angle among approximately 90° to approximately 180° (e.g., approximately 135°).

In an embodiment, the processor 460 may not display the guides the display 440 while providing the guides. In a case that an object is placed on the plurality of virtual planes, the processor 460 may display, without displaying the guides, the object placed on the plurality of virtual planes and the first execution of the first application the display 440 while providing the guides.

In an embodiment, the first application may be an application set, when executed, to display the at least one window and provide the guides (or the plurality of virtual planes) of the plurality of virtual planes in the virtual space.

In an embodiment, the processor 460 may, based on a user input for moving an object (e.g., an object included in the first execution screen) displayed on a first window (e.g., a window in which the first execution screen is displayed), display, through the display 440, the guides representing the plurality of virtual planes (or at least a portion of the plurality of virtual planes)(or the guides representing at least the portion of the plurality of virtual planes) to enable relocation of the object to one virtual plane among the plurality of virtual planes. In an embodiment, the processor 460 may display the guides representing the plurality of virtual planes through the display 440 while the object is being moved by the input for moving the object displayed on the first window to the one virtual plane of the plurality of virtual planes. The processor 460 may display the display 440 so that the object is displayed on the one virtual plane and the guides disappears from the display 440, based on completion of the operation of moving the object from the first window to the one virtual plane of the plurality of virtual planes. However, the disclosure is not limited thereto, and the operation of moving the object displayed on the window to the plurality of virtual planes will be described in greater detail below.

In an embodiment, the processor 460 may display, based on the application identified in operation 801 being a second application (hereinafter, referred to as "second application"), a second execution screen of the second application through the display 440. For example, the processor 460 may display the second execution screen of the second application the display 440 on the at least one window 620.

In an embodiment, the processor 460 may provide guides for guiding a location on a virtual surface at which an object can be placed and representing the virtual surface (e.g., the at least one virtual surface 640) while the second execution screen.

In an embodiment, the second application may be an application set, when executed, to display the at least one window and provide the guide of the at least one virtual surface in the virtual space. In an embodiment, the second application may be an application different from the first application.

In an embodiment, the processor 460 may not display the guide representing the at least one virtual surface the display 440 while providing the guide. In a case that an object is placed on the at least one virtual surface, the processor 460 may display, without displaying the guide, the object placed on the at least one virtual surface and the second execution of the first application the display 440 while providing the guide.

In an embodiment, the processor 460 may, based on a user input for moving an object displayed on a second window (e.g., a window in which the second execution screen is displayed), display, through the display 440, the guide representing the at least one virtual surface. In an embodiment, the processor 460 may display the guide representing the at least one virtual surface through the display 440 while the object is being moved by the input for moving the object displayed on the second window to the at least one virtual surface. The processor 460 may control the display 440 so that the object is displayed on the at least one virtual surface and the at least one virtual surface disappears from the display 440 based on completion of the operation of moving the object from the second window to the at least one virtual surface. However, the disclosure is not limited thereto. The operation of moving the object displayed on the window to the at least one virtual surface will be described in greater detail below.

In the above examples, the operations of displaying the window in the virtual space including the plurality of virtual planes or the at least one virtual surface according to the application have been described, but are not limited thereto. For example, the processor 460 may display a third execution screen of a third application in the virtual space including the plurality of virtual planes and the at least one virtual surface through the display 440, based on the application identified in operation 801 being the third application set to provide plurality of virtual planes and the at least one virtual surface in the virtual space. In an embodiment, the third application may be an application different from the first application and the second application.

Figure 9:
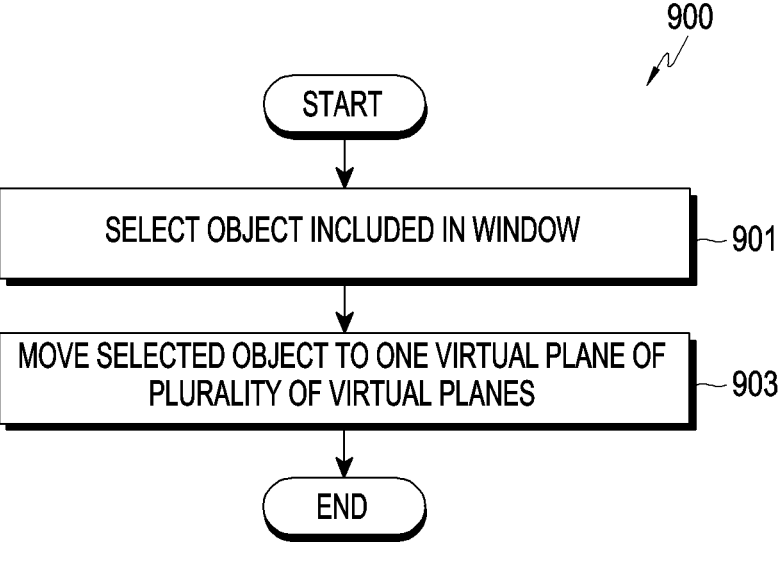
FIG. 9 is a flowchart illustrating an example method of placing an object on a plurality of virtual planes according to an embodiment.

FIG. 9 is a flowchart 900 illustrating an example method of placing an object on a plurality of virtual planes according to an embodiment.

Referring to FIG. 9, in operation 901, in an embodiment, the processor 460 may select (or determine) an object included in a window based on a designated input.

In an embodiment, the processor 460 may display an execution screen of an application including one or more objects on a window through the display 440 in a virtual space (e.g., virtual space corresponding to the application) including plurality of virtual planes (desk grid).

In an embodiment, while the window including one or more objects is being displayed, the processor 460 may select at least one object based on a designated input.

In an embodiment, the processor 460 may select the at least one object based on an input received from a controller wirelessly (or wiredly) connected to the wearable electronic device 401 through the communication module 410. For example, the processor 460 may receive information corresponding to the movement of the controller from the controller wirelessly connected through the communication module 410. The processor 460 may identify a position indicated by a virtual ray (or beam, or laser) displayed from a virtual controller that indicates the controller and moves by the movement of the controller, based on the received information. The processor 460 may select an object displayed at the position indicated by the virtual ray based on reception of an input received by the controller, from the controller through the communication module 410.

In an embodiment, the processor 460 may select the object based on the movement of the user's hand. For example, the processor 460 may recognize the movement of the user's hand based on an image acquired through a camera. The processor 460 may display a pointer (hereinafter, referred to as "pointer") indicating the recognized hand (or recognized hand's movement and/or gesture) through the display 440. The processor 460 may select an object displayed at the position of the pointer based on reception of a designated gesture (e.g., pinch gesture representing a pinching operation using a thumb and index finger) in a state where the pointer is located on the object (e.g., a state where the pointer is overlapped and displayed on the object).

However, a method of selecting at least one object based on a designated input while a window including one or more objects is displayed is not limited to the above examples. For example, the processor 460 may select, from a mouse and/or a keyboard wirelessly (or wiredly) connected to the wearable electronic device 401 through the communication module 410, the object displayed on the window based on an input that is input to the mouse and/or the keyboard.

In operation 903, in an embodiment, the processor 460 may move the selected object to one virtual plane of the plurality of virtual planes based on an input for moving the selected object. For example, the processor 460 may place the selected object in one virtual plane of the plurality of virtual planes, based on the input for moving the selected object displayed on the window.

In an embodiment, the processor 460 may control the display 440 so that the guides representing the plurality of virtual planes can be displayed in a virtual space, based on the selection of the object displayed on the window. For example, based on the selection of the object displayed on the window, the processor 460 may control the display 440 so that the plurality of virtual planes or the guides representing the plurality of virtual planes can be opaquely displayed in the virtual space. For example, based on the selection of the object displayed on the window, the processor 460 may opaquely display the plurality of virtual planes in the virtual space through the display 440 and may display the guides representing the plurality of virtual planes (or points where lines forming the guides intersect) on the opaquely displayed plurality of virtual planes.

In an embodiment, while the plurality of virtual planes is being displayed, the processor 460 may move the selected object to the one virtual plane of the plurality of virtual planes, based on the input for moving the selected object.

In an embodiment, the processor 460 may control the display 440 so that the selected object is moved to the one virtual plane of the plurality of virtual planes and then the guides representing the plurality of virtual planes disappear.

In an embodiment, the processor 460 may display the object in a different form through the display 440 according to the virtual plane on which the object is placed among plurality of virtual planes. For example, when the object is placed on a first virtual plane (e.g., the first virtual plane 631), the processor 460 may display a three-dimensional (3D) object (e.g., an object 1662 of FIG. 16) through the display 440. For example, when the object is placed on a second virtual plane (e.g., the second virtual plane 632), a third virtual plane (e.g., the third virtual plane 633), or a fourth virtual plane (e.g., the fourth virtual plane 634), the processor 460 may display a two-dimensional (2D) object (e.g., object 1661 of FIG. 16) through the display 440.

FIG. 9 illustrates an operation of moving the object included in the window to the one virtual plane of the plurality of virtual planes, but the disclosure is not limited thereto. For example, the processor 460 may move an object included in a task bar to the one virtual plane of the plurality of virtual planes by performing an operation at least partially the same as or similar to the operation of moving the object included in the window to the one virtual plane of the plurality of virtual planes.

Hereinafter, the operation of placing the object on the plurality of virtual planes will be described in greater detail below with reference to FIGS. 10 to 14.

Figure 10:
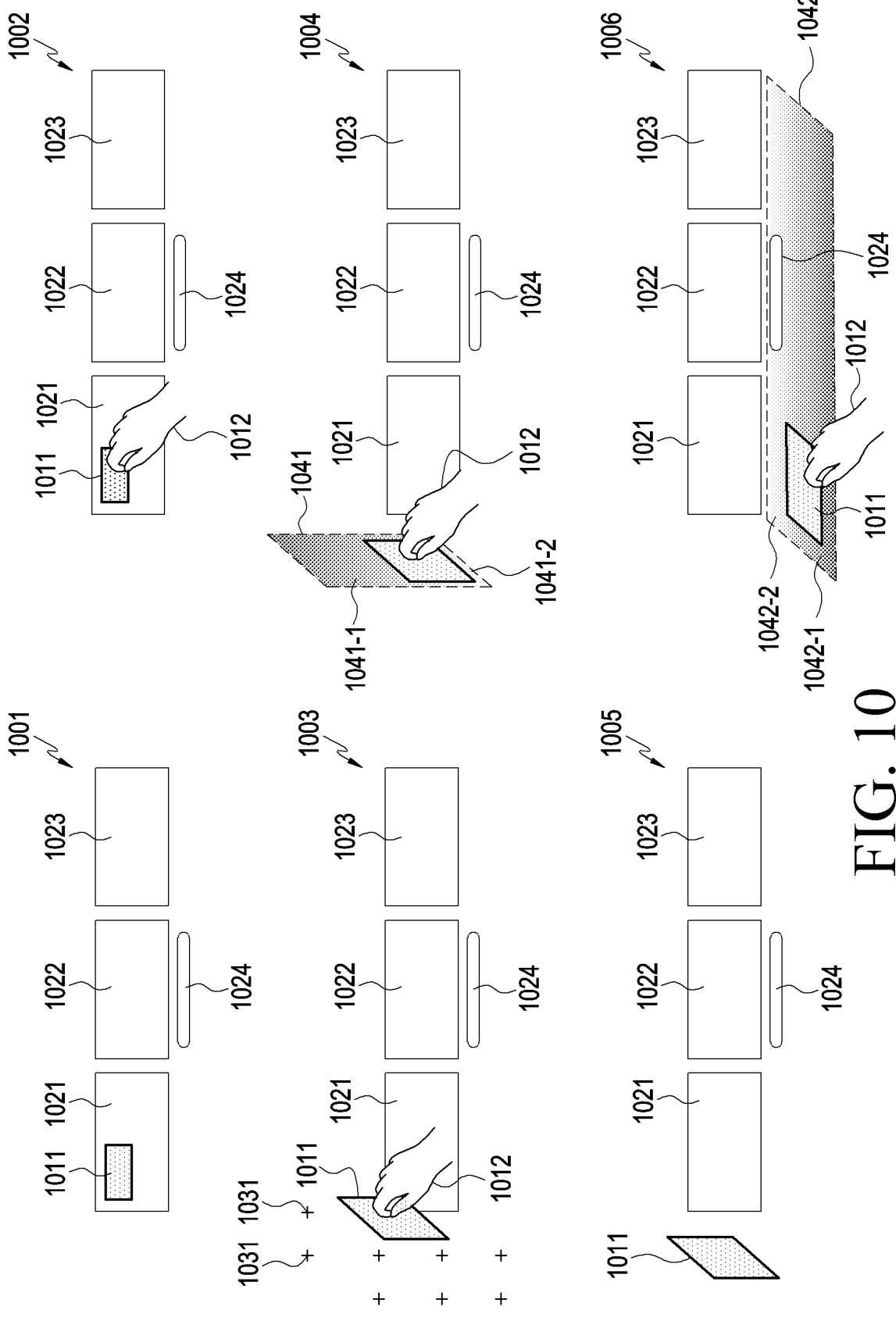
FIG. 10 is a diagram illustrating an example method of placing an object on a plurality of virtual planes according to an embodiment.

FIG. 10 is a diagram illustrating an example method of placing an object on a plurality of virtual planes according to various embodiments.

Referring to FIG. 10, in an embodiment, the processor 460 may display one or more objects on at least one window through the display 440 in a virtual space. For example, in reference numeral 1001, the processor 460 may display an object 1011 on at least one window (e.g., windows 1021, 1022, and 1023) (and task bar 1024) through the display 440 in the virtual space. In an embodiment, as shown in reference numeral 1001, the plurality of virtual planes (or the guides representing the plurality of virtual planes) may not be displayed through the display 440 while an execution screen of an application is displayed.

In an embodiment, the processor 460 may select the at least one object from among the objects displayed on the at least one window based on a designated input. For example, in reference numeral 1002, the processor 460 may select the object 1011 based on reception of an operation (hereinafter, referred to as "pinch and hold gesture") of maintaining a pinching state by the thumb and index finger after performing a pinching operation (e.g., pinch gesture) using the thumb and index finger, in a state where a pointer 1012 indicating a recognized user's hand is located at the position of the object 1011.

In an embodiment, the processor 460 may move the selected object based on an input for moving the selected object. For example, in reference numeral 1003, after the pinch and hold gesture for the object 1011 is input, the processor 460 may move the object 1011 based on the input (e.g., input for moving the object 1011 in a state where the pinch and hold gesture for the object 1011 is maintained) for moving the object 1011.

In an embodiment, in response to the input of a designated input (e.g., pinch and hold gesture) for the object, the processor 460 may cause the wearable electronic device 401 to enter a mode (hereinafter, referred to as "grid mode") capable of moving the object. However, an operation of causing the wearable electronic device 401 to enter the grid mode is not limited to the above-described example. For example, the processor 460 may cause the wearable electronic device 401 to operate in the grid mode based on an input of selecting the designated object. For example, the processor 460 may display a menu including an icon corresponding to a widget for causing the wearable electronic device 401 to enter the grid mode based on a designated gesture input (e.g., an open palm gesture). The processor 460 may cause the wearable electronic device 401 to enter the grid mode based on the selection of the icon. For example, when a user's hand gesture (e.g., user's hand gesture for moving the pointer 1012) is detected without the movement of the wearable electronic device 401, the processor 460 may cause the wearable electronic device 401 to operate in the grid mode.

In an embodiment, while the wearable electronic device 401 is operating in the grid mode (e.g., in response to the wearable electronic device 401 entering the grid mode), the processor 460 may display the plurality of virtual planes through the display 440. For example, while the wearable electronic device 401 is operating in the grid mode, as shown in reference numeral 1003, the processor 460 may display the guides indicating the plurality of virtual planes (e.g., an indication 1031) through the display 440. However, the disclosure is not limited thereto. For example, as shown in reference numeral 1003, while the wearable electronic device 401 is operating in the grid mode, the processor 460 may display the indication 1031 indicating the plurality of virtual planes (e.g., points where lines forming the guides intersect or indication indicating the points) through the display 440 based on the a distance between the moving object 1011 and the plurality of virtual planes being equal to or less than a designated distance.

In an embodiment, the processor 460 may display the plurality of virtual planes through the display 440, based on the object being moved on the one virtual guide of the plurality of virtual planes. For example, as shown in reference numeral 1004, based on the object 1011 being placed on a second virtual plane 1041, the processor 460 may opaquely display the second virtual plane 1041 through the display 440. In this case, the processor 460 may adjust the opacity of the plurality of virtual planes so that the opacity of a region 1041-2 corresponding to or adjacent to the at least one window is higher than that of the remaining region 1041-1 within the second virtual plane 1041, whereby the at least one window (e.g., window 1021) is not covered by the plurality of virtual planes (e.g., the second virtual plane 1041) through the display 440.

In an embodiment, the processor 460 may control the display 440 so that the plurality of virtual planes (or the guides representing the plurality of virtual planes) disappears after the object is moved to the one virtual plane of the plurality of virtual planes. For example, as shown in reference numeral 1005, after the object 1011 is moved to the one virtual plane of the plurality of virtual planes, the processor 460 may control the display 440 to display the object 1011 without displaying the plurality of virtual planes, based on an input for canceling the grid mode (e.g., gesture of spreading the thumb and index finger from the pinch and hold gesture).

In an embodiment, through reference numerals 1001 to 1005, the operation of moving the object displayed on the window to the second virtual plane (e.g., second virtual plane 1041) among the plurality of virtual planes has been described, but is not limited thereto. For example, as shown in reference numeral 1006, the processor 460 may move the object displayed on the window to a virtual plane (e.g., the first virtual plane 1042) different from the second virtual plane among the plurality of virtual planes, in addition to the second virtual plane 1041. In this case, the processor 460 may adjust the opacity of the plurality of virtual planes so that the opacity of a region 1042-2 corresponding to or adjacent to the at least one window is higher than that of the remaining region 1042-1 within the first virtual plane 1042, whereby the at least one window is not covered by the plurality of virtual planes through the display 440.

Figure 11A:
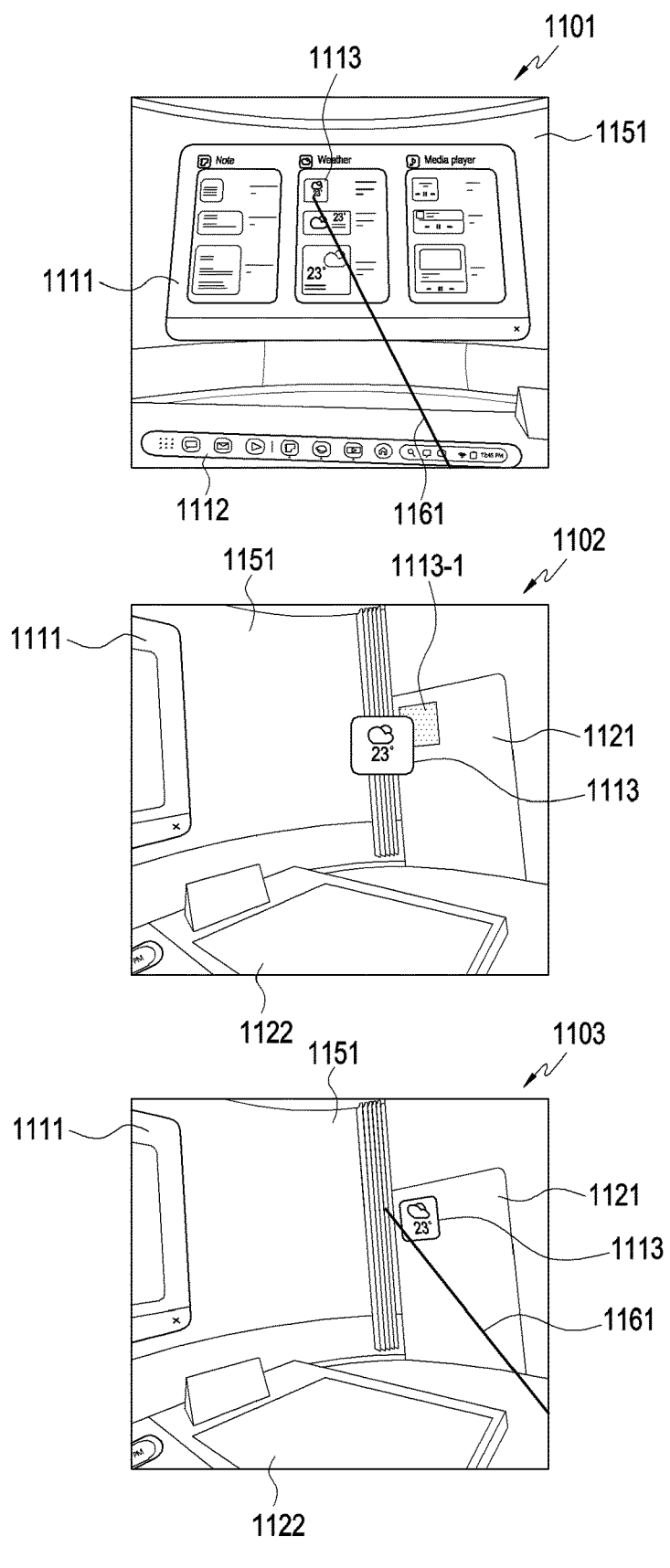
FIG. 11A is a diagram illustrating an example method of placing an object on a plurality of virtual planes while a first application is being executed according to an embodiment.

FIG. 11A is a diagram illustrating an example method of placing an object on a plurality of virtual planes while a first application is being executed according to an embodiment.

Referring to FIG. 11A, in an embodiment, while a first application (e.g., also referred to as an application providing a virtual work environment {"My Solo Work application"}) is being executed, based on an input, the processor 460 may display a screen including an object list through the display 440.

In an embodiment, the processor 460 may cause the wearable electronic device 401 to enter a grid mode when displaying the screen including the object list.

In an embodiment, as shown in reference numerals 1101, 1102 and 1103, while the wearable electronic device 401 is operating in the grid mode, the processor 460 may display a screen including a window 1111 including a plurality of objects (e.g., icons corresponding to widgets), a task bar 1112, plurality of virtual planes (e.g., a fourth virtual plane 1121, a first virtual plane 1122, and a second virtual plane (not shown)), and a scenery 1151 in a virtual space corresponding to the first application through the display 440.

In an embodiment, while the wearable electronic device 401 is operating in the grid mode, the processor 460 may display the guides representing the plurality of virtual planes (e.g., indication indicating points where lines forming the guides representing the plurality of virtual planes intersect) on the opaque plurality of virtual planes (e.g., the fourth virtual plane 1121, the first virtual plane 1122, and the second virtual plane (not shown)) through the display 440.

In an embodiment, as shown in reference numeral 1101, the processor 460 may select an object 1113 indicated by a virtual ray 1161 displayed from a virtual controller (not shown) representing a controller, based on an input to the controller received from the controller wirelessly connected through the communication module 410.

In an embodiment, as shown in reference numeral 1102, the processor 460 may move the object 1113 based on an input for moving the selected object 1113 (and an input for moving a user's FOV). When the object 1113 is adjacent to the plurality of virtual planes (e.g., the fourth virtual plane 1121) (e.g., when a distance between the current position of the object 1113 and the position of the fourth virtual plane 1121 is equal to or less than a designated distance), the processor 460 may display a guide (e.g., an indication 1113-1) indicating a region where the object 1113 is to be placed within the plurality of virtual planes through the display 440.

In an embodiment, as shown in reference numeral 1103, the processor 460 may place the selected object 1113 on one virtual plane of the plurality of virtual planes (e.g., the fourth virtual plane 1121). For example, as shown in reference numeral 1103, in a state in which the indication 1113-1 indicating the region where the object is to be placed within the plurality of virtual planes is displayed, the processor 460 may place the object 1113 on the one virtual plane (e.g., the fourth virtual plane 1121) of the plurality of virtual planes based on the input to the controller.

Although not shown in FIG. 11, in an embodiment, while the selected object 1113 is being moved, the processor 460 may place the object 1113 at a position prior to the movement on the window 1111 (e.g., move the object 1113 to the original position where the object 1113 is displayed), based on an input for canceling the operation of moving the object 1113 (e.g., an input for canceling the movement of the object input through the controller while the distance between the current position of the object 1113 and the position of the fourth virtual plane 1121 exceeds the designated distance).

In an embodiment, while the selected object 1113 is being moved, the processor 460 may change the opacity and/or color of the selected object 1113. For example, while the object 1113 is being moved, the processor 460 may display the object 1113 having a different opacity and/or color from the opacity and/or color of the object 1113 before the movement, through the display 440.

Figure 11B:
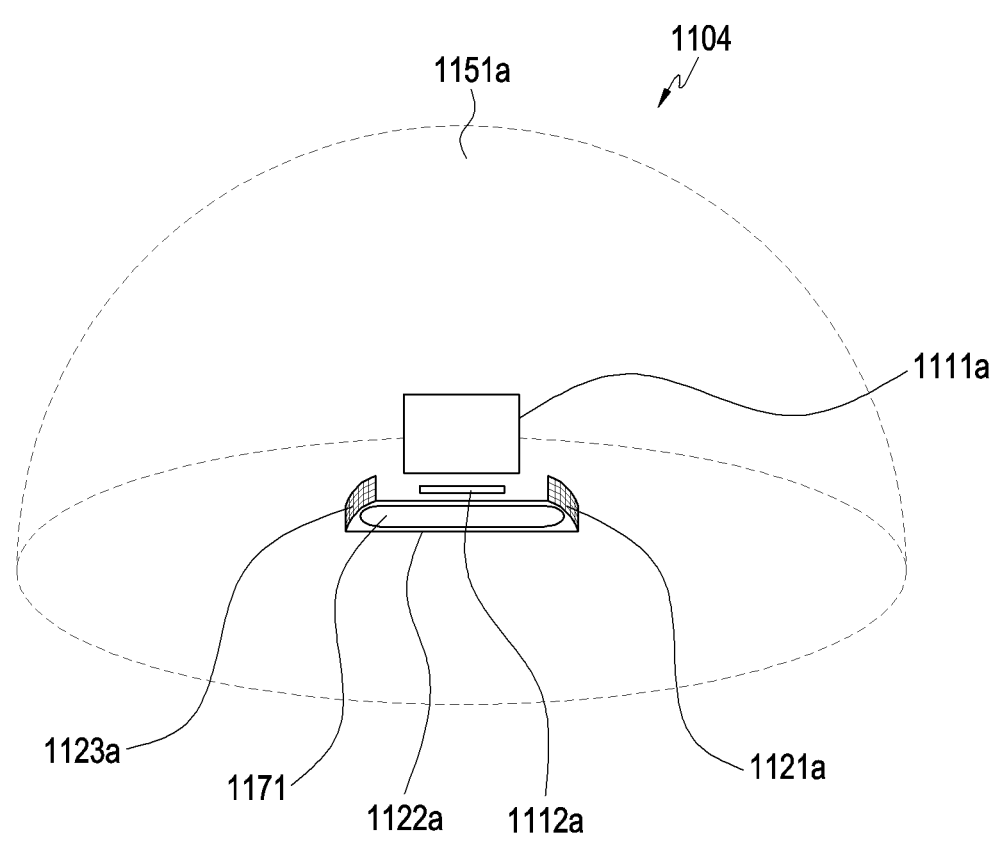
FIG. 11B is a diagram illustrating a structure of a virtual space of a first application according to an embodiment.

FIG. 11B is a diagram illustrating a structure of a virtual space of a first application according to an embodiment.

Referring to FIG. 11B, in an embodiment, reference numeral 1104 of FIG. 11B may indicate a virtual space of a first application (e.g., My Solo Work application).

In an embodiment, the first application may be set to have a virtual space including at least one window (and task bar), plurality of virtual planes, and a scenery. For example, the virtual space of the first application may include a window 1111a (and a task bar 1112a), a plurality of first surfaces 1121a, 1122a, and 1123a, and a scenery 1151a.

In an embodiment, the window 1111a and the task bar 1112a of FIG. 11B may correspond to (e.g., identical to) the window 1111 and the task bar 1112 of FIG. 11A, respectively. The plurality of virtual planes 1121a, 1122a, and 1123a of FIG. 11B may correspond to the plurality of virtual planes (e.g., the fourth virtual plane 1121, the first virtual plane 1122, and the second virtual plane {not shown}), respectively. The scenery 1151a of FIG. 11B may correspond to the scenery 1151 of FIG. 11A.

In an embodiment, in reference numeral 1104, reference numeral 1171 may denote a virtual desk for generating the first surface 1122a.

Figure 12:
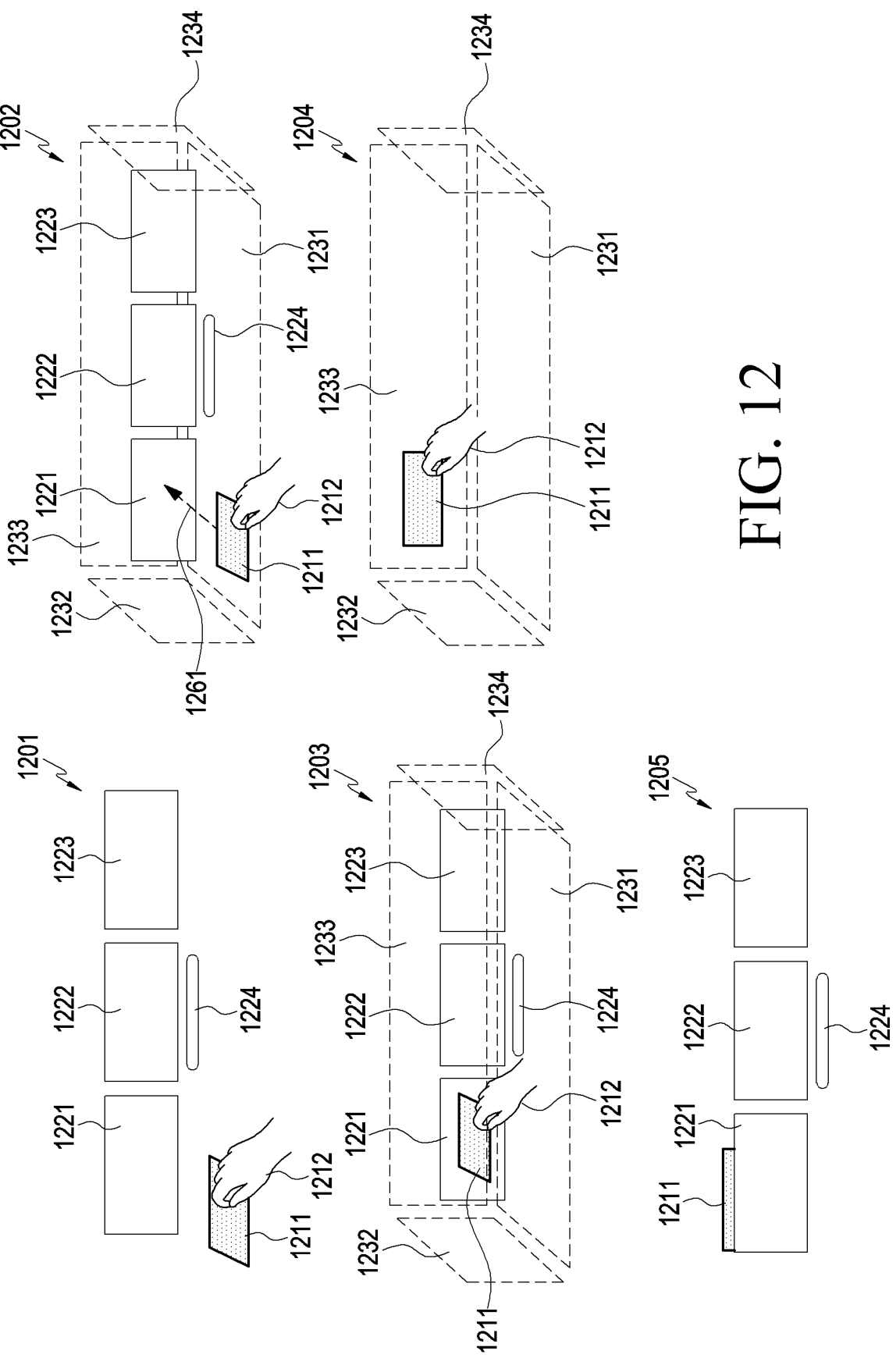
FIG. 12 is a diagram illustrating an example method of placing an object on a plurality of virtual planes according to an embodiment.

FIG. 12 is a diagram illustrating an example method of placing an object in a plurality of virtual planes according to an embodiment.

In an embodiment, FIG. 12 is a diagram illustrating an operation of moving an object placed in one virtual plane of plurality of virtual planes to another virtual plane of the plurality of virtual planes.

Referring to FIG. 12, in an embodiment, the processor 460 may display at least one window (and a task bar) and an object placed on the plurality of virtual planes in a virtual space through the display 440. For example, in reference numeral 1201, the processor 460 may display an object 1211 placed on a first virtual plane together with the at least one window (e.g., windows 1221, 1222, and 1223) (and task bar 1224) through the display 440 in the virtual space. In an embodiment, as shown in reference numeral 1201, the processor 460 may display the object 1211 placed on the first virtual plane through the display 440 without displaying the plurality of virtual planes (or the guides representing the plurality of virtual planes).

In an embodiment, the processor 460 may select an object to be moved based on a designated input for moving the object. For example, in reference numeral 1201, the processor 460 may select the object 1211 based on an input of a pinch and hold gesture while a pointer 1212 indicating a recognized user's hand is located at the position of the object 1211.

In an embodiment, the processor 460 may cause the wearable electronic device 401 to operate in a grid mode based on the pinch and hold gesture for the object 1211. The processor 460 may display the plurality of virtual planes (e.g., a first virtual plane 1231, a second virtual plane 1232, a third virtual plane 1233, and a fourth virtual plane 1234) through the display 440 in the virtual space as shown in reference numeral 1202 while the wearable electronic device 401 is being operating in the grid mode.

In an embodiment, as shown in reference numerals 1202 and 1203, the processor 460 may perform an operation of moving the object 1211 to the position of the third virtual plane 1233 covered by the windows 1221, 1222, and 1223 by moving the object 1211 in a direction indicated by an arrow 1261. The processor 460 may reduce the opacity (e.g., level of the opacity) of the windows 1221, 1222, and 1223 so that a user may easily perform an operation of placing the object 1223 on the third virtual plane 1233 while the object 1211 is moving to the position of the third virtual plane 1233 covered by the windows 1221, 1222, and 1223.

In an embodiment, as shown in reference numeral 1204, when the object 1211 is moved to the position of the third virtual plane 1233 covered by the windows 1221, 1222, and 1223, the processor 460 may opaquely display the windows 1221, 1222, and 1223 through the display 440.

In an embodiment, in reference numeral 1205, based on the grid mode being released (or cancelled) without displaying the plurality of virtual planes (e.g., the first virtual plane 1231, the second virtual plane 1232, the third virtual plane 1233, and the fourth virtual plane 1234) after the object 1211 is moved to the third virtual plane 1233 covered by the windows 1221, 1222, and 1223, the processor 460 may display the object 1211 placed on the plurality of virtual planes (e.g., the third virtual plane 1233) together with the windows 1221, 1222, and 1223 and the task bar 1224, through the display 440.

Figure 13:
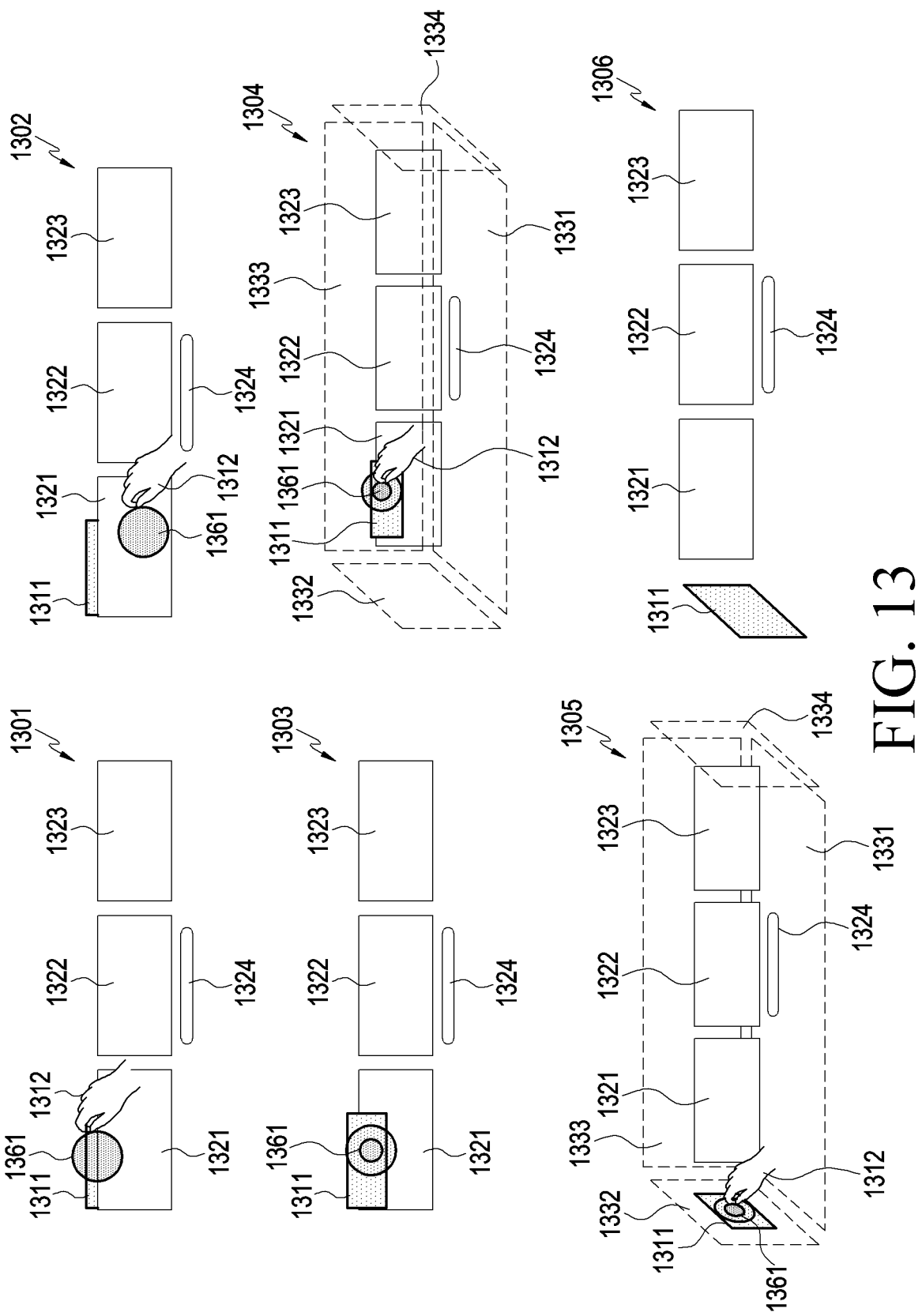
FIG. 13 is a diagram illustrating an example method of placing an object on a plurality of virtual planes according to an embodiment.

FIG. 13 is a diagram illustrating an example method of placing an object on a plurality of virtual planes according to an embodiment.

In an embodiment, FIG. 13 is a diagram illustrating an operation of moving an object placed on one virtual plane (e.g., a third virtual plane) of plurality of virtual planes to another virtual plane of the plurality of virtual planes.

Referring to FIG. 13, in an embodiment, the processor 460 may display at least one window (and task bar) and the object placed on the plurality of virtual planes in a virtual space through the display 440. For example, in reference numeral 1301, the processor 460 may display an object 1311 placed on the third virtual plane included in the plurality of virtual planes together with the at least one window (e.g., windows 1321, 1322, and 1323) (and task bar 1324) in the virtual space through the display 440. In an embodiment, as shown in reference numeral 1301, the processor 460 may display the object 1311 which is placed on the third virtual plane and is partially covered by the at least one window (e.g., window 1321) through the display 440 without displaying the plurality of virtual planes.

In an embodiment, the processor 460 may control the display 440 so that the object 1311 partially covered by the at least one window (e.g., window 1321) is not covered by the at least one window (e.g., to be hovered on one window) based on a designated input. For example, as shown in reference numeral 1302, in a state where a pointer 1312 indicating a recognized user's hand is positioned on a portion of the object 1311 that is not covered by the at least one window, based on a pinch and hold gesture for the portion of the object 1311, the processor 460 may control the display 440 so that the object 1311 is displayed on the at least one window. For example, as shown in reference numeral 1303, the processor 460 may control the display 440 so that the object 1311 is displayed on the at least one window, based on the pinch and hold gesture for the at least one window. In an embodiment, in FIG. 13, the processor 460 may display an indication 1361 indicating that a gesture is input by the user through the display 440.

In an embodiment, as shown in reference numeral 1303, the processor 460 may control the display 440 so that the object 1311 partially covered by the at least one window (e.g., window 1321) is displayed on the at least one window based on a designated input.

In an embodiment, the processor 460 may select an object to be moved based on a designated input. For example, in reference numeral 1304, after the object 1311 partially covered by the at least one window (e.g., window 1321) is displayed on the at least one window, in a state where the pointer 1312 indicating the recognized user's hand is located in the position of the object 1311, the processor 460 may select the object 1311 based on the input of the pinch and hold gesture.

In an embodiment, based on the pinch and hold gesture for the object 1311, the processor 460 may cause the wearable electronic device 401 to operate in a grid mode. As shown in reference numeral 1304, while the wearable electronic device 401 is operating in the grid mode, the processor 460 may display the plurality of virtual planes (e.g., a first virtual plane 1331, a second virtual plane 1332, a third virtual plane 1333, and a fourth virtual plane 1334) in the virtual space through the display 440.

In an embodiment, when the selected object 1311 is overlapped and displayed on the windows 1321, 1322, and 1323 while the wearable electronic device 401 is operating in the grid mode, the processor 460 may lower the opacity of the windows 1321, 1322, and 1323 or may opaquely display the windows 1321, 1322, and 1323, through the display 440.

In an embodiment, in reference numerals 1304 and 1305, based on an input for moving the object 1311, the processor 460 may move the object 1311 from the third virtual plane 1333 to the second virtual plane 1332. In an embodiment, the processor 460 may restore the opacity of the windows 1321, 1322, and 1323 when the object 1311 is moved to a space that does not overlap the windows 1321, 1322, and 1323.

In an embodiment, in reference numeral 1306, based on the grid mode being released after the object 1311 is moved to the second virtual plane 1332, the processor 460 may display the object 1311 placed on the second virtual plane 1332 together with the windows 1321, 1322, and 1323 and the task bar 1324 through the display 440 without displaying the plurality of virtual planes (or the guides representing the plurality of virtual planes).

Figure 14:
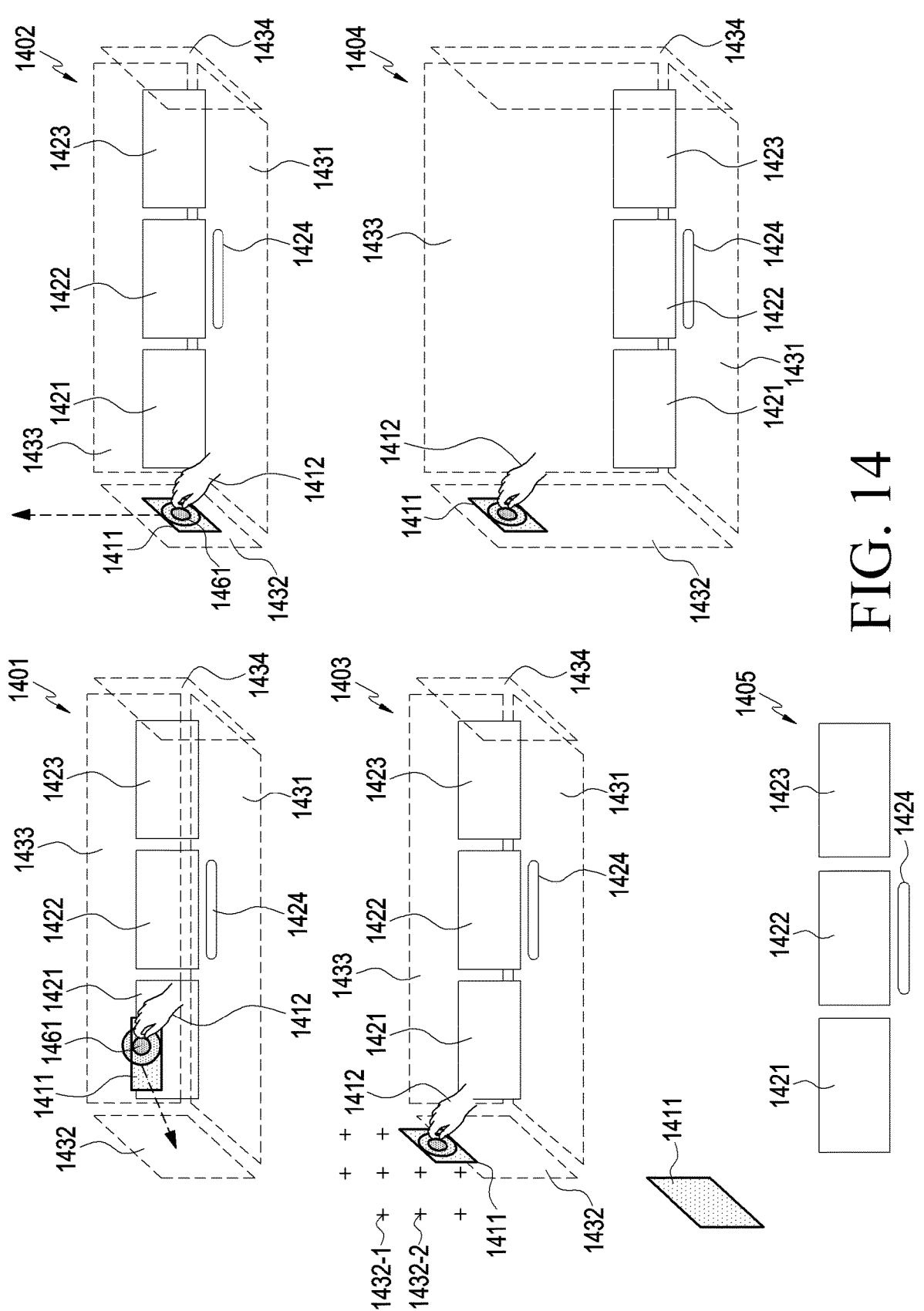
FIG. 14 is a diagram illustrating an example method of placing an object on a plurality of virtual planes according to an embodiment.

FIG. 14 is a diagram illustrating an example method of placing an object on a plurality of virtual planes according to an embodiment.

Referring to FIG. 14, in an embodiment, the processor 460 may select an object to be moved based on an input designated to move the object. For example, in reference numeral 1401, in a state in which an object 1411 is displayed on at least one window (e.g., windows 1421, 1422, and 1423) (and task bar 1424), the processor 460 may select the object 1411 based on an input of a pinch and hold gesture while a pointer 1412 indicating a recognized user's hand is located at a position of the object 1411.

In an embodiment, based on the pinch and hold gesture for the object 1411, the processor 460 may cause the wearable electronic device 401 to operate in a grid mode. While the wearable electronic device 401 is operating in the grid mode, as shown in reference numeral 1401, the processor 460 may display plurality of virtual planes (e.g., a first virtual plane 1431, a second virtual plane 1432, a third virtual plane 1433, and a fourth virtual plane 1434) through the display 440 in a virtual space.

In an embodiment, when the selected object 1411 is overlapped and displayed on the windows 1421, 1422, and 1423 while the wearable electronic device 401 is operating in the grid mode, the processor 460 may lower the opacity of the windows 1421, 1422, and 1423 or may opaquely display the windows 1421, 1422, and 1423, through the display 440.

In an embodiment, in reference numerals 1401 and 1402, the processor 460 may move the object 1411 from the third virtual plane 1433 to the second virtual plane 1432 based on an input for moving the object 1411. In an embodiment, when the object 1411 is moved to a space that does not overlap the windows 1421, 1422, and 1423, the processor 460 may restore the opacity of the windows 1421, 1422, and 1423.

In an embodiment, in reference numerals 1402 and 1403, in a state in which the object 1411 is located on the second virtual plane 1432, the processor 460 may move the object to a position on the same face as the second virtual plane 1432, out of the second virtual plane 1432. The processor 460 may increase the size (e.g., the area) of the plurality of virtual planes (e.g., the second virtual plane 1432, the third virtual plane 1433, and the fourth virtual plane 1434) based on a position (and a direction in which the object 1411 is moved) where the object 1411 is located. For example, the processor 460 may increase the size of the plurality of virtual planes (e.g., the second virtual plane 1432, the third virtual plane 1433, and the fourth virtual plane 1434) so that the plurality of virtual planes includes the position where the object 1411 is located. After increasing the size of the plurality of virtual planes (e.g., the second virtual plane 1432, the third virtual plane 1433, and the fourth virtual plane 1434), as shown in reference numeral 1403, the processor 460 may display the guide (e.g., an indication 1432-1 and 1432-2 indicating that the size of the second virtual plane can be increased) indicating the second virtual plane with the increased size through the display 440.

In an embodiment, as shown in reference numeral 1404, based on the object 1411 being moved to one virtual plane with the increased size among the plurality of virtual planes (e.g., the first virtual plane 1431, the second virtual plane

1432, the third virtual plane 1433, and the fourth virtual plane 1434), the processor 460 may display the plurality of virtual planes (e.g., the first virtual plane 1431, the second virtual plane 1432, the third virtual plane 1433, and the fourth virtual plane 1434) with the increased size through the display 440.

In an embodiment, in reference numeral 1405, based on the grid mode being released after the object 1411 is moved to the second virtual plane 1432, the processor 460 may display the object 1411 placed on the second virtual plane 1432 together with the windows 1421, 1422, and 1423 and the task bar 1424 through the display 440 without displaying the plurality of virtual planes.

In an embodiment, in FIG. 14, the processor 460 may display an indication 1461 indicating that a gesture by the user is input, through the display 440.

Figure 15:
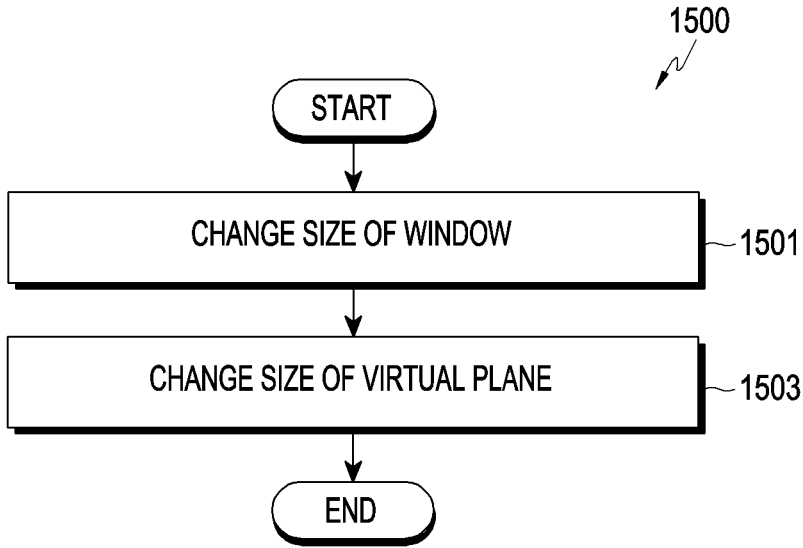
FIG. 15 is a flowchart illustrating an example method of changing a size of a plurality of virtual planes according to an embodiment.

FIG. 15 is a flowchart 1500 illustrating an example method of changing a size of a plurality of virtual planes according to an embodiment.

Referring to FIG. 15, in operation 1501, in an embodiment, the processor 460 may change a size of a window based on an input. For example, the processor 460 may display the window through the display 440. The processor 460 may expand or contract the size of the window (e.g., the area of the window) based on an input for changing the size of the window.

In an embodiment, when the size of the window is changed, the processor 460 may change the size and/or position of at least one object among one or more objects displayed on the window.

In operation 1503, in an embodiment, the processor 460 may change the size of a virtual plane based on the size of the window.

In an embodiment, the processor 460 may change the size (e.g., area of the plurality of virtual planes) of the plurality of virtual planes to have a size corresponding to the changed size of the window. For example, the processor 460 may increase the size of the plurality of virtual planes to correspond to the increased size of the window, based on the increased size of the window. For example, the processor 460 may increase the size of the plurality of virtual planes to correspond to the reduced size of the window, based on the reduced size of the window.

In an embodiment, the processor 460 may change the size of the plurality of virtual planes based on the size of the window, based on whether the object is placed on the plurality of virtual planes. For example, when the object is not placed on the plurality of virtual planes, the processor 460 may change the size of the plurality of virtual planes to have a size corresponding to the changed window size. For example, when the object is placed on the plurality of virtual planes, the processor 460 may maintain the size of the plurality of virtual planes even if the size of the window is changed. For example, the processor 460 may increase the size of the plurality of virtual planes when the size of the window is increased in a state where the object is placed on the plurality of virtual planes. For example, the processor 460 may maintain the size of the plurality of virtual planes when the size of the window is reduced in the state where the object is placed on the plurality of virtual planes.

In an embodiment, the processor 460 may change the guides representing the plurality of virtual planes based on the change in the size of the plurality of virtual planes. For example, when the size of the plurality of virtual planes is increased, the processor 460 may maintain intervals between lines which form the guides representing the plurality of virtual planes and may increase the number of the lines. For example, when the size of the plurality of virtual planes is reduced, the processor 460 may maintain the intervals between the lines included in the plurality of virtual planes and may reduce the number of the lines. For example, when the size of the plurality of virtual planes is increased, the processor 460 may maintain the number of the lines included in the plurality of virtual planes and may increase the intervals between the lines. For example, when the size of the plurality of virtual planes is reduced, the processor 460 may maintain the number of the lines included in the plurality of virtual planes and may reduce the intervals between the lines.

In an embodiment, when the size of the plurality of virtual planes is changed, the processor 460 may change the size and/or position of at least one object among the one or more objects placed on the plurality of virtual planes.

Figure 16:
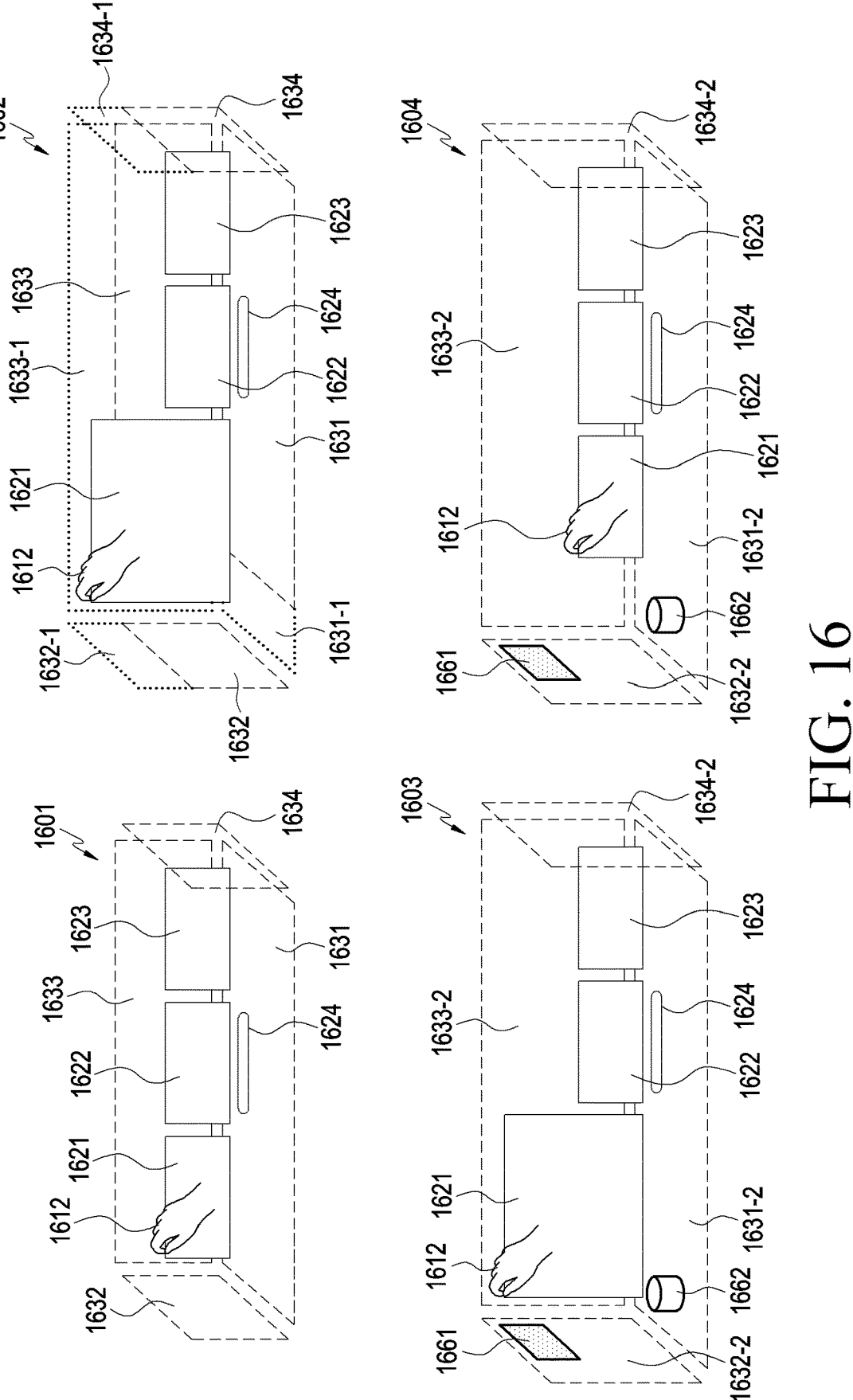
FIG. 16 is a diagram illustrating an example method of changing a size of a plurality of virtual planes according to an embodiment.

FIG. 16 is a diagram illustrating an example method of changing a size of a plurality of virtual planes according to an embodiment.

Referring to FIG. 16, in an embodiment, in reference numeral 1601, the processor 460 may display at least one window (e.g., windows 1621, 1622, and 1623) (and task bar 1624) through the display 440 in a virtual space including plurality of virtual planes (e.g., a first virtual plane 1631, a second virtual plane 1632, a third virtual plane 1633, and a fourth virtual plane 1634). The processor 460 may receive an input for increasing the size of the window 1621 of the at least one window using a pointer 1612.

In an embodiment, as shown in reference numeral 1601 and reference numeral 1602, the processor 460 may increase the size of the plurality of virtual planes (e.g., the first virtual plane 1631, the second virtual plane 1632, the third virtual plane 1633, and the fourth virtual plane 1634) along with an increase in the window 1621. For example, in reference numeral 1602, reference numerals 1631-1, 1632-1, 1633-1, and 1634-1 denote the increased areas of the 1-1 1631, the second virtual plane 1632, the third virtual plane 1633, and the fourth virtual plane 1634, respectively.

In an embodiment, in reference numeral 1603, the processor 460 may display the at least one window (e.g., windows 1621, 1622, and 1623) (and task bar 1624) through the display 440 in a virtual space including plurality of virtual planes (e.g., a first virtual plane 1631-2, a second virtual plane 1632-2, a third virtual plane 1633-2, and a fourth virtual plane 1634-2) on which the one or more objects 1661 and 1662 are placed. The processor 460 may receive an input for reducing the size of the window 1621 among the at least one window using the pointer 1612.

In an embodiment, as shown in reference numerals 1603 and 1604, the processor 460 may maintain the size of the plurality of virtual planes even if the size of the window 1621 is reduced in a state in which the one or more objects 1661 and 1662 are placed on the plurality of virtual planes.

Figure 17:
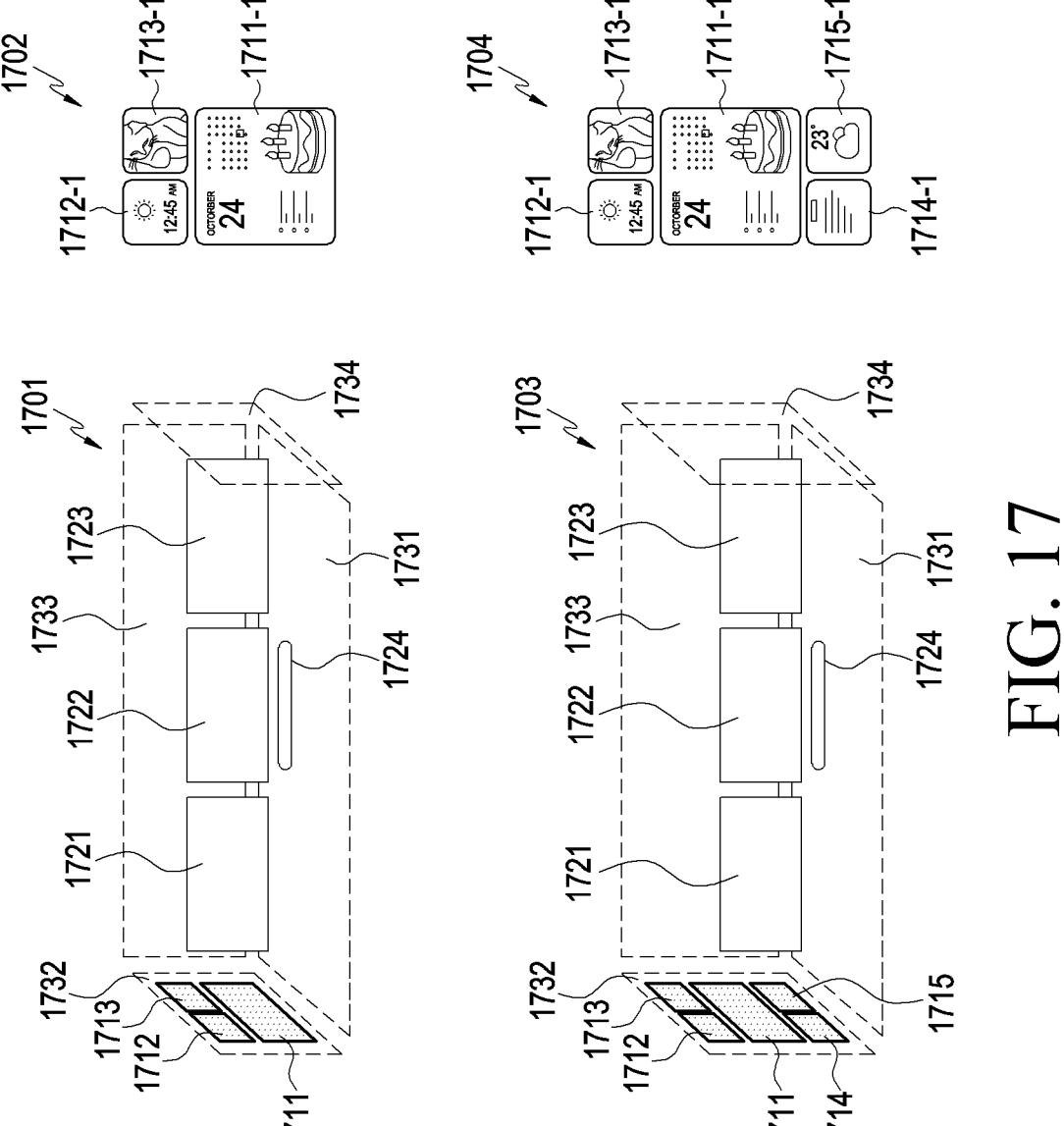
FIG. 17 is a diagram illustrating an example method of changing a size of a plurality of virtual planes according to an embodiment.

FIG. 17 is a diagram illustrating an example method of changing a size of a plurality of virtual planes according to an embodiment.

Referring to FIG. 17, in an embodiment, in reference numeral 1701, the processor 460 may display objects 1711, 1712, and 1713 placed on a plurality of virtual planes (e.g., a second virtual plane 1732) and windows 1721, 1722, and 1723 (and task bar 1724) through the display 440.

In an embodiment, in reference numeral 1702, objects 1711-1, 1712-1, and 1713-1 may be objects obtained by enlarging the objects 1711, 1712, and 1713 placed on the plurality of virtual planes (e.g., the second virtual plane 1732), respectively.

In an embodiment, based on an input for additionally placing one or more objects on the plurality of virtual planes (e.g., the second virtual plane 1732), the processor 460 may increase the size (e.g., area) of the plurality of virtual planes (e.g., the second virtual plane 1732) and may place one or more objects 1714 and 1715 on the plurality of virtual planes (e.g., the second virtual plane 1732) with the increased size. For example, the processor 460 may receive an input for placing the one or more objects 1714 and 1715 additionally on the plurality of virtual planes (e.g., the second virtual plane 1732). In response to the reception of the input, the processor 460 may confirm that the one or more objects 1714 and 1715 cannot be placed within the current plurality of virtual planes (e.g., the second virtual plane 1732) based on the current size of the plurality of virtual planes (e.g., the second virtual plane 1732). For example, in response to the reception of the input, the processor 460 may confirm that the size of the current plurality of virtual planes (e.g., the second virtual plane 1732) is smaller than a size required to additionally place the one or more objects 1714 and 1715 on the current plurality of virtual planes (e.g., the second virtual plane 1732) based on the current size of the plurality of virtual planes (e.g., the second virtual plane 1732). Based on identifying that the one or more objects 1714 and 1715 cannot be additionally placed within the current plurality of virtual planes (e.g., the second virtual plane 1732), the processor 460 may increase the size of the plurality of virtual planes (the second virtual plane 1732).

In an embodiment, the processor may increase the size of the plurality of virtual planes (e.g., the second virtual plane 1732), and may then additionally place the one or more objects 1714 and 1715 on the increased plurality of virtual planes (e.g., the second virtual plane 1732).

In an embodiment, in reference numeral 1704, objects 1711-1, 1712-1, 1713-1, 1714-1, and 1715-1 may be, respectively, objects obtained by enlarging the objects 1711, 1712, 1713, 1714, and 1715 placed on the plurality of virtual planes (e.g., the second virtual plane 1732).

Figure 18:
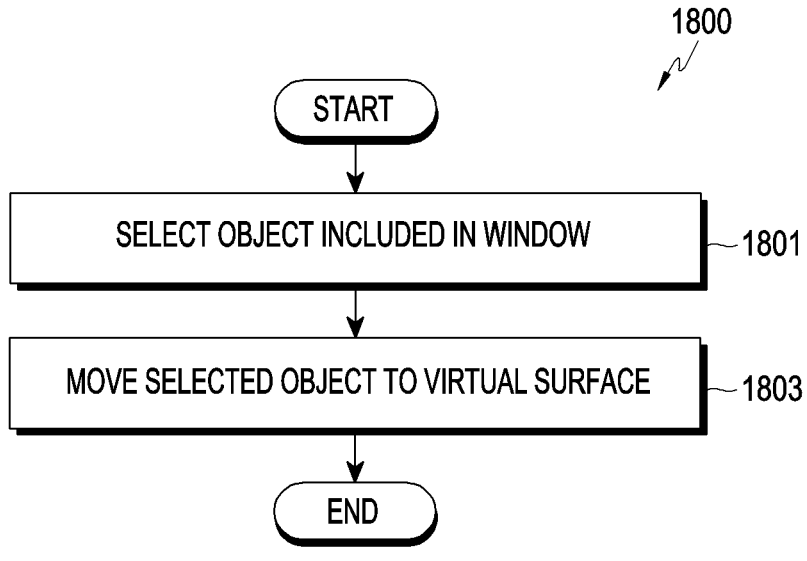
FIG. 18 is a flowchart illustrating an example method of placing an object on a virtual surface according to an embodiment.

FIG. 18 is a flowchart 1800 illustrating an example method of placing an object on a virtual surface according to an embodiment.

Referring to FIG. 18, in operation 1801, in an embodiment, the processor 460 may select an object included in a window based on a designated input.

In an embodiment, the processor 460 may display a window including one or more objects through the display 440 in a virtual space (e.g., virtual space corresponding to an application) including a virtual surface (space grid).

In an embodiment, while the window including the one or more objects is being displayed, the processor 460 may select the at least one object based on a designated input.

In an embodiment, the processor 460 may select the at least one object based on an input received from a controller wirelessly (or wiredly) connected to the wearable electronic device 401 through the communication module 410. For example, the processor 460 may receive information corresponding to the movement of the controller from the controller wirelessly connected through the communication module 410. The processor 460 may confirm a position indicated by a virtual ray displayed from a virtual controller that represents the controller and is moved by the movement of the controller, based on the received information. The processor 460 may select an object displayed at the position indicated by the virtual ray, based on reception of an input that is input to the controller, from the controller through the communication module 410.

In an embodiment, the processor 460 may select the object based on movement of a user's hand. For example, the processor 460 may recognize the movement of the user's hand based on an image acquired through a camera. The processor 460 may display a pointer indicating the recognized hand (or movement and/or gesture of the recognized hand) through the display 440. The processor 460 may select an object displayed on a position of the pointer, based on an input of a designated gesture (e.g., pinch gesture representing a pinching operation using the thumb and index finger) in a state in which the pointer is located on the object (e.g., a state in which the pointer is overlapped and displayed on the object).

However, a method of selecting at least one object based on a designated input while the window including the one or more objects is being displayed is not limited to the above-described examples. For example, the processor 460 may select, from a mouse and/or keyboard wirelessly (wiredly) connected to the wearable electronic device 401 through the communication module 410, the object displayed on the window based on an input that is input to the mouse and/or keyboard.

In operation 1803, in an embodiment, the processor 460 may move the selected object to the virtual surface based on an input for moving the selected object. For example, the processor 460 may place the selected object on the virtual surface based on the input for moving the selected object displayed on the window.

In an embodiment, based on the object displayed on the window being selected, the processor 460 may control the display 440 so that a guide representing the virtual surface (or the virtual surface) is displayed on the virtual space. For example, the processor 460 may display the guide representing the virtual surface (e.g., an indication indicating points where lines forming the virtual surface intersect) on the plurality of virtual planes in the virtual space. For example, when displaying the virtual surface, the processor 460 may opaquely display the virtual surface and may display the indication indicating the points on the opaquely displayed virtual surface, through the display 440. For example, when displaying the virtual surface, the processor 460 may opaquely display a designated panel (e.g., a region where the object can be placed on the virtual surface) through the display 440 so that the object can be placed on the virtual surface. For example, when displaying the virtual surface, the processor 460 may display lines (e.g., lines 741-1 and 741-2) forming the guide representing the virtual surface through the display 440.

In an embodiment, while the virtual surface is being displayed, the processor 460 may move the selected object to the virtual surface based on the input for moving the selected object.

In an embodiment, the processor 460 may control the display 440 so that the virtual surface disappears after the selected object is moved to the virtual surface.

FIG. 18 illustrates an example operation of moving the object included in the window to the virtual surface, but is not limited thereto. For example, the processor 460 may move an object included in the task bar to the virtual surface by performing an operation at least partially the same as or similar to an operation of moving the object included in the window to the virtual surface.

Hereinafter, the operation of placing the object on the virtual surface will be described in more detail with reference to FIGS. 19, 20A, and 20B.

Figure 19:
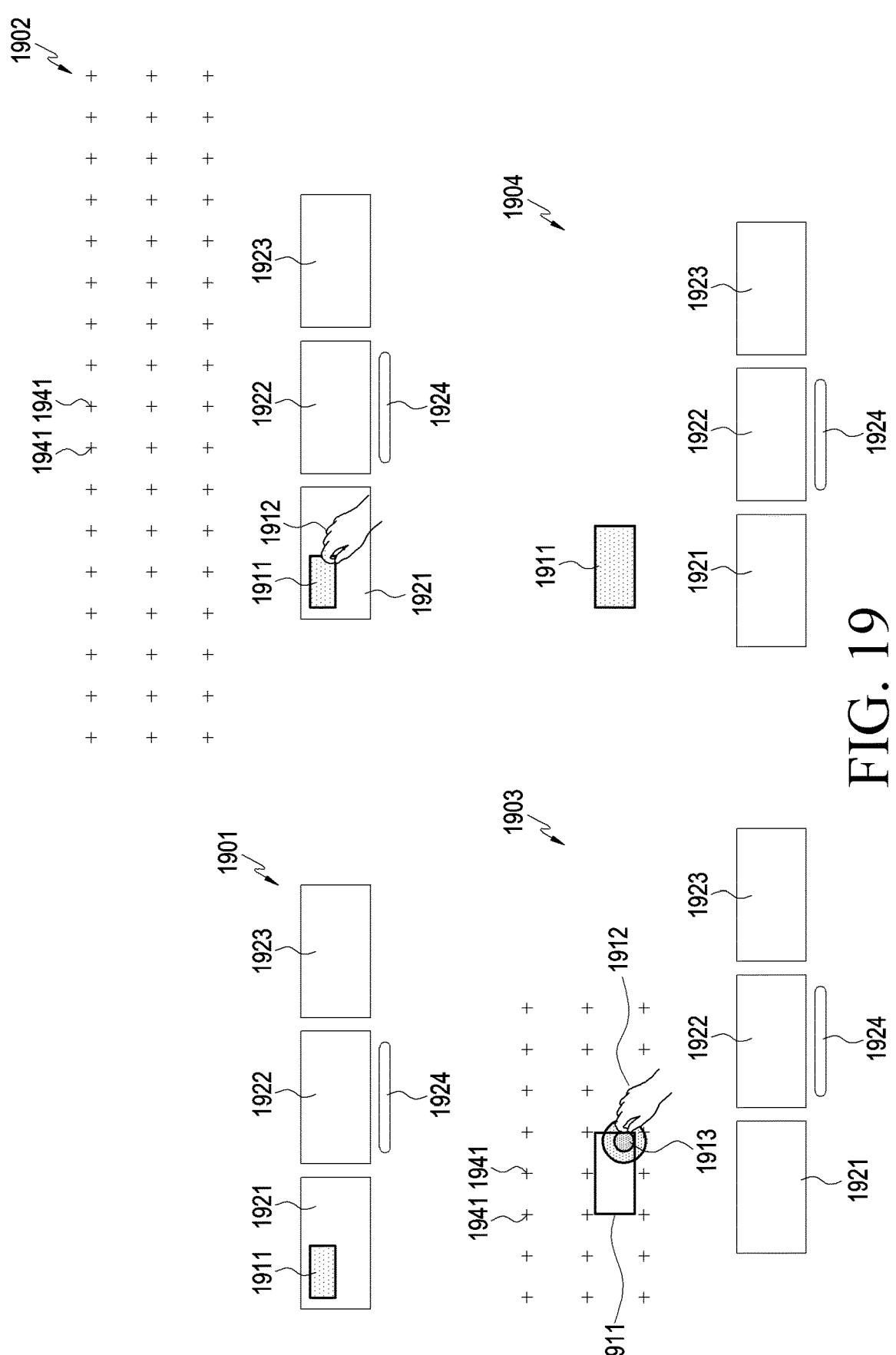
FIG. 19 is a diagram illustrating an example method of placing an object on a virtual surface according to an embodiment.

FIG. 19 is a diagram illustrating an example method of placing an object on a virtual surface according to an embodiment.

Referring to FIG. 19, in an embodiment, the processor 460 may display one or more objects on at least one window through the display 440 in a virtual space. For example, in reference numeral 1901, the processor 460 may display an object 1911 on at least one window (e.g., windows 1921, 1922, and 1923) (and task bar 1924) through the display 440 in a virtual space. In an embodiment, as shown in reference numeral 1901, while an application is being executed in an execution screen, a virtual surface (or a guide representing the virtual surface) may not be displayed through the display 440.

In an embodiment, the processor 460 may select an object among objects displayed on the at least one window based on a designated input. For example, in reference numeral 1902, the processor 460 may select an object 1911 based on an input of a pinch and hold gesture in a state in which a pointer 1912 indicating a recognized user's hand is located on the position of the object 1911.

In an embodiment, in response to the input of the designated input (e.g., pinch and hold gesture) for the object 1911, the processor 460 may cause the wearable electronic device 401 to enter a grid mode to move the object.

In an embodiment, while the wearable electronic device 401 is operating in the grid mode (e.g., in response to the wearable electronic device 401 entering the grid mode), the processor 460 may display the virtual surface through the display 440. For example, while the wearable electronic device 401 is operating in the grid mode, as shown in reference numeral 1902, the processor 460 may display the guide (e.g., an indication 1941 representing points where lines forming the virtual surface intersect) representing the virtual surface through the display 440.

In an embodiment, the processor 460 may move the selected object based on an input for moving the selected object. For example, in reference numeral 1903, based on the input for moving the object 1911 (e.g., an input for moving the object 1911 while maintaining the pinch and hold gesture for the object 1011) after the pinch and hold gesture for the object 1911 is input, the processor 460 may move the object 1911.

In an embodiment, the processor 460 may control the display 440 so that the virtual surface disappears after the object is moved to the virtual surface. For example, in reference numeral 1904, after the object 1911 is moved to the virtual surface, the processor 460 may control the display 440 to display the object 1911 without displaying the virtual surface, based on an input for releasing the grid mode (e.g., gesture of spreading the thumb and index finger from the pinch and hold gesture).

In an embodiment, in FIG. 19, the processor 460 may display an indication 1913 indicating that a gesture by the user is input, through the display 440.

Figure 20A:
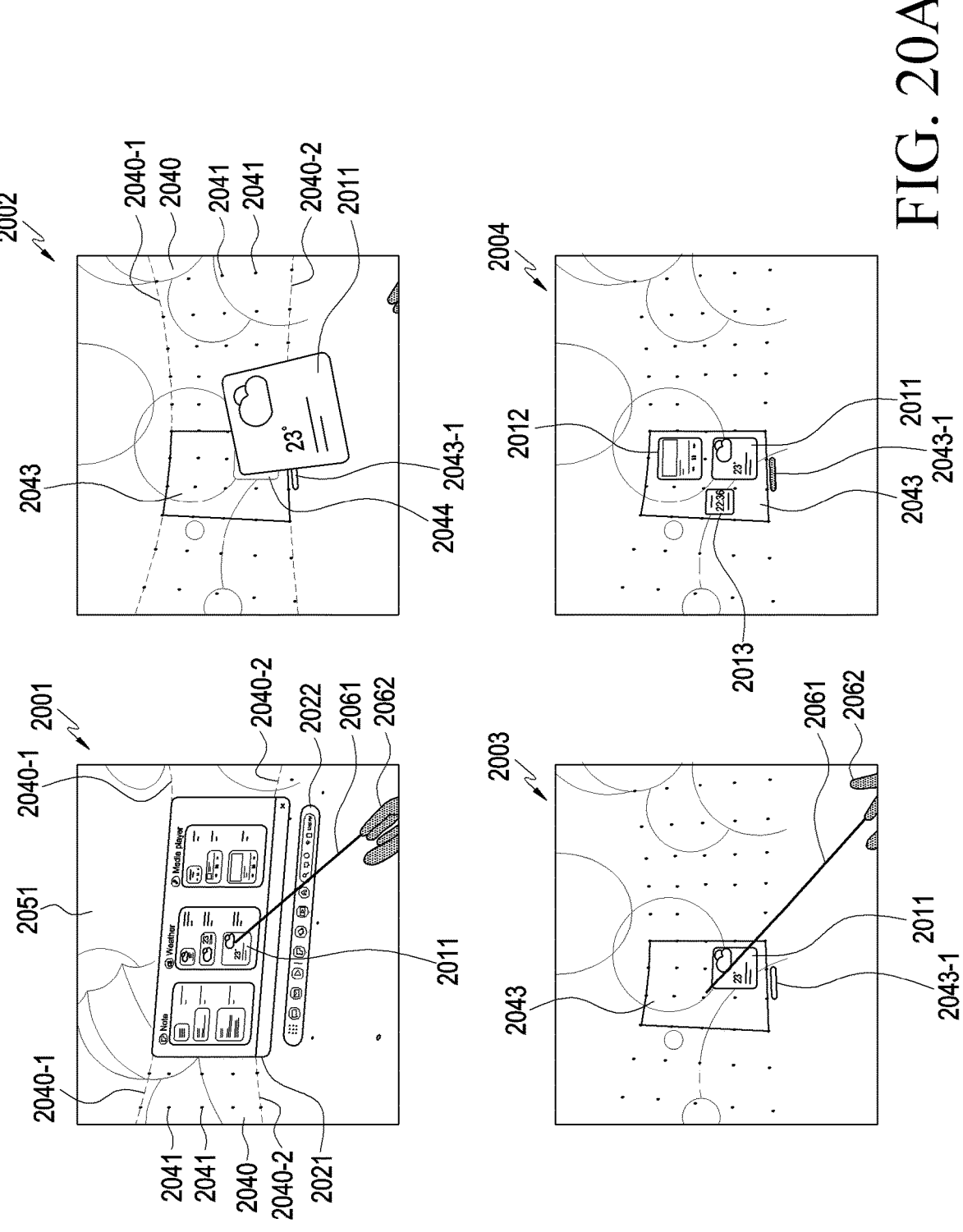
FIG. 20A is a diagram illustrating an example method of placing an object on a virtual surface while a second application is being executed according to an embodiment.

FIG. 20A is a diagram illustrating an example method of placing an object on a virtual surface while a second application is being executed according to an embodiment.

Referring to FIG. 20A, in an embodiment, while an application for displaying a home screen is being executed, the processor 460 may display a screen including an object list (or a home screen) through the display 440.

In an embodiment, when displaying the screen including the object list, the processor 460 may cause the wearable electronic device 401 to enter a grid mode.

In an embodiment, in reference numeral 2001, while the wearable electronic device 401 is operating in the grid mode, the processor 460 may display a screen including a window 2021 including a plurality of objects (e.g., icons corresponding to widgets), a task bar 2022, an indication 2041 indicating a virtual surface 2040 (e.g., surface indicated by dotted lines 2040-1 and 2040-2), and a scenery 2051 through the display 440 in a virtual space corresponding to the application.

In an embodiment, as shown in reference numeral 2002, while the wearable electronic device 401 is operating in the grid mode, the processor 460 may opaquely display a designated panel 2043 so that the object can be placed within the virtual surface 2040.

In an embodiment, in reference numeral 2001, the processor 460 may select an object 2011 indicated by a virtual ray 2061 displayed from a virtual controller 2062 indicating a controller, based on an input to the controller received from the controller wirelessly connected through the communication module 410.

In an embodiment, in reference numerals 2001 and 2002, the processor 460 may move the object 2011 based on an input for moving the selected object 2011 (and input for moving a FOV of the wearable electronic device 401).

In an embodiment, as shown in reference numeral 2002, when the object 2011 is adjacent to the panel 2043 (e.g., a distance between the current position of the object 2011 and the panel 2043 is equal to or less than a designated distance), the processor 460 may display an indication 2044 indicating a region where the object 2011 is to be placed within the panel 2043, through the display 440.

In an embodiment, while the object 2011 is being moved, the processor 460 may change the opacity and/or color of the selected object 2011. For example, while the object 2011 is being moved, the processor 460 may display the object 2011 having opacity and/or color different from the opacity and/or color of the object 2011 before the movement, through the display 440.

In an embodiment, the processor 460 may place the object 2011 on the virtual surface 2040. For example, in reference numeral 2003, in a state in which the indication 2044 indicating the region where the object 2011 is to be placed within the panel 2043 of the virtual surface 2040 is displayed, the processor 460 may place the object 2011 in a region indicated by the indication 2044 within the panel 2043 based on an input to the controller.

In an embodiment, the processor 460 may change the position of the panel 2043 within the virtual surface 2040 based on an input for an object 2043-1 displayed adjacent to the panel 2043.

In an embodiment, as shown in reference numeral 2004, the processor 460 may place additional objects 2012 and 2013 within the panel 2043 of the virtual surface 2040 based on the input.

In an embodiment, the processor 460 may adjust (e.g., increase or reduce) the size of the panel 2043. For example, the processor 460 may increase the size of the panel 2043 based on confirming that at least one object cannot be additionally placed in a state in which one or more objects are placed within the panel 2043. In an embodiment, the processor 460 may increase the number of panels 2043 displayed on the virtual surface 2040. For example, based on confirming that at least one object cannot be additionally placed in a state in which one or more objects are placed in the panel 2043, the processor 460 may additionally generate a panel having the same size as the panel 2043. The processor 460 may additionally place at least one object within the additionally generated panel.

Although not illustrated in FIG. 20A, in an embodiment, while the selected object 2011 is being moved, the processor 460 may place (e.g., move the object 2011 to a original position where the object 2011 is displayed) the object 2011 at a position on the window 2021 before the movement based on an input for releasing the movement of the object 2011 (e.g., input for releasing the movement of the object input through the controller in a state where the distance between the current position of the object 2011 and the panel 2043 exceeds a designated distance).

Although not illustrated in FIG. 20A, in an embodiment, when the selected object 2011 is placed on the panel 2043, the processor 460 may change the size and/or position of the object 2011 within the panel 2043 within the panel 2043 based on the input for the object 2011.

Figure 20B:
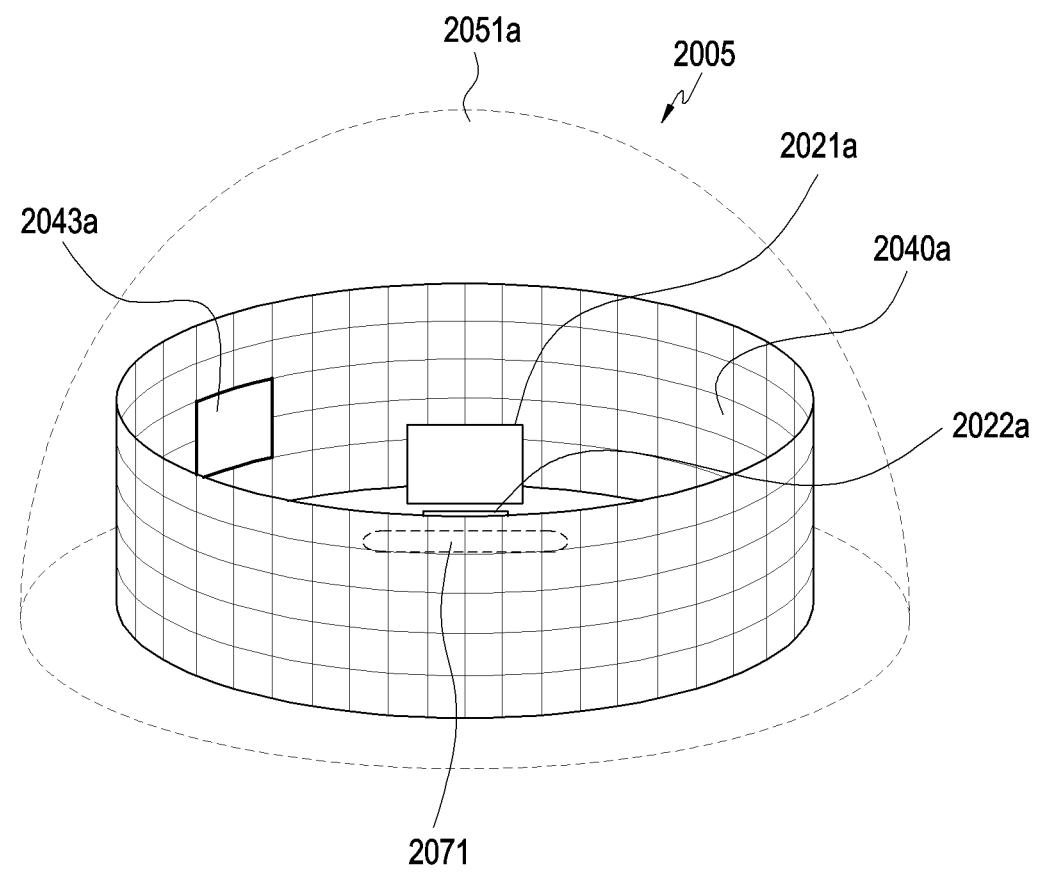
FIG. 20B is a diagram illustrating a structure of a virtual space of a second application according to an embodiment.

FIG. 20B is a diagram illustrating a structure of a virtual space of a second application according to an embodiment.

Referring to FIG. 20B, in an embodiment, reference numeral 2005 of FIG. 20B may indicate a virtual space of a first application (e.g., application for a home screen).

In an embodiment, a second application may be set to have a virtual space including at least one window (and task bar), a virtual surface, and a scenery. For example, the virtual space of the second application may include a window 2021a (and a task bar 2022a), a virtual surface 2040a, and a scenery 2051a.

In an embodiment, the window 2021a and the task bar 2022a of FIG. 20B may correspond to (e.g., identical to) the window 2021 and the task bar 2022 of FIG. 20A, respectively.

In an embodiment, the virtual surface 2040a of FIG. 20B may correspond to the virtual surface 2040 of FIG. 20A. In FIG. 20B, a designated panel 2043a displayed on the virtual surface 2040a may correspond to the designated panel 2043 of FIG. 20A.

In an embodiment, when moving the object (e.g., the object 2011 of FIG. 20A) placed on the designated panel 2043a to the window 2021a, the processor 460 may change the size of the object set in the coordinate system of the virtual space. For example, a distance between the virtual surface 2040a and the user may be greater than a distance between the window 2021a and the user. When the object is moved from the designated panel 2043a to the window 2021a while the size of the object placed on the designated panel 2043a of the virtual surface 2040a in the virtual space, an area occupied by the object on the window 2021a may be too large. When moving the object placed on the designated panel 2043a is moved to the window 2021a, the processor 460 may place a reduced object of the object placed on the designated panel 2043a, in the widow 2021a. For example, when moving the object placed on the designated panel 2043a to the window 2021a, the processor 460 may place an object having a size reduced from the size (e.g., a size set in the coordinate system of the virtual space) of the object placed on the designated panel 2043a, in the window 2021a.

In an embodiment, the scenery 2051a of FIG. 20B may correspond to the scenery 2051 of FIG. 20A.

In an embodiment, in reference numeral 2005, reference numeral 2071 may indicate a virtual desk.

Figure 21:
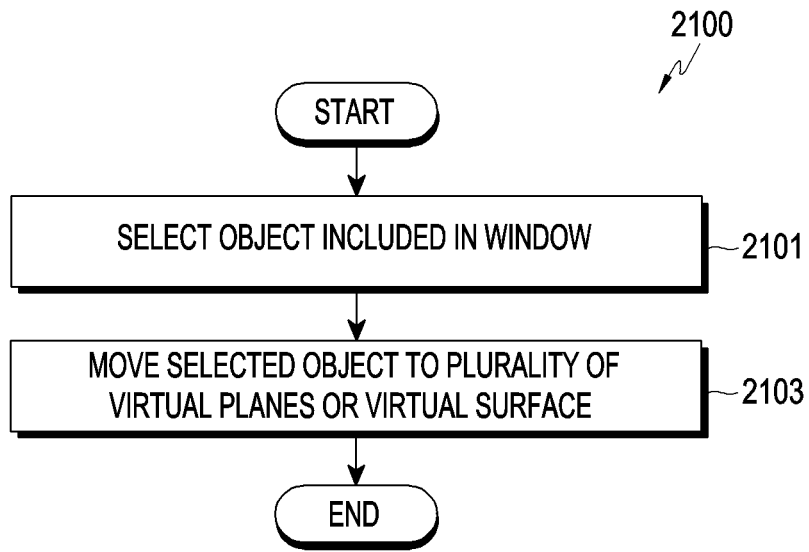
FIG. 21 is a flowchart illustrating an example method of placing an object on a plurality of virtual planes or a virtual surface according to an embodiment.

FIG. 21 is a flowchart 2100 illustrating an example method of placing an object on a plurality of virtual planes or a virtual surface according to an embodiment.

In an embodiment, in the above-described examples, a method of placing (e.g., moving) an object in a virtual space in which a plurality of virtual planes (e.g., the plurality of virtual planes 630) or a virtual surface (e.g., the virtual surface) is provided has been described, but the disclosure is not limited thereto. The processor 460 may perform an operation of placing an object in a virtual space in which the plurality of virtual planes and the virtual surface are provided.

Referring to FIG. 21, in operation 2101, in an embodiment, the processor 460 may select an object included in a window based on a designated input. For example, the processor 460 may select an object included in a window based on a designated input for moving an object in a virtual space in which the plurality of virtual planes and a virtual surface are provided.

Since operation 2101 is at least partially the same as or similar to operation 901 of FIG. 9 and operation 1901 of FIG. 18, a detailed description thereof may not be repeated here.

In operation 2103, in an embodiment, the processor 460 may move the selected object to the plurality of virtual planes or the virtual surface in the virtual space in which the plurality of virtual planes and the virtual surface are provided, based on an input for moving the selected object. For example, the processor 460 may place the selected object on the plurality of virtual planes or the virtual surface, based on the input for moving the selected object displayed on the window.

In an embodiment, the processor 460 may place the same object (e.g., the same two or more objects) on the plurality of virtual planes and/or the virtual surface. In this case, the processor 460 may not simultaneously execute the same object placed on the plurality of virtual planes and/or the virtual surface. For example, the processor 460 may not simultaneously execute two objects corresponding to a music application placed on the plurality of virtual planes and/or the virtual surface.

In an embodiment, the operation of moving the selected object to the plurality of virtual planes based on the input for moving the selected object may be partially the same as or similar to the operation of moving the selected object to the plurality of virtual planes described with reference to FIGS. 9 to 17.

In an embodiment, the operation of moving the selected object to the virtual surface based on the input for moving the selected object may be at least partially the same as or similar to the operation of moving the selected object to the virtual surface described with reference to FIGS. 18 to 20.

Hereinafter, with reference to FIGS. 22A and 22B, an operation of placing an object on a plurality of virtual planes or a virtual surface in a virtual space including the plurality of virtual planes and the at least one virtual surface will be descried in more detail.

Figure 22A:
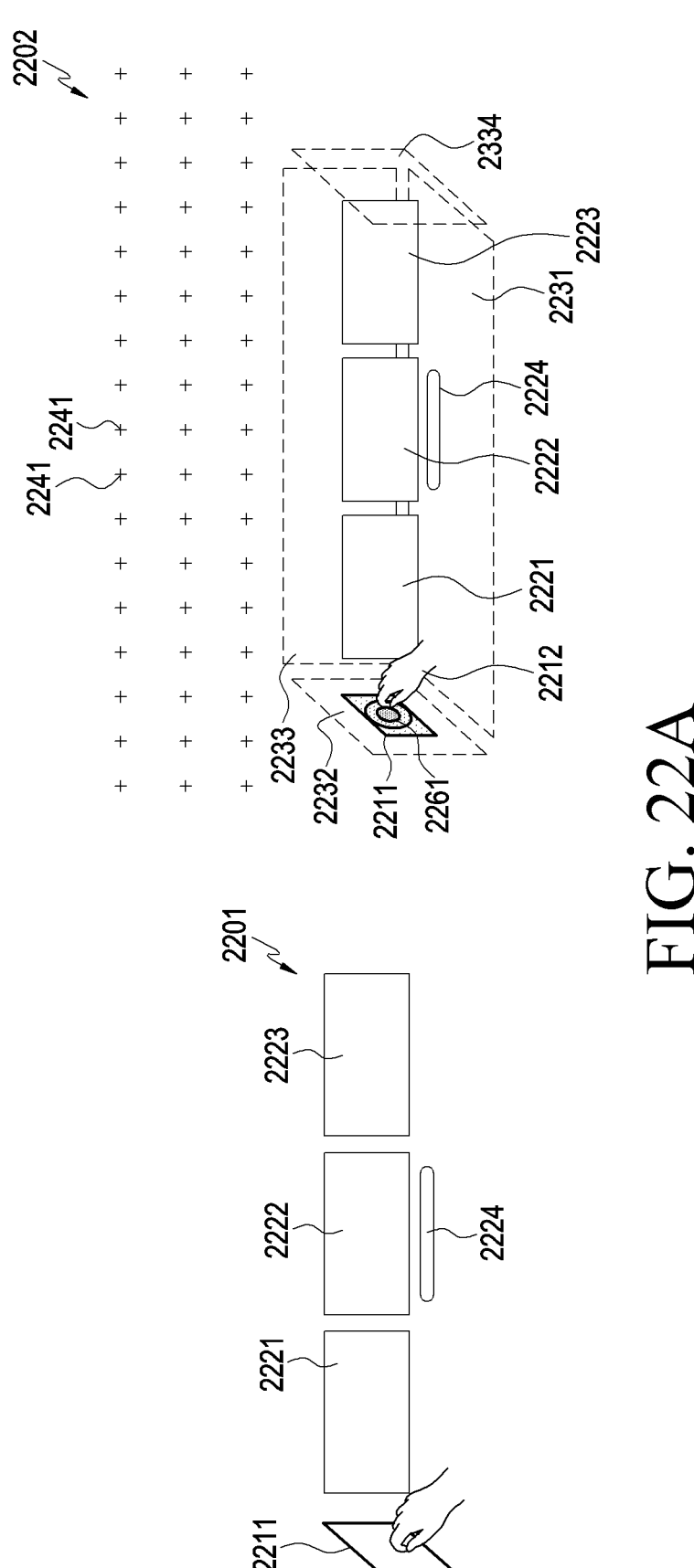
FIGS. 22A and 22B are diagrams illustrating an example method of placing an object on a plurality of virtual planes or a virtual surface according to an embodiment.
Figure 22B:
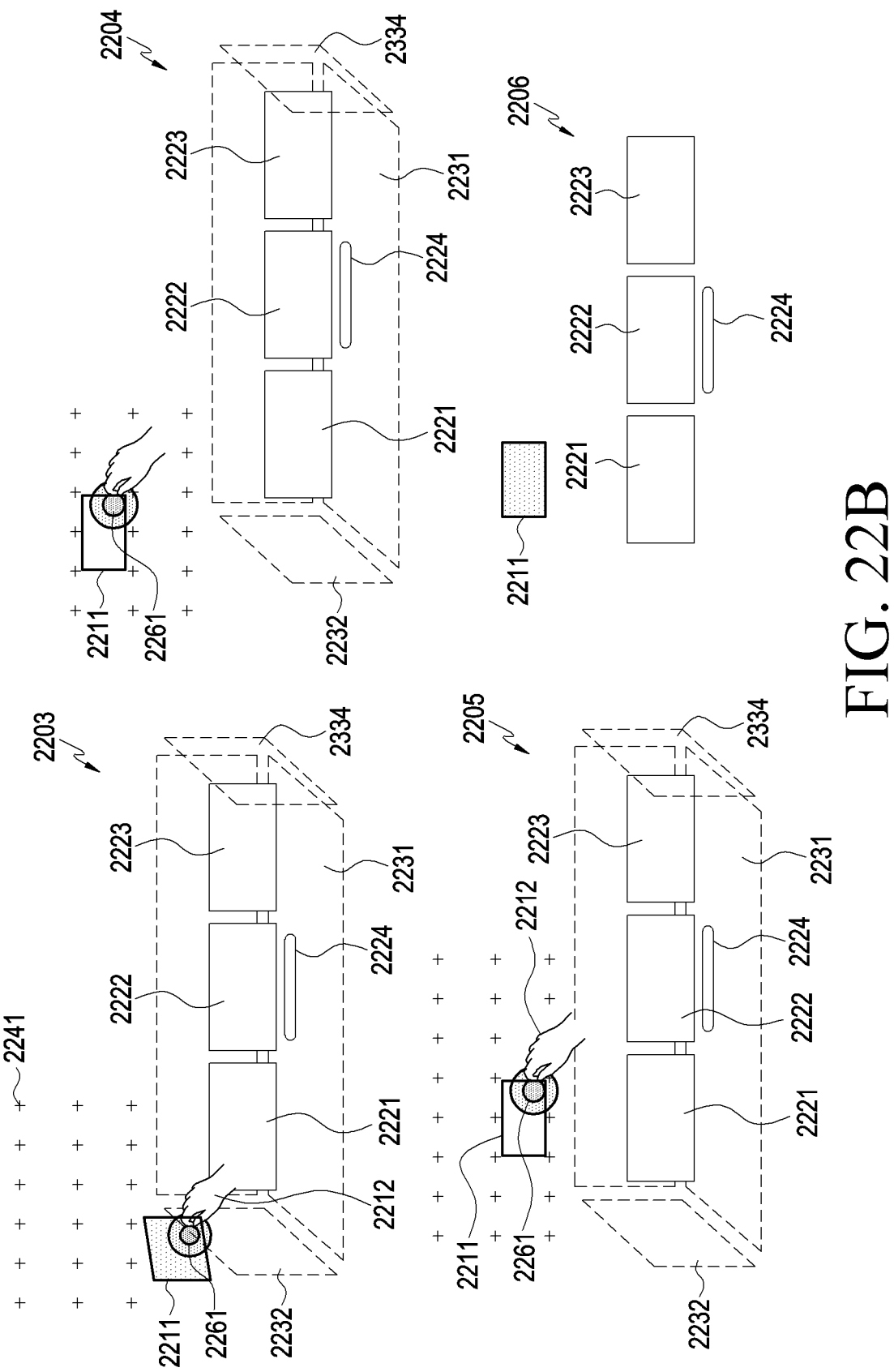

FIGS. 22A and 22B are diagrams illustrating an example method of placing an object on a plurality of virtual planes or a virtual surface according to an embodiment.

Referring to FIGS. 22A and 22B, in an embodiment, in reference numeral 2201, the processor 460 may display at least one window (e.g., windows 2221, 2222, and 2223) (and a task bar 2224) and an object 2211 placed on a plurality of virtual planes through the display 440 in a virtual space including the plurality of virtual planes of a virtual surface. In an embodiment, as shown in reference numeral 2201, the processor 460 may not display the plurality of virtual planes and the virtual surface through the display 440.

In an embodiment, in reference numeral 2201, the processor 460 may select the object 2211 among objects displayed on one virtual plane of the plurality of virtual planes based on a designated input. For example, in a state in which a pointer 2212 indicating a recognized user's hand is placed on the object 2211, the processor 460 may select the object 2211 based on an input of a pinch and hold gesture.

In an embodiment, in response to a designated input (e.g., pinch and hold gesture) for the object 2211 being inputted, the processor 460 may cause the wearable electronic device 401 to enter a grid mode to move the object.

In an embodiment, while the wearable electronic device 401 is operating in the grid mode (e.g., in response to the wearable electronic device 401 entering the grid mode), the processor 460 may display the plurality of virtual planes and the virtual surface through the display 440. For example, while the wearable electronic device 401 is operating in the grid mode, as shown in reference numeral 2202, the processor 460 may display a guide representing the virtual surface (e.g., an indication 2241 indicating points where lines forming the virtual surface intersect) indicating the at least one virtual surface together with the plurality of virtual planes (e.g., a first virtual plane 2231, a second virtual plane 2232, a third virtual plane 2233, and a fourth virtual plane 2234) through the display 440.

In an embodiment, the processor 460 may move the selected object based on an input for moving the selected object. For example, in reference numeral 2003, the processor 460 may move the object 2211 based on the input for moving the object 2211 after the pinch and hold gesture for the object 2211 is input.

In an embodiment, when the object 2211 is placed on the at least one virtual surface, the processor 460 may increase the opacity of the guide representing the virtual surface (e.g., the indication 2241). For example, based on a comparison between reference numeral 2002 and reference numeral 2003, when the object 2211 is located on the at least one virtual surface, the processor 460 may display the indication 2241 with an opacity level higher than the opacity level of the indication 2241 displayed when the wearable electronic device 401 enters the grid mode. For example, when the object 2211 is located on the virtual surface, the processor 460 may display the indication 2241 more clearly (or darker) than the indication 2241 displayed when the wearable electronic device 401 enters the grid mode.

In an embodiment, in reference numerals 2204 and 2205, the processor 460 may move the object 2211 on the virtual surface, based on an input for moving the object 2211.

In an embodiment, the processor 460 may display the shape of the object 2211 differently depending on whether the object 2211 is placed on the virtual surface or on the plurality of virtual planes. For example, the processor 460 may display the object 2211 through the display 440 in such a manner that the shape of the object 2211 when the object 2211 is placed on the plurality of virtual planes is different from the shape of the object 2211 when the object 2211 is placed on the virtual surface.

In an embodiment, the processor 460 may control the display 440 so that the plurality of virtual planes and the virtual surface disappear after the object is moved to the virtual surface (or the plurality of virtual planes). For example, in reference numeral 2206, after the object 2211 is moved to the virtual surface, the processor 460 may control the display 440 to display the object 2011 without displaying the plurality of virtual planes and the virtual surface based on an input (e.g., gesture for spreading the thumb and index finger from the pinch and hold gesture) for releasing the grid mode.

In an embodiment, in FIGS. 22A and 22B, the processor 460 may display the indication 2261 indicating that a gesture by the user is input, through the display 440.

Figure 23A:
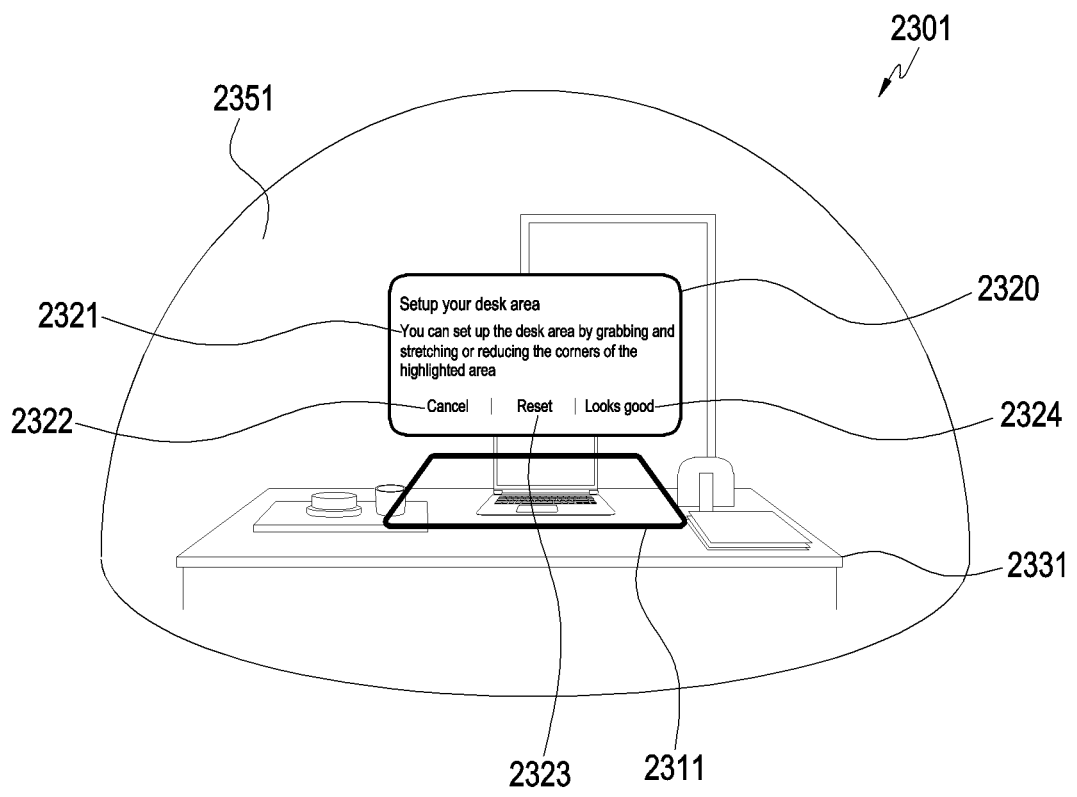
FIGS. 23A, 23B, and 23C are diagrams illustrating an example method of setting a virtual desk according to an embodiment.
Figure 23A:
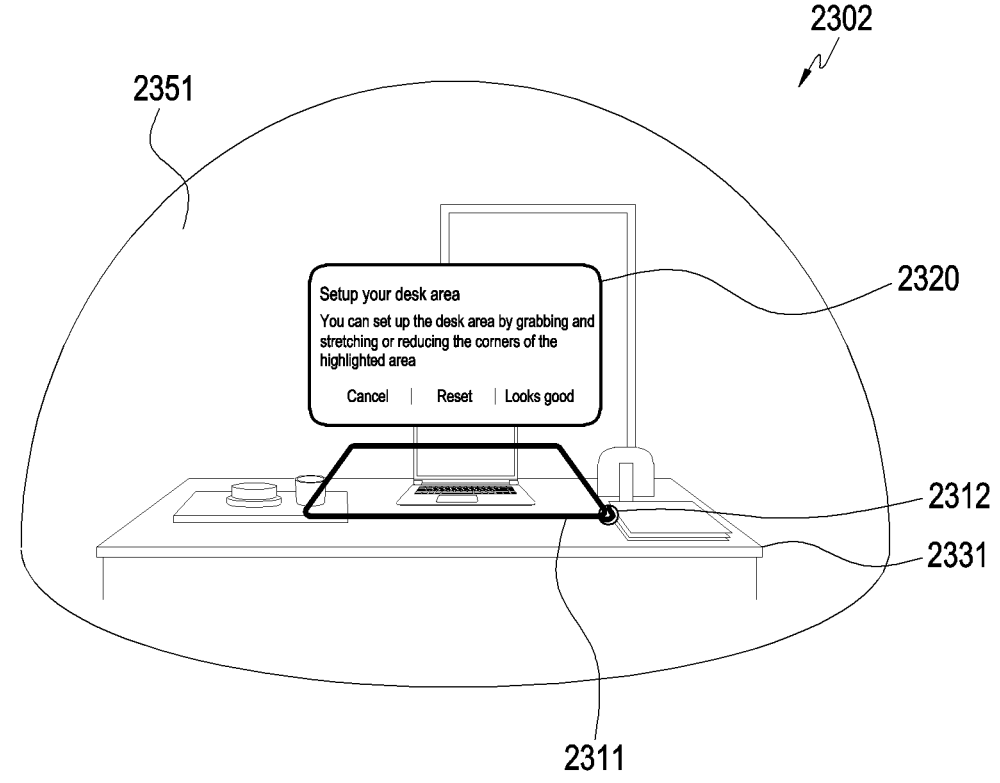
Figure 23B:
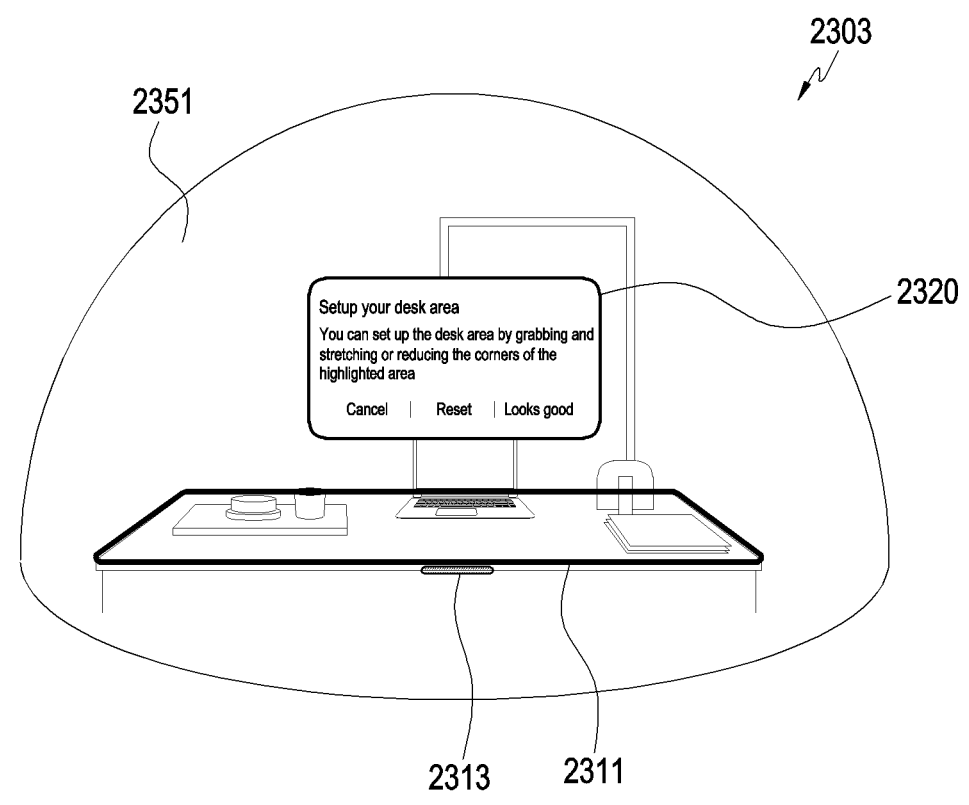
Figure 23B:
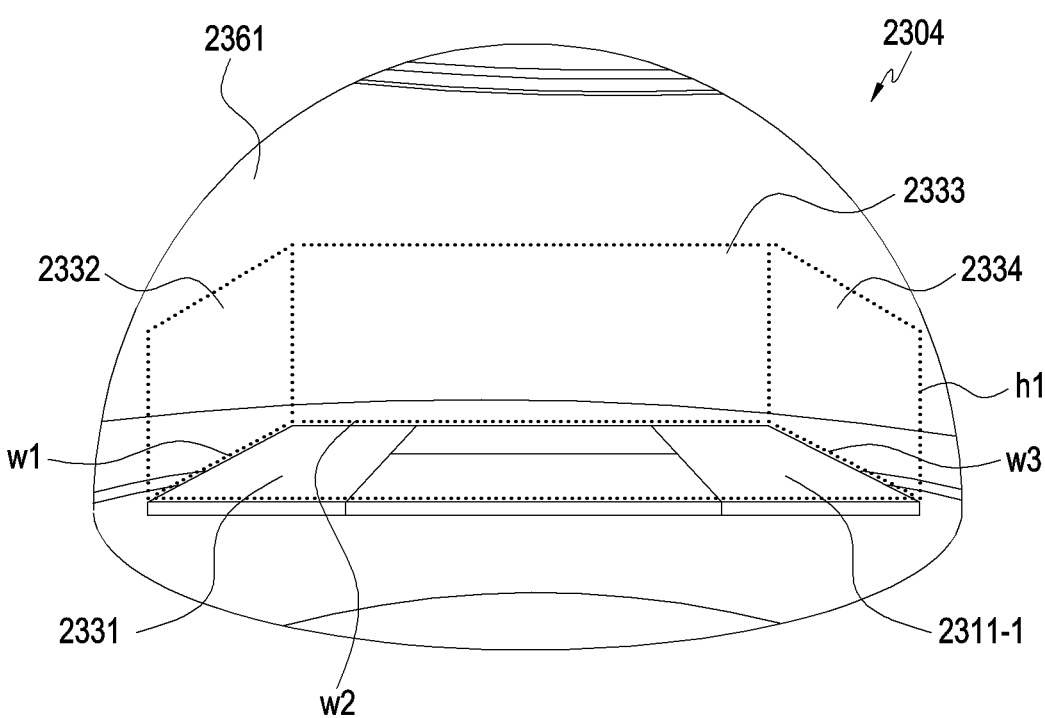
Figure 23C:
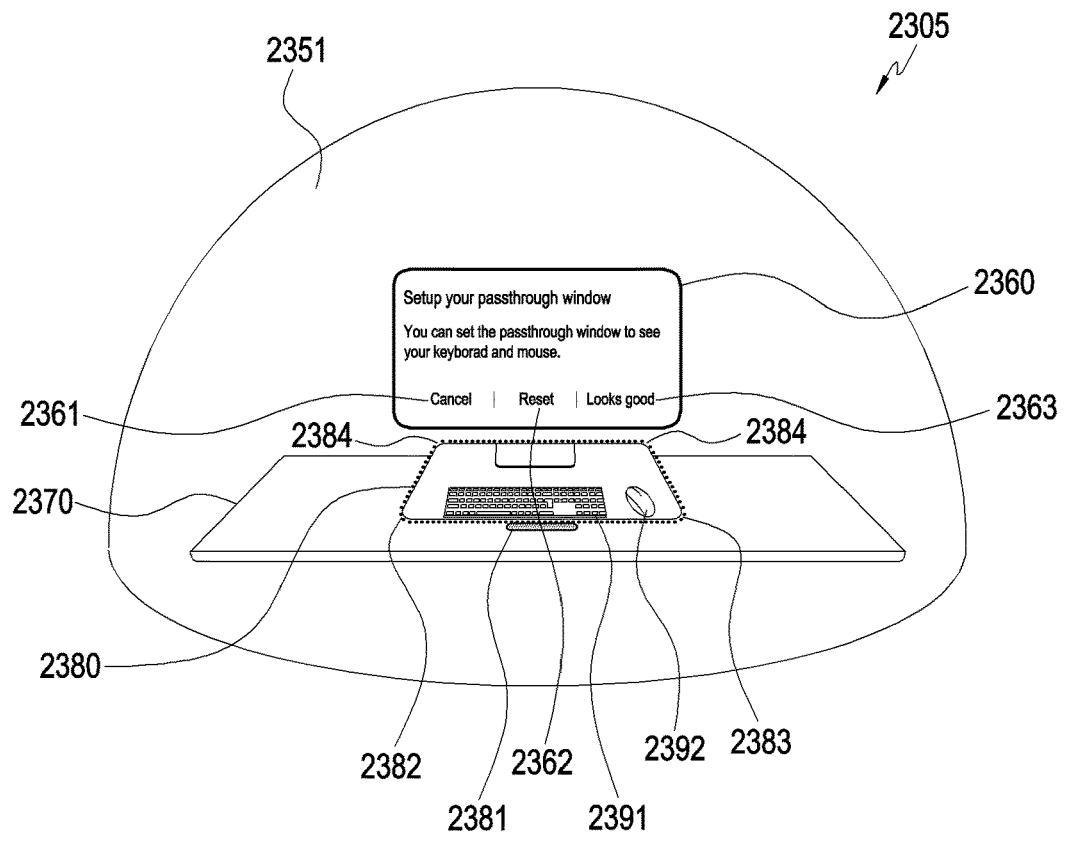
Figure 23C:
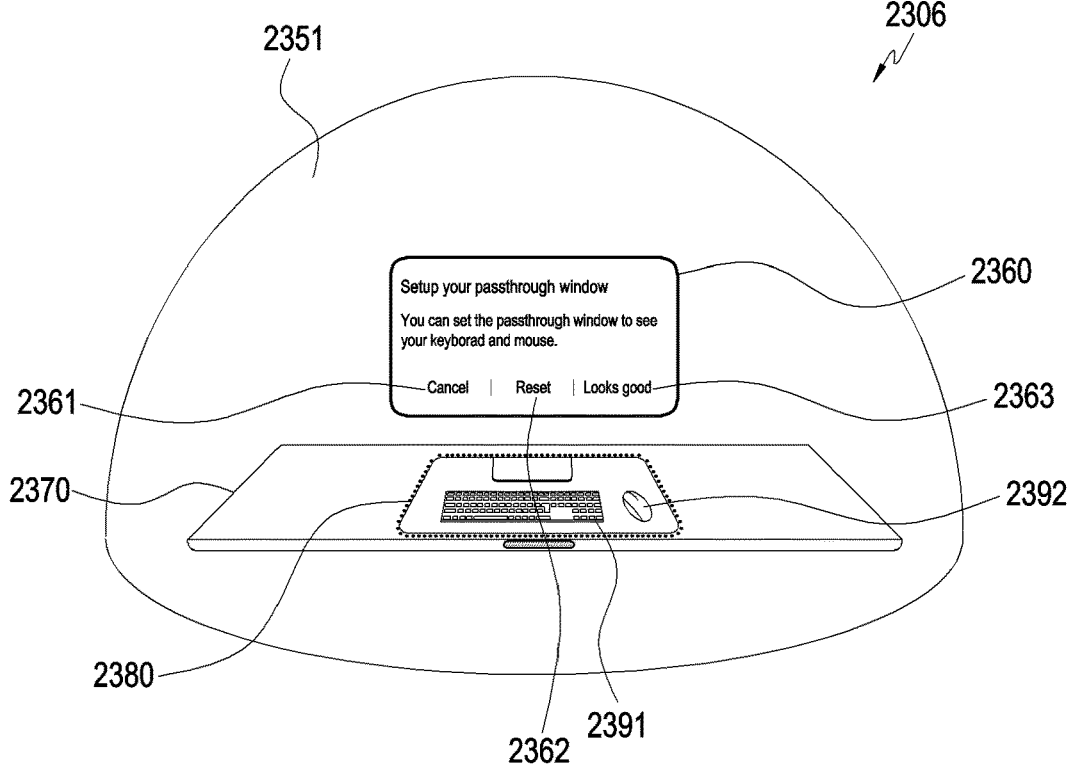

FIGS. 23A, 23B, and 23C are diagrams illustrating an example method of setting a virtual desk according to an embodiment.

Referring to FIGS. 23A, 23B, and 23C, in an embodiment, the processor 460 may set a virtual desk (also referred to as "desk area") to generate (or set) a plurality of virtual planes.

In an embodiment, in reference numeral 2301, while the wearable electronic device 401 is operating in a pass-through mode (also referred to as "video see-through {VST}" mode), the processor 460 may display an image of a real world 2351 (e.g., real space including desk 2331 as a real object) acquired through a camera module 430, through the display 440. The processor 460 may display a window 2320 for setting a virtual desk 2311 set as default and a window 2320 for setting the virtual desk through the display 440, based on an input for setting the virtual desk. In an embodiment, based on a designated input to the virtual desk 2311 (e.g. grabbing gesture), such as "You can set up the desk area by grabbing and stretching or reducing the corners of the highlighted area", the window 2320 for setting the virtual desk may include a button 2322 for releasing the virtual desk 2311, a button 2323 for resetting the virtual desk 2311 (e.g., button for restoring the position and/or size of the virtual desk 2311 after the virtual desk 2311 is moved or the size of the virtual desk 2311 is changed), and a button 2324 for completing the setting of the virtual desk 2311, together with guide information 2321 indicating that the size of the virtual desk 2311 can be increased or decreased.

In an embodiment, as shown in reference numerals 2302 and 2303, the processor 460 may change the size of the virtual desk 2311 based on an input for an object 2312 (also referred to as "handler") that is placed adjacent to the virtual desk 2311 and is to change the size of the virtual desk 2311.

In an embodiment, the processor 460 may change the position of the virtual desk 2311 based on an input (e.g., a user input) for an object 2313 placed adjacent to the virtual desk 2311.

In an embodiment, the processor 460 may complete the setting of the virtual desk 2311 based on an input for the button 2324 for completing the setting of the virtual desk 2311.

In an embodiment, when the setting of the virtual desk 2311 is completed, the processor 460 may display the set virtual desk in a virtual reality (VR) mode where the wearable electronic device 401 operates in a virtual space of the VR. For example, as shown in reference numeral 2304, while the wearable electronic device 401 is operating in the VR mode, the processor 460 may generate a virtual desk 2311-1 having a position and/or size corresponding to the position and/or size of the virtual desk 2311 in the virtual space 2361, and may display the generated virtual desk 2311-1 through the display 440.

In an embodiment, when the virtual desk 2311-1 is generated, the processor 460 may generate a first virtual plane 2331 (e.g., a first virtual plane of the plurality of virtual planes) having a position and/or size corresponding to (identical to) the position and/or size of the virtual desk 2311-1.

In an embodiment, the processor 460 may generate at least one of a second virtual plane 2332, a third virtual plane 2333, or a fourth virtual plane 2334 plurality of virtual planes, based on the position and/or size of the virtual desk 2311-1 (or the first virtual plane 2331). For example, the processor 460 may set (e.g., generate) the second virtual plane 2332, the third virtual plane 2333, and the fourth virtual plane 2334 so that a corner w1 of the second virtual plane 2332, a corner w2 of the third virtual plane 2333, and a corner w3 of the fourth virtual plane 2334 overlap some of corners of the virtual desk 2311-1 (or the first virtual plane 2331) and the height h1 of the second virtual plane 2332, the third virtual plane 2333, and the fourth virtual plane 2334 is set to a default height. In the above example, the height h1 is illustrated as being set as a default, but is not limited thereto. The processor 460 may set the height of the virtual plane based on the surrounding environment of the wearable electronic device 401. For example, when the real surface (e.g., a wall or partition) located around the desk 2331 as a real object is recognized, the processor 460 may set the height of the real surface (e.g., the height of the wall or the height of the partition) to the height of the virtual plane (e.g., the second virtual plane 2332, the third virtual plane 2333, and the fourth virtual plane 2334).

In FIG. 23b, it is illustrated that the edges (corners) of the first virtual plane 2331 corresponding to the virtual desk 2311-1 overlap the edge w1 of the second virtual plane 2332, the edge w2 of the third virtual plane 2333, and the edge w3 of the fourth virtual plane 2334, but the present invention is not limited thereto. For example, the processor 460 may generate the first virtual plane 2331, the second virtual plane 2332, the third virtual plane 2333, and the fourth virtual plane 2334 such that a length of the edge of the second virtual plane 2332, a length of the edge of the third virtual plane 2333, and a length of the edge of the fourth virtual plane 2334 are the same as the lengths of a corresponding edges of the first virtual plane 2331, and at least a part thereof is spaced apart from each other.

In an embodiment, while the plurality of virtual planes (e.g., the first virtual plane 2331, the second virtual plane 2332, the third virtual plane 2333, and the fourth virtual plane 2334) is set, the processor 460 may display the plurality of virtual planes through the display 440.

In an embodiment, when the virtual desk is not set, the processor 460 may set the plurality of virtual planes based on the position and/or size of the virtual desk (e.g., the virtual desk 2311 shown in reference numeral 2301) set as default.

In an embodiment, when the virtual desk is re-set, the processor 460 may re-set the plurality of virtual planes based on the re-set virtual desk. In this case, the processor 460 may change the position and/or size of one or more objects placed on the plurality of virtual planes.

In an embodiment, when the virtual desk is turned off (e.g., operation in which the virtual desk disappears from the screen) after the plurality of virtual planes is set based on the virtual desk, the processor 460 may control the display 440 so that the one or more objects placed on the plurality of virtual planes may disappear on the screen together with the virtual desk or may be maintained on the screen.

In an embodiment, the processor 460 may set an area (hereinafter referred to as "first area)" or "pass through window") in which an input device (e.g., keyboard, mouse) can be seen in the virtual space.

In an embodiment, the processor 460 may display the first area set as default while the wearable electronic device 401 operates in a virtual reality (VR) mode. In reference numeral 2305, the processor 460 may display an image of the real world (e.g., the actual keyboard 2391 and the actual mouse 2392) obtained using the camera module 430 through the default first area 2380 together with the virtual desk 2370 a window 2360 for setting the first area in the virtual space 2351.

In an embodiment, the window 2360 for setting the first area may include a button 2361 for canceling the setting of the first area, a button 2384 for resetting the setting of the first area, and a button 2363 for completing the setting of the first area, along with guide information indicating that the first area (the pass through window) can be set, such as "You can set the pass through window to see your keyboard and mouse."

In an embodiment, the processor 460 may change the size of the first area 2380 based on a user input to an object 2381 (also referred to as a "handler") disposed adjacent to the first area 2380 and configured to change the position of the first area 2380. The processor 460 may change the size of the first area 2380 based on a user input to corners of the first area 2380. Comparing the reference number 2305 with the reference number 2306, the processor 460 may move the first area 2380 based on a user input to the object 2381, and adjust the position and size of the first area 2380 based on a user input to the corners of the first area 2380. The processor 460 may set the adjusted first area 2380 as the first area based on the button 2363.

Although not shown in FIG. 23C, in an embodiment, the processor 460 may provide a first area together with a plurality of virtual planes and/or a virtual surface in the virtual space. For example, while displaying the execution screen of the application, the processor 460 may provide the first area so that an input device (e.g., a keyboard, a mouse) is visible along with a portion of the plurality of virtual planes. For example, the processor 460 may provide the first area through which the input device (e.g., keyboard, mouse) is visible along with some of the plurality of virtual planes based on the wearable electronic device 401 being connected wirelessly (or wired) to the input device while displaying the execution screen of the application.

Figure 24:
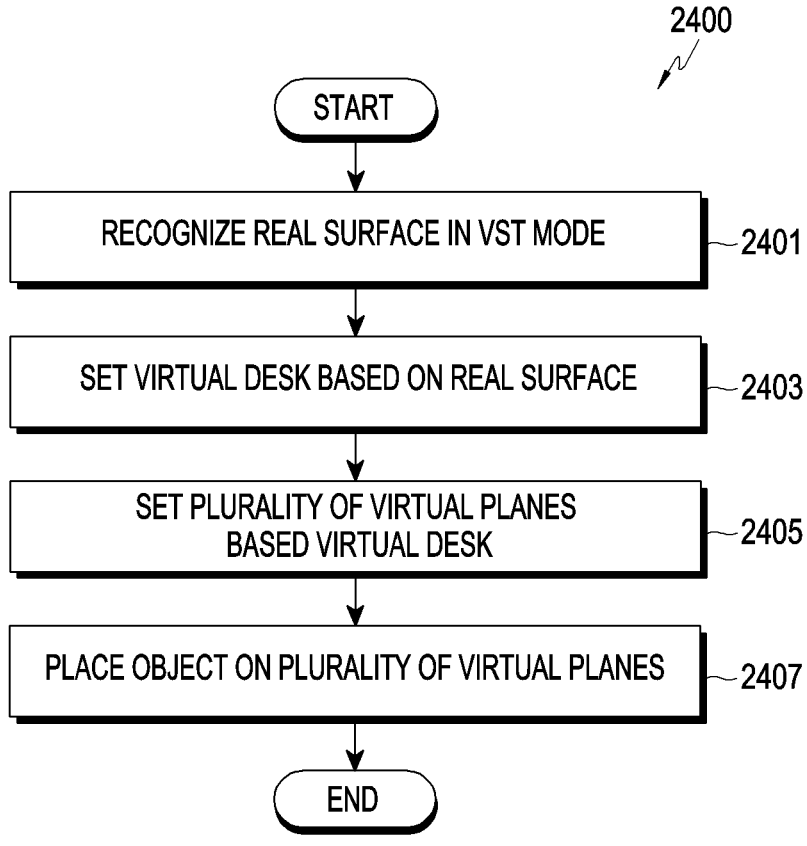
FIG. 24 is a flowchart illustrating an example method of setting a plurality of virtual planes in a VST mode according to an embodiment.

FIG. 24 is a flowchart 2400 illustrating an example method of setting a plurality of virtual planes in a VST mode according to an embodiment.

Referring to FIG. 24, in operation 2401, in an embodiment, while the wearable electronic device 401 is operating in a VST mode, the processor 460 may recognize a real surface based on an image acquired through the camera module 430. For example, while the wearable electronic device 401 is operating in the VST mode, the processor 460 may acquire an image through the camera module 430. The processor 460 may recognize a real surface having a designated size or greater such as a surface of a desk (or surface of a chair) by analyzing a scene included in the acquired image.

In an embodiment, the processor 460 may obtain depth information (also referred to as a "depth map") about the surrounding environment of the wearable electronic device 401 through the camera module 430 and/or a sensor (e.g., the depth sensor 317). For example, the processor 460 may obtain depth information about the surrounding environment of the wearable electronic device 401 using a method using a stereo camera, a method using a structured light, or a method using a time of light (TOF) sensor. However, a method of obtaining the depth information about the surrounding environment of the electronic device is not limited to thereto.

In an embodiment, the processor 460 may recognize an object with a real surface (e.g., a desk with a real surface) based on the depth information on the surrounding environment of the electronic device. For example, the processor may recognize an object with a real surface among objects located around the wearable electronic device 401 by comparing the depth information (e.g., the 3D point cloud) and the 3D shape of the object stored in the memory 450 (or the server).

In an embodiment, when the object having the real surface is recognized, the processor may detect the real surface of the recognized object using a designated algorithm (e.g., RANSAC algorithm) or an artificial intelligence model. For example, the processor may detect the plane and/or edges of the desk using the designated algorithm (or the artificial intelligence model).

In an embodiment, processor 460 may convert coordinates of the recognized real surface of the object on the real space into coordinates on the virtual space. For example, processor 460 may convert the coordinates of the plane and/or corners of the desk on the real space into the coordinates on the virtual space.

In operation 2403, in an embodiment, the processor 460 may set a virtual desk based on the recognized real surface. For example, the processor 460 may generate, based on the recognized real surface (and/or the coordinates of the plane and/or corners on the real space) a virtual desk having a position and/or size corresponding to (e.g., identical to) the position and/or size of the recognized surface. For example, the processor 460 may set the virtual desk so that the virtual desk includes the recognized surface.

In an embodiment, the processor 460 may generate a virtual plane (e.g., the first virtual plane 2331) having a position and/or size corresponding to the position and/or size of the set virtual desk (e.g., virtual desk 2311-1).

In an embodiment, the processor 460 may generate another virtual plane (e.g., at least one of the second virtual plane 2332, the third virtual plane 2333, or the fourth virtual plane 2334) based on the virtual plane (e.g., the first virtual plane 2331).

In the above examples, it is illustrated that a virtual plane (e.g., the first virtual plane 2331) corresponding to the virtual desk is generated based on the virtual desk set based on the real plane (e.g., the real plane of the desk), but is not limited thereto. For example, the processor 460 may set the virtual plane using surfaces around the wearable electronic device 401 (e.g., a wall or partition located around the real desk). The processor 460 may generate, based on the set virtual plane, another virtual plane (e.g., at least one of the second virtual plane 2332, the third virtual plane 2333, or the fourth virtual plane 2334) to be included in a plurality of virtual planes, in addition to the virtual plane (e.g., the first virtual plane 2331).

In an embodiment, the processor 460 may set the virtual desk based on a virtual desk (hereinafter, referred to as "first virtual desk") having a size corresponding to the size of the recognized real surface and the size of a virtual desk (or a currently set virtual desk) (hereinafter, referred to as "second virtual desk") set as default. For example, when the first virtual desk and the second virtual desk have a rectangular shape, the processor 460 may compare a length of a corner having a longer length (hereinafter, referred to as "first corner") among the corners of the first virtual desk with a length of a corner having a longer length (hereinafter, referred to as "second corner") among the corners of the second virtual desk. When the length of the first corner is longer than the length of the second corner, the processor 460 may set a virtual desk having the same horizontal and vertical ratio as that of the first virtual desk and including the first corner as one corner, as the virtual desk for setting a virtual plane. When the length of the first corner is shorter than the length of the second corner, the processor 460 may set the second virtual desk as the virtual desk for setting the virtual plane.

In operation 2405, in an embodiment, the processor 460 may set the plurality of virtual planes based on the virtual desk. For example, when the virtual desk is set, the processor 460 may set a first virtual plane that has a position and/or size corresponding to (e.g., identical to) the position and/or size of the virtual desk. The processor 460 may set at least one of a second virtual plane, a third virtual plane, or a fourth virtual plane to be included in the plurality of virtual planes, based on the position and/or size of the virtual desk (or the first virtual plane).

In operation 2407, in an embodiment, the processor 460 may place the object on the plurality of virtual planes.

In an embodiment, when the virtual desk is re-set, the processor 460 may re-set the plurality of virtual planes based on the re-set virtual desk. When the plurality of virtual planes is re-set, the processor 460 may change the position and/or size of at least one object among one or more objects placed on a previous plurality of virtual planes.

Hereinafter, referring to FIG. 25, an operation of setting the plurality of virtual planes in the VST mode will be described in greater detail.

Figure 25:
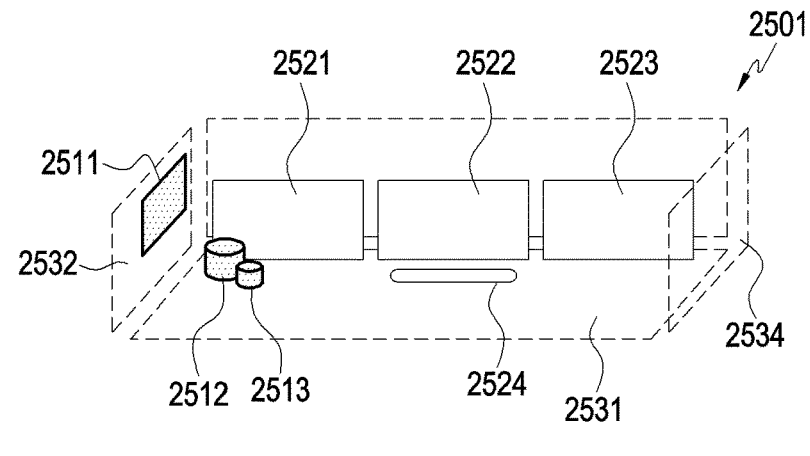
FIG. 25 is a diagram illustrating an example method of setting a plurality of virtual planes in a VST mode according to an embodiment.
Figure 25:
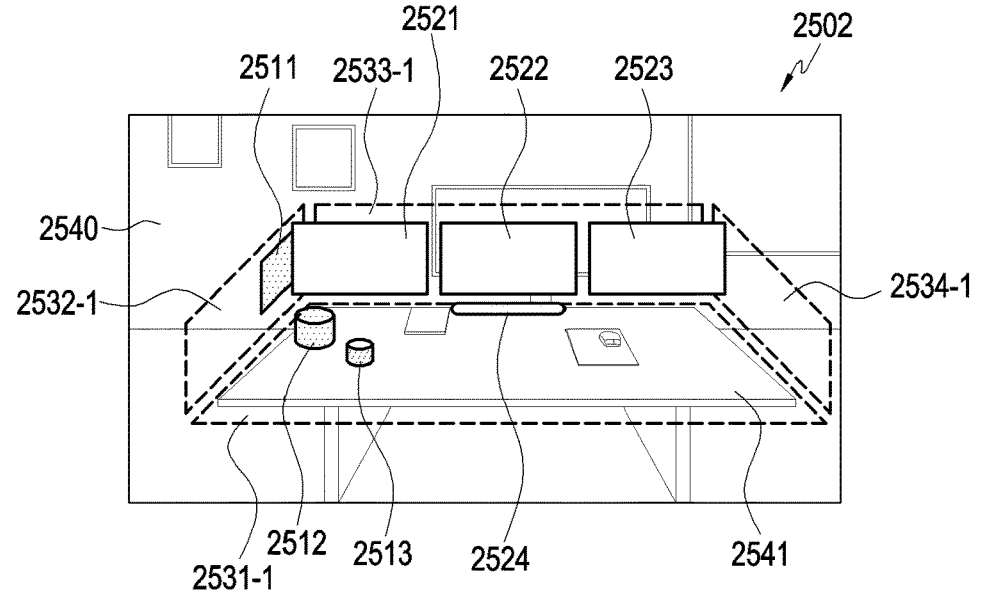
Figure 25:
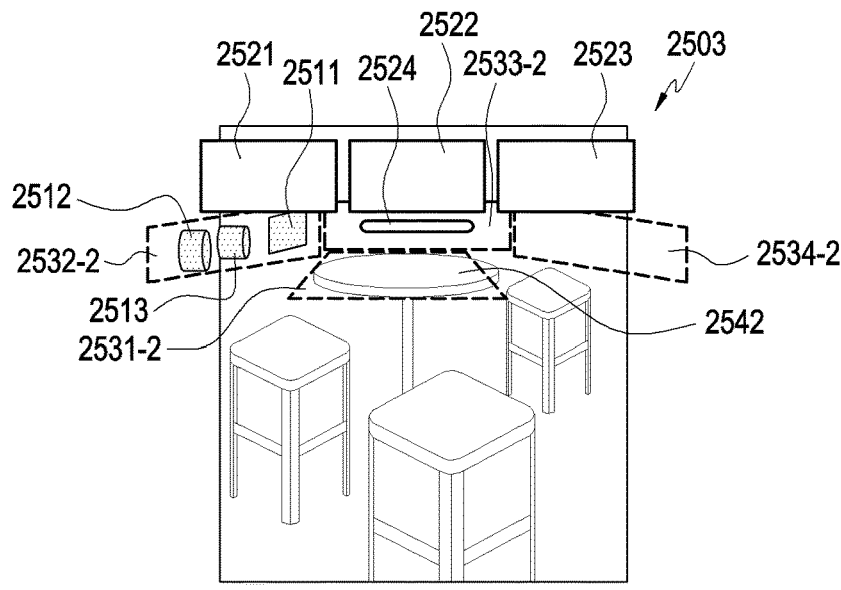

FIG. 25 is a diagram illustrating an example method of setting a plurality of virtual planes in a VST mode according to an embodiment.

Referring to FIG. 25, in an embodiment, reference numeral 2501 may denote plurality of virtual planes (e.g., a first virtual plane 2531, a second virtual plane 2532, a third virtual plane 2533, and a fourth virtual plane 2534) (hereinafter, referred to as "currently set plurality of virtual planes") which is set based on a virtual desk set as default and on which objects 2511, 2512, and 2513 are placed, together with windows 2521, 2522, and 2523 and a task bar 2524.

In an embodiment, while the wearable electronic device 401 is operating in the VST mode, the processor 460 may recognize a real surface (e.g., a real surface 2541 or a real surface 2542) by analyzing a scene 2540 included in an image acquired through the camera module 430.

In an embodiment, the processor 460 may set a virtual desk based on the recognized surface.

In an embodiment, in reference numeral 2502, the processor 460 may set plurality of virtual planes (e.g., a first virtual plane 2531-1, a second virtual plane 2532-1, a third virtual plane 2533-1, and a fourth virtual plane 2534-1) having a size larger than a size of currently set plurality of virtual planes (e.g., a first virtual plane 2531, a second virtual plane 2532, a third virtual plane 2533, and a fourth virtual plane 2534).

In an embodiment, when plurality of virtual planes having a size larger than the size of the currently set plurality of virtual planes is newly set, the processor 460 may set an interval between the one or more objects within the newly set plurality of virtual planes so that an interval between positions of the one or more objects placed on the newly set plurality of virtual planes is greater than an interval between positions of the one or more objects placed on the currently set plurality of virtual planes. For example, when the size of the newly set plurality of virtual planes (e.g., the first virtual plane 2531-1) is greater than or equal to a threshold size, the processor 460 may set an interval between the one or more objects 2511, 2512, and 2513 within the newly set plurality of virtual planes so that an interval between positions of the one or more objects 2511, 2512, and 2513 placed on the newly set plurality of virtual planes is greater than an interval between positions of the one or more objects 2511, 2512, and 2513 placed on the currently set plurality of virtual planes. For example, when the size of the newly set plurality of virtual planes (e.g., the first virtual plane 2531-1) is less than the threshold size, the processor 460 may set an interval between the one or more objects 2511, 2512, and 2513 within the newly set plurality of virtual planes so that the interval between the positions of the one or more objects 2511, 2512, and 2513 placed on the newly set plurality of virtual planes is the same as the interval between the positions of the one or more objects 2511, 2512, and 2513 placed on the currently set plurality of virtual planes.

In an embodiment, in reference numeral 2503, the processor 460 may set plurality of virtual planes (e.g., a first virtual plane 2531-2, a second virtual plane 2532-2, a third virtual plane 2533-2, and a fourth virtual plane 2534-2) having a size smaller than the size of the currently set plurality of virtual planes (e.g., the first virtual plane 2531, the second virtual plane 2532, the third virtual plane 2533, and the fourth virtual plane 2534), based on the set virtual desk.

In an embodiment, when plurality of virtual planes having a size smaller than the size of the currently set plurality of virtual planes is newly set, the processor 460 may change positions of one or more objects placed on the newly set plurality of virtual planes. For example, when the size of the newly set first virtual plane 2531-2 is equal to or less than a threshold size, the processor 460 may move one or more objects 2512 and 2513 placed on the currently set first virtual plane 2531 to the newly set second virtual plane 2532-2, third virtual plane 2533-2, and/or fourth virtual plane 2534-2. For example, when the size of the newly set first virtual plane 2531-2 is equal to or less than the threshold size, the processor 460 may move the one or more objects 2512 and 2513 placed on the currently set first virtual plane 2531 to a newly set surface corresponding to a surface located in a position closest to each position of the one or more objects 2512 and 2513 among the second virtual plane 2532, the third virtual plane 2533, and the fourth virtual plane 2534. For example, when the size of the newly set first virtual plane 2531-2 is equal to or less than the threshold size, the processor 460 may move the object 2512 placed on the currently set first virtual plane 2531 to the newly set virtual plane 2532-1 corresponding to the second virtual plane 2532 located at a position closest to the position of the object 2512 among the second virtual plane 2532, the third virtual plane 2533, and the fourth virtual plane 2534.

In an embodiment, when the size of the newly set first virtual plane 2531-2 is equal to or less than the threshold size, the processor 460 may increase the size of at least one virtual plane among the second virtual plane 2532-2, the third virtual plane 2533-2, or the fourth virtual plane 2534-2 except for the first virtual plane 2531-2.

In an embodiment, a wearable electronic device may include a display, memory, and a processor. The memory may store instructions that, when executed by the processor, cause the wearable electronic device to display a first execution screen of a first application in a 3D virtual space. A first guide representing a first virtual plane for guiding to a location on the first virtual plane at which an object can be placed and a second guide representing a second virtual plane for guiding to a location on the second virtual plane at which an object can be placed may be provided in the 3D virtual space, wherein the second virtual plane is facing in a direction different from the first virtual plane. The memory may store instructions that, when executed by the processor, cause the wearable electronic device to, based on a user input for moving a first object included in the first execution screen, display at least one guide of the first guide or the second guide to enable relocation of the first object to the first virtual plane or the second virtual plane.

In an embodiment, the first virtual plane and the second virtual plane may be disposed orthogonal with respect to each other within the 3D virtual space.

In an embodiment, the first virtual plane and the second virtual plane may be disposed such that an angle between the first virtual plane and the second virtual plane is one among 45° to 90° or one among 90° to 180°.

In an embodiment, the instructions, when executed by the processor, may cause the wearable electronic device to obtain depth information about a real space surrounding the wearable electronic device while the wearable electronic device operates in a VST (video see-through) mode. The instructions, when executed by the processor, may cause the wearable electronic device to, based on the depth information, recognize a thing having at least one real surface and disposed in the real space. The instructions, when executed by the processor, may cause the wearable electronic device to detect the at least one real surface of the thing using a designated algorithm or an artificial intelligence mode. The instructions, when executed by the processor, may cause the wearable electronic device to provide the at least one guide of the first guide or the second guide, the at least one guide having a size corresponding to a size of the at least one real surface.

In an embodiment, wherein the instructions, when executed by the processor, may cause the wearable electronic device to, based on a location of the first object obtained while the first object is moved, identify whether a first distance between the first virtual plane and the first object or a second distance between the second virtual plane and the first object is equal to or less than a designated distance. The instructions, when executed by the processor, may cause the wearable electronic device to, based on the first distance or the second distance being equal to or less than the designated distance, display, through the display, a guide representing a region to which the first object can be placed in the first virtual plane or the second virtual place from the location of the first object.

In an embodiment, the instructions, when executed by the processor, may cause the wearable electronic device to obtain a user input for moving a second object placed in the first virtual plan in a first direction parallel to the first virtual plane from the first virtual plane. The instructions, when executed by the processor, may cause the wearable electronic device to, based on the second object being moved into an outside of the first virtual plane by the user input, increase sizes of the first virtual plane and the second virtual plane in the first direction. The instructions, when executed by the processor, may cause the wearable electronic device to place the first object on the at least one first grid having the increased size.

In an embodiment, the instructions, when executed by the processor, may cause the wearable electronic device to, based on the user input for moving the first object into the first virtual plane, identify whether a size of the first virtual plane is equal to or greater than a first size required to add the first object on the first virtual plane. The instructions, when executed by the processor, may cause the wearable electronic device to, based on the size of the first virtual plane being equal to or greater than the first size, place the first object on the first virtual plane without increasing the size of the first virtual plane. The instructions, when executed by the processor, may cause the wearable electronic device to, based on the size of the first virtual plane being less than the first size, increase the size of the first virtual plane. The instructions, when executed by the processor, may cause the wearable electronic device to place the first object on the first virtual plane having the increased size.

In an embodiment, the instructions, when executed by the processor, may cause the wearable electronic device to, based on a user input for executing a second application, display a second execution screen of the second application in the 3D virtual space. The third guide representing a virtual surface for guiding a location at which an object can be placed may be provided in the 3D virtual space while the second execution screen is displayed.

In an embodiment, the instructions, when executed by the processor, may cause the wearable electronic device to, based on a user input for moving a third object included in the second execution screen, display a panel in which the object can be placed within the virtual surface and movable by a user input.

In an embodiment, the third guide may be located in a position farther than a position of the first guide and a position of the second guide with respect to a position corresponding to a user in the 3D virtual space.

In an embodiment, a method may include displaying a first execution screen of a first application in a 3D virtual space. A first guide representing a first virtual plane for guiding to a location on the first virtual plane at which an object can be placed and a second guide representing a second virtual plane for guiding to a location on the second virtual plane at which an object can be placed may be provided in the 3D virtual space, wherein the second virtual plane is facing in a direction different from the first virtual plane. The method may include, based on a user input for moving a first object included in the first execution screen, displaying at least one guide of the first guide or the second guide to enable relocation of the first object to the first virtual plane or the second virtual plane.

In an embodiment, the first virtual plane and the second virtual plane may be disposed orthogonal with respect to each other within the 3D virtual space.

In an embodiment, the first virtual plane and the second virtual plane may be disposed such that an angle between the first virtual plane and the second virtual plane is one among 45° to 90° or one among 90° to 180°

In an embodiment, the method may further include obtaining depth information about a real space surrounding the wearable electronic device while the wearable electronic device operates in a VST (video see-through) mode. The method may further include, based on the depth information, recognizing a thing having at least one real surface and disposed in the real space. The method may further include detecting the at least one real surface of the thing using a designated algorithm or an artificial intelligence mode. The method may further include providing the at least one guide of the first guide or the second guide, the at least one guide having a size corresponding to a size of the at least one real surface.

In an embodiment, the method may further include, based on a location of the first object obtained while the first object is moved, identifying whether a first distance between the first virtual plane and the first object or a second distance between the second virtual plane and the first object is equal to or less than a designated distance. The method may further include, based on the first distance or the second distance being equal to or less than the designated distance, displaying, through a display, a guide representing a region to which the first object can be placed in the first virtual plane or the second virtual place from the location of the first object.

In an embodiment, the method may further include obtaining a user input for moving a second object placed in the first virtual plan in a first direction parallel to the first virtual plane from the first virtual plane. The method may further include, based on the second object being moved into an outside of the first virtual plane by the user input, increasing sizes of the first virtual plane and the second virtual plane in the first direction. The method may further include placing the first object on the at least one first grid having the increased size.

In an embodiment, the method may further include based on the user input for moving the first object into the first virtual plane, identifying whether a size of the first virtual plane is equal to or greater than a first size required to add the first object on the first virtual plane. The method may further include, based on the size of the first virtual plane being equal to or greater than the first size, placing the first object on the first virtual plane without increasing the size of the first virtual plane. The method may further include, based on the size of the first virtual plane being less than the first size, increasing the size of the first virtual plane. The method may further include placing the first object on the first virtual plane having the increased size.

In an embodiment, the method may further include, based on a user input for executing a second application, displaying a second execution screen of the second application in the 3D virtual space. Third guide representing a virtual surface for guiding a location at which an object can be placed may be provided in the 3D virtual space while the second execution screen is displayed In an embodiment, the method may further include, based on a user input for moving a third object included in the second execution screen, displaying a panel in which the object can be placed within the virtual surface and movable by a user input In an embodiment, in a non-transitory computer-readable medium having recorded thereon computer executable instructions, the computer executable instructions may, when executed by a processor of a wearable electronic device, cause the wearable electronic device to display a first execution screen of a first application in a 3D virtual space. A first guide representing a first virtual plane for guiding to a location on the first virtual plane at which an object can be placed and a second guide representing a second virtual plane for guiding to a location on the second virtual plane at which an object can be placed may be provided in the 3D virtual space, wherein the second virtual plane is facing in a direction different from the first virtual plane. The computer executable instructions may, when executed by the processor of the wearable electronic device, cause the wearable electronic device to, based on a user input for moving a first object included in the first execution screen, display at least one guide of the first guide or the second guide to enable relocation of the first object to the first virtual plane or the second virtual plane.

What is claimed is:

1. A wearable electronic device comprising:
a display;
memory; and
at least one processor comprising processing circuitry and operatively connected to the display and the memory,
wherein the memory stores instructions that, when executed by the at least one processor individually or collectively, cause the wearable electronic device to:
display, through the display, a first execution screen of a first application in a 3D virtual space, the first execution screen including a first object, wherein a first guide representing a first virtual plane for guiding to a location on the first virtual plane at which an object can be placed and a second guide representing a second virtual plane for guiding to a location on the second virtual plane at which an object can be placed are provided in the 3D virtual space, wherein the second virtual plane is facing in a direction different from the first virtual plane,
based on a user input for moving the first object included in the first execution screen, display, through the display, at least one guide of the first guide or the second guide to enable relocation of the first object to the first virtual plane or the second virtual plane, and
based on the relocation of the first object to the first virtual plane or the second virtual plane being completed, control the display such that the displayed at least one guide of the first guide or second guide disappears while the relocated first object is displayed on the first virtual plane or the second virtual plane.

2. The wearable electronic device of claim 1, wherein the first virtual plane and the second virtual plane are disposed orthogonal with respect to each other within the 3D virtual space.

3. The wearable electronic device of claim 1, wherein the first virtual plane and the second virtual plane are disposed such that an angle between the first virtual plane and the second virtual plane is one among 45° to 90° or one among 90° to 180°.

4. The wearable electronic device of claim 1, wherein the instructions, when executed by the at least one processor individually or collectively, cause the wearable electronic device to:
obtain depth information about a real space surrounding the wearable electronic device while the wearable electronic device operates in a VST (video see-through) mode,
based on the depth information, recognize a thing having at least one real surface and disposed in the real space,
detect the at least one real surface of the thing using a designated algorithm or an artificial intelligence mode, and
provide the at least one guide of the first guide or the second guide, the at least one guide having a size corresponding to a size of the at least one real surface.

5. The wearable electronic device of claim 1, wherein the instructions, when executed by the at least one processor individually or collectively, cause the wearable electronic device to:
based on a location of the first object obtained while the first object is moved, identify whether a first distance between the first virtual plane and the first object or a second distance between the second virtual plane and the first object is equal to or less than a designated distance, and
based on the first distance or the second distance being equal to or less than the designated distance, display, through the display, a guide representing a region to which the first object can be placed in the first virtual plane or the second virtual place from the location of the first object.

6. The wearable electronic device of claim 1, wherein the instructions, when executed by the at least one processor individually or collectively, cause the wearable electronic device to:
obtain a user input for moving a second object placed in the first virtual plane in a first direction parallel to the first virtual plane from the first virtual plane, based on the second object being moved into an outside of the first virtual plane by the user input, increase sizes of the first virtual plane and the second virtual plane in the first direction, and place the first object on at least one first grid having the increased size.

7. The wearable electronic device of claim 1, wherein the instructions, when executed by the at least one processor individually or collectively, cause the wearable electronic device to:

based on the user input for moving the first object into the first virtual plane, identify whether a size of the first virtual plane is equal to or greater than a first size required to add the first object on the first virtual plane, based on the size of the first virtual plane being equal to or greater than the first size, place the first object on the first virtual plane without increasing the size of the first virtual plane, based on the size of the first virtual plane being less than the first size, increase the size of the first virtual plane, and place the first object on the first virtual plane having the increased size.

8. The wearable electronic device of claim 1, wherein the instructions, when executed by the at least one processor individually or collectively, cause the wearable electronic device to:

based on a user input for executing a second application, display a second execution screen of the second application in the 3D virtual space, wherein a third guide representing a virtual surface for guiding a location at which an object can be placed is provided in the 3D virtual space while the second execution screen is displayed.

9. The wearable electronic device of claim 8, wherein the instructions, when executed by the at least one processor individually or collectively, cause the wearable electronic device to:

based on a user input for moving a third object included in the second execution screen, display a panel in which the object can be placed within the virtual surface and movable by a user input.

10. The wearable electronic device of claim 1, wherein a third guide is located in a position farther than a position of the first guide and a position of the second guide with respect to a position corresponding to a user in the 3D virtual space.

11. A method comprising:

displaying through a display of a wearable electronic device, a first execution screen of a first application in a 3D virtual space, the first execution screen including a first object, wherein a first guide representing a first virtual plane for guiding to a location the first virtual plane at which an object can be placed and a second guide representing a second virtual plane for guiding to a location the second virtual plane at which an object can be placed are provided in the 3D virtual space, wherein the second virtual plane is facing in a direction different from the first virtual plane;

based on a user input for moving the first object included in the first execution screen, displaying, through the display, at least one guide of the first guide or the second guide to enable relocation of the first object to the first virtual plane or the second virtual plane; and based on the relocation of the first object to the first virtual plane or the second virtual plane being completed, controlling the display such that the displayed at least one guide of the first guide or second guide disappears while the relocated first object is displayed on the first virtual plane or the second virtual plane.

12. The method of claim 11, wherein the first virtual plane and the second virtual plane are disposed orthogonal with respect to each other within the 3D virtual space.

13. The method of claim 11, wherein the first virtual plane and the second virtual plane are disposed such that an angle between the first virtual plane and the second virtual plane is one among 45° to 90° or one among 90° to 180°.

14. The method of claim 11, further comprising:

obtaining depth information about a real space surrounding the wearable electronic device while the wearable electronic device operates in a VST (video see-through) mode;

based on the depth information, recognizing a thing having at least one real surface and disposed in the real space;

detecting the at least one real surface of the thing using a designated algorithm or an artificial intelligence mode; and providing the at least one guide of the first guide or the second guide, the at least one guide having a size corresponding to a size of the at least one real surface.

15. The method of claim 11, further comprising:

based on a location of the first object obtained while the first object is moved, identifying whether a first distance between the first virtual plane and the first object or a second distance between the second virtual plane and the first object is equal to or less than a designated distance; and based on the first distance or the second distance being equal to or less than the designated distance, displaying, through a display, a guide representing a region to which the first object can be placed in the first virtual plane or the second virtual place from the location of the first object.

16. The method of claim 11, further comprising:

obtaining a user input for moving a second object placed in the first virtual plane in a first direction parallel to the first virtual plane from the first virtual plane;

based on the second object being moved into an outside of the first virtual plane by the user input, increasing sizes of the first virtual plane and the second virtual plane in the first direction; and placing the first object on at least one first grid having the increased size.

17. The method of claim 11, further comprising:

based on the user input for moving the first object into the first virtual plane, identifying whether a size of the first virtual plane is equal to or greater than a first size required to add the first object on the first virtual plane;

based on the size of the first virtual plane being equal to or greater than the first size, placing the first object on the first virtual plane without increasing the size of the first virtual plane;

based on the size of the first virtual plane being less than the first size, increasing the size of the first virtual plane; and placing the first object on the first virtual plane having the increased size.

18. The method of claim 11, further comprising:

based on a user input for executing a second application, displaying a second execution screen of the second application in the 3D virtual space, wherein a third guide representing a virtual surface for guiding a location at which an object can be placed is provided in the 3D virtual space while the second execution screen is displayed.

19. The method of claim 18, further comprising:

based on a user input for moving a third object included in the second execution screen, displaying a panel in which the object can be placed within the virtual surface and movable by a user input.

20. A non-transitory computer-readable medium having recorded thereon computer executable instructions, the computer executable instructions that, when executed by at least one processor, comprising processing circuitry, of a wearable electronic device individually or collectively, cause the wearable electronic device to:

display, through a display of the wearable electronic device, a first execution screen of a first application in a 3D virtual space, the first execution screen including a first object, wherein a first guide representing a first virtual plane for guiding to a location the first virtual plane at which an object can be placed and a second guide representing a second virtual plane for guiding to a location the second virtual plane at which an object can be placed are provided in the 3D virtual space, wherein the second virtual plane is facing in a direction different from the first virtual plane, based on a user input for moving the first object included in the first execution screen, display, through the display, at least one guide of the first guide or the second guide to enable relocation of the first object to the first virtual plane or the second virtual plane, and based on the relocation of the first object to the first virtual plane or the second virtual plane being completed, control the display such that the displayed at least one guide of the first guide or second guide disappears while the relocated first object is displayed on the first virtual plane or the second virtual plane.

\* \* \* \* \*